US012335956B2

(12) United States Patent
Lim et al.

(10) Patent No.: US 12,335,956 B2
(45) Date of Patent: Jun. 17, 2025

(54) METHOD AND APPARATUS FOR TRANSMITTING OVERLAPPING UPLINK CHANNELS IN WIRELESS COMMUNICATION SYSTEM

(71) Applicant: Samsung Electronics Co., Ltd., Gyeonggi-do (KR)

(72) Inventors: Seongmok Lim, Gyeonggi-do (KR); Ameha Tsegaye Abebe, Gyeonggi-do (KR); Junyung Yi, Gyeonggi-do (KR); Youngrok Jang, Gyeonggi-do (KR); Hyoungju Ji, Gyeonggi-do (KR); Heedon Gha, Gyeonggi-do (KR); Taehan Bae, Gyeonggi-do (KR)

(73) Assignee: Samsung Electronics Co., Ltd (KR)

( * ) Notice: Subject to any disclaimer, the term of this patent is extended or adjusted under 35 U.S.C. 154(b) by 301 days.

(21) Appl. No.: 17/874,823

(22) Filed: Jul. 27, 2022

(65) Prior Publication Data
US 2023/0057558 A1      Feb. 23, 2023

(30) Foreign Application Priority Data
Jul. 27, 2021    (KR) .......................... 10-2021-0098857

(51) Int. Cl.
*H04W 72/21*    (2023.01)
*H04L 1/08*    (2006.01)
(Continued)

(52) U.S. Cl.
CPC ............... *H04W 72/21* (2023.01); *H04L 1/08* (2013.01); *H04L 5/14* (2013.01);
(Continued)

(58) Field of Classification Search
CPC ........... H04W 72/569; H04W 72/1268; H04W 72/21; H04W 72/0446; H04W 72/23;
(Continued)

(56) References Cited

U.S. PATENT DOCUMENTS 11,991,686 B2 *   5/2024   Pocovi ............. H04W 72/0453
2017/0117956 A1   4/2017   Lee et al.
(Continued)

OTHER PUBLICATIONS

Samsung Research, "XDD (Cross Division Duplex): Extending Coverage of 5G TDD Carriers", Technical White Paper, May 2021, 14 pages.
(Continued)

*Primary Examiner* — Mahran Y Abu Roumi
(74) *Attorney, Agent, or Firm* — The Farrell Law Firm, P.C.

(57) ABSTRACT

Methods and apparatuses in a wireless communication system are provided. Capability information regarding the terminal is transmitted. The capability information is associated with an X division duplexing (XDD) system. Resource configuration information is received based on the resource configuration information. A resource on which uplink control information (UCI) is to be transmitted is determined. The UCI is transmitted on the determined resource. The XDD system configures an uplink resource and a downlink resource in a same slot in different frequency resources.

20 Claims, 24 Drawing Sheets

(51) Int. Cl.
*H04L 5/14* (2006.01)
*H04W 72/0446* (2023.01)
*H04W 72/0453* (2023.01)
*H04W 72/51* (2023.01)

(52) U.S. Cl.
CPC ... *H04W 72/0446* (2013.01); *H04W 72/0453* (2013.01); *H04W 72/51* (2023.01)

(58) Field of Classification Search
CPC .......... H04W 72/1263; H04W 48/16; H04L 1/1819; H04L 5/0092; H04L 1/1854; H04L 5/0082; H04L 5/0055
See application file for complete search history.

(56) References Cited

U.S. PATENT DOCUMENTS

| | | | |
|---|---|---|---|
| 2018/0242305 A1 | 8/2018 | Kim et al. | |
| 2020/0413463 A1* | 12/2020 | Ouchi | H04W 48/16 |
| 2021/0092757 A1 | 3/2021 | Park et al. | |
| 2021/0136791 A1* | 5/2021 | Akkarakaran | H04L 5/0053 |
| 2021/0351888 A1* | 11/2021 | Park | H04B 7/0695 |
| 2022/0353891 A1* | 11/2022 | Kang | H04L 1/1861 |
| 2023/0014238 A1* | 1/2023 | Pocovi | H04W 72/0446 |
| 2024/0214943 A1* | 6/2024 | Rudolf | H04W 72/232 |

OTHER PUBLICATIONS

International Search Report dated Oct. 31, 2022 issued in counterpart application No. PCT/KR2022/011091, 9 pages.
NTT DOCOMO, Inc., "Summary #2 on UE Feature Related Discussion", R1-1913348, 3GPP TSG RAN WG1 #99, Nov. 18-22, 2019, 53 pages.
Samsung, "Email Discussion Summary for [RAN-R18-WS-eMBB-Samsung]", RWS-210541, 3GPP TSG RAN Rel-18 Workshop, Jun. 28-Jul. 2, 2021, 57 pages.
European Search Report dated Sep. 10, 2024 issued in counterpart application No. 22849891.1-1215, 11 pages.

* cited by examiner

METHOD AND APPARATUS FOR TRANSMITTING OVERLAPPING UPLINK CHANNELS IN WIRELESS COMMUNICATION SYSTEM

CROSS-REFERENCE TO RELATED APPLICATION

This application is based on and claims priority under 35 U.S.C. § 119(a) to Korean Patent Application No. 10-2021-0098857, filed on Jul. 27, 2021, in the Korean Intellectual Property Office, the disclosure of which is incorporated by reference herein in its entirety.

BACKGROUND

1. Field

The disclosure relates generally to operations performed by a terminal and a base station in a wireless communication system, and more particularly, to a method and apparatus of transmitting overlapping uplink channels in a wireless communication system.

2. Description of the Related Art

The 5G or pre-5G communication system is also referred to as a beyond 4G network communication system or post long term evolution (LTE) system. In order to achieve a high data rate, consideration is given to implementing 5G communication systems in ultra-high frequency (millimeter-wave (mmWave)) bands (e.g., 60 GHz bands). To reduce path loss of radio waves and increase a transmission range of radio waves in the ultra-high frequency bands, beamforming, massive multiple-input multiple-output (MIMO), full dimensional MIMO (FD-MIMO), array antenna, analog beamforming, and large-scale antenna techniques may be considered. To improve system networks, technologies for advanced small cells, cloud radio access networks (RANs), ultra-dense networks, device to device (D2D) communication, wireless backhaul, moving networks, cooperative communication, coordinated multi-points (CoMP), received-interference cancellation, and the like, have also been developed in the 5G communication system. In addition, in the 5G system, an advanced coding modulation (ACM) method, e.g., hybrid frequency-shift keying (FSK) and quadrature amplitude modulation (QAM) (FQAM), sliding window superposition coding (SWSC), and advanced access technology (e.g., filter bank multi carrier (FBMC), non-orthogonal multiple access (NOMA), and sparse code multiple access (SCMA)), have been developed.

The Internet has evolved from a human-centered connection network, through which humans generate and consume information, to an Internet of things (IoT) network that exchanges and processes information between distributed components such as objects. Internet of everything (IoE) technology has also emerged, in which big data processing technology via a connection with a cloud server or the like is combined with the IoT technology. To implement the IoT, various technological elements, such as sensing technology, wired/wireless communication and network infrastructures, service interface technology, and security technology, are required, such that, in recent years, technologies related to sensor networks for connecting objects, machine-to-machine (M2M) communication, and machine-type communication (MTC) have been studied. In the IoT environment, intelligent Internet (or information) technology (IT) services may be provided to collect and analyze data obtained from objects connected to each other to create new value in human life. The IoT may be applied to fields, such as smart homes, smart buildings, smart cities, smart cars or connected cars, smart grids, health care, smart home appliances, and advanced medical services, through convergence and integration of existing IT and various industries.

In this regard, various attempts to apply the 5G communication system to the IoT network have been made. For example, technologies regarding sensor network, M2M, MTC, etc., are implemented by the 5G communication technologies, such as beamforming, MIMO, and array antennas. The application of a cloud RAN as big data processing technology may also be considered as an example of convergence between 5G technology and IoT technology.

As described above, various services may be provided due to the development of wireless communication systems, and thus, there is a need for methods of more seamlessly providing such services. In particular, in order to provide services to users for a longer period of time, a method of effectively operating dormant cells is required.

SUMMARY

Embodiments of the disclosure provide a method and apparatus for transmitting overlapping uplink channels in a wireless communication system.

According to an embodiment, a method of a terminal in a wireless communication system is provided. Capability information regarding the terminal is transmitted. The capability information is associated with an X division duplexing (XDD) system. Resource configuration information is received based on the resource configuration information. A resource is determined on which uplink control information (UCI) is to be transmitted. The UCI is transmitted on the determined resource. The XDD system configures an uplink resource and a downlink resource in different frequency resources of a same slot.

According to an embodiment, a terminal in a wireless communication system is provided that includes a transceiver, and at least one processor connected to the transceiver. The at least one processor is configured to transmit capability information regarding the terminal. The capability information is associated with an XDD system. The at least one processor is also configured to receive resource configuration information based on the resource configuration information, determine a resource on which UCI is to be transmitted, and transmit the UCI on the determined resource. The XDD system configures an uplink resource and a downlink resource in different frequency resources of a same slot.

According to an embodiment, a method of a base station in a wireless communication system is provided. Capability information regarding a terminal is received. The capability information is associated with an XDD system. Resource configuration information is transmitted. A resource on which UCI is to be transmitted is determined by the terminal based on the resource configuration information The UCI is received on the determined resource. The XDD system configures an uplink resource and a downlink resource in different frequency resources of a same slot.

According to an embodiment, a base station in a wireless communication system is provided and includes a transceiver and at least one processor connected to the transceiver. The at least one processor is configured to receive capability information regarding a terminal. The capability information is associated with an XDD system. The at least one processor is also configured to transmit resource configuration information. A resource on which UCI is to be transmitted is determined by the terminal based on the resource configuration information. The at least one processor is further configured to receive the UCI on the determined resource. The XDD system configures an uplink resource and a downlink resource in different frequency resources of a same slot.

BRIEF DESCRIPTION OF THE DRAWINGS

The above and other aspects, features, and advantages of the disclosure will be more apparent from the following description taken in conjunction with the accompanying drawings, in which.

DETAILED DESCRIPTION

Figure 1:
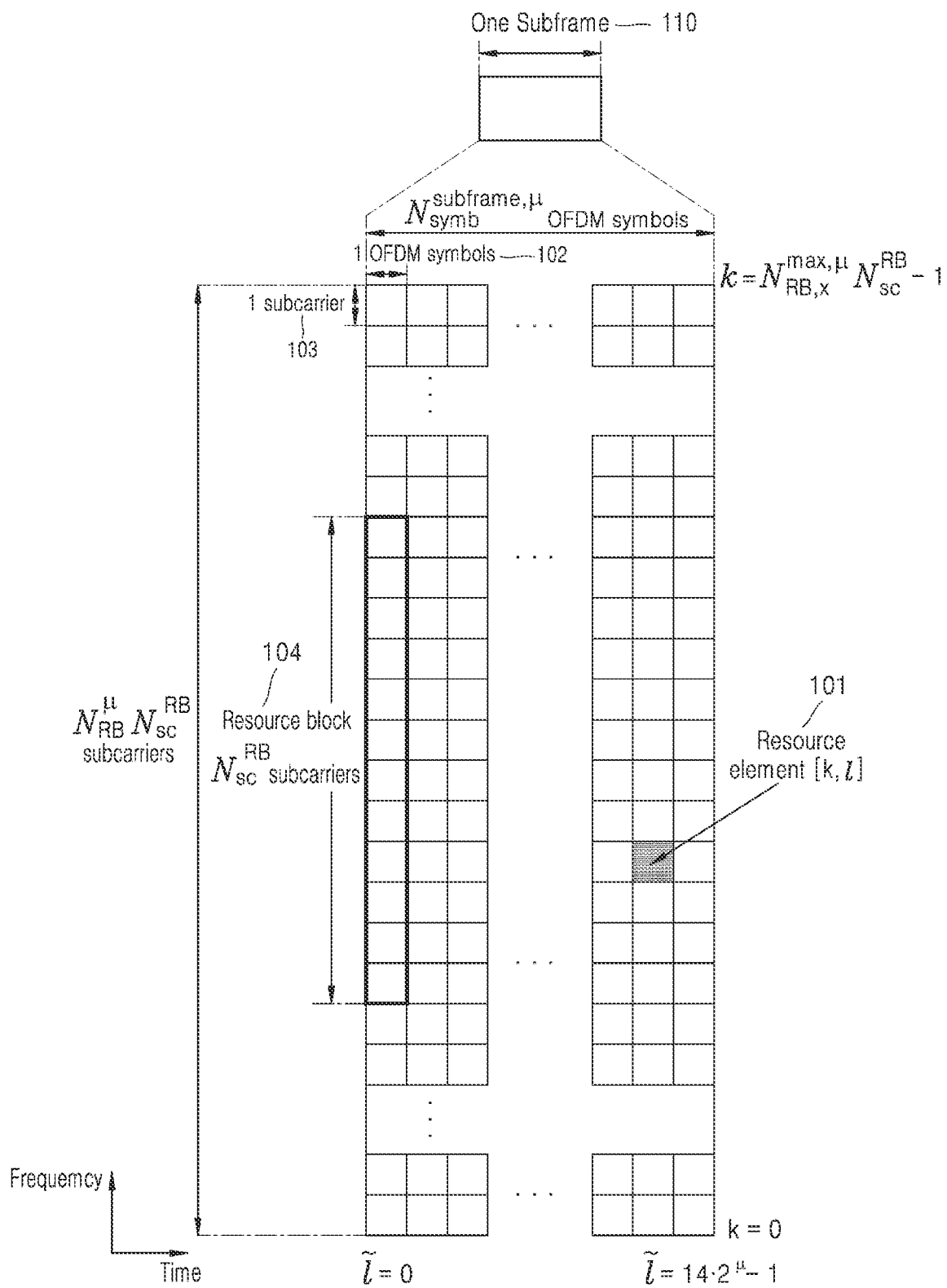
FIG. 1 is a diagram illustrating a basic structure of a time-frequency domain that is a radio resource domain in which data or a control channel is transmitted in a wireless communication system, according to an embodiment.

Embodiments of the disclosure are described in detail with reference to the accompanying drawings. The same or similar components may be designated by the same or similar reference numerals although they are illustrated in different drawings. Detailed descriptions of constructions or processes known in the art may be omitted to avoid obscuring the subject matter of the disclosure Herein, the expression "at least one of a, b or c" indicates only a, only b, only c, both a and b, both a and c, both b and c, all of a, b, and c, or variations thereof.

Herein, a layer may also be referred to as an entity.

Some components may be exaggerated, omitted, or schematically illustrated in the accompanying drawings. Also, the size of each component does not entirely reflect the actual size. In each drawing, components that are the same or are in correspondence are rendered the same reference numeral.

Advantages and features of the disclosure and methods of accomplishing the same may be understood more readily by reference to the following detailed description of the embodiments and the accompanying drawings. The embodiments of the disclosure may, however, be embodied in many different forms and should not be construed as limited to the embodiments set forth herein. Rather, these embodiments of the disclosure are provided so that this disclosure will be thorough and complete, and will fully convey the scope of the embodiments of the disclosure to those of ordinary skill in the art. Therefore, the scope of the disclosure will only be defined by the appended claims. The terms used herein are defined in consideration of functions used in the disclosure, and may be changed according to the intent or commonly used methods of users or operators. Accordingly, definitions of the terms are understood based on the entire descriptions of the specification.

Hereinafter, the term "base station (BS)" refers to an entity for allocating resources to a terminal and may be used interchangeably with at least one of a next-generation node B (gNode B), an evolved node B (eNode B), a node B, a BS, a wireless access unit, a BS controller, or a node over a network. Examples of a terminal may include a user equipment (UE), a mobile station (MS), a cellular phone, a smartphone, a computer, and a multimedia system capable of performing a communication function. Herein, a downlink (DL) denotes a wireless transmission path of a signal transmitted by a BS to a UE, and an uplink (UL) denotes a wireless transmission path of a signal transmitted by a UE to a BS. Embodiments may be described below on the basis of long term evolution (LTE), LTE-advanced (LTE-A), or 5th generation (5G) systems, but may also be applied to other communication systems having similar technical backgrounds or channel types. Examples thereof may include 5G mobile communication technologies (e.g., 5G, new radio (NR), etc.) developed after LTE-A. 5G may be a concept including existing LTE, LTE-A, and other similar services. The disclosure is applicable to other communication systems through modification at the discretion of one of ordinary skill in the art without greatly departing from the scope of the disclosure.

In this regard, it will be understood that combinations of blocks in flowcharts or process flow diagrams may be performed by computer program instructions. Because these computer program instructions may be loaded into a processor of a general-purpose computer, a special purpose computer, or another programmable data processing device, the instructions, which are executed via the processor of the computer or the other programmable data processing device generate means for implementing functions specified in the flowchart block(s). Because these computer program instructions may also be stored in a computer-usable or computer-readable memory that may direct a computer or another programmable data processing device to function in a particular manner, the instructions stored in the computer-usable or computer-readable memory may produce an article of manufacture including instruction means that implement the functions specified in the flowchart block(s). Because the computer program instructions may also be loaded onto a computer or another programmable data processing device, a series of operational steps may be performed on the computer or the other programmable device to produce a computer implemented process, and thus, the instructions executed on the computer or the other programmable device may provide steps for implementing the functions specified in the flowchart block(s).

In addition, each block of the flowchart illustrations may represent a module, a segment, or a portion of code, which includes one or more executable instructions for performing specified logical function(s). It should also be noted that the functions noted in the blocks may occur out of the order. For example, two successive blocks may be performed substantially at the same time or in reverse order, depending upon the functionality involved.

The term "unit" as used herein may refer to a software or hardware component, such as field programmable gate array (FPGA) or application specific integrated circuit (ASIC), which may perform some functions. However, the term "unit" is not limited to software or hardware. The term "unit" may be configured in an addressable storage medium or may be configured to reproduce one or more processors. Thus, for example, the term "units" may refer to components, such as software components, object-oriented software components, class components, and task components, and may include processes, functions, attributes, procedures, subroutines, segments of program code, drivers, firmware, microcode, circuits, data, a database, data structures, tables, arrays, and variables. The functionality provided in components and units may be combined into fewer components and units or may be further separated into additional components and units. Further, the components and units may be implemented to operate one or more central processing units (CPUs) in a device or a secure multimedia card. Also, according to an embodiment, a unit may include one or more processors.

A wireless communication system has evolved from a system providing voice-oriented services to a broadband wireless communication system providing high speed high quality packet data services of communication standards, such as high speed packet access (HSPA), LTE or evolved universal terrestrial radio access (E-UTRA), LTE-A, and LTE-Pro of 3rd generation partnership project (3GPP), high rate packet data (HRPD) and ultra-mobile broadband (UMB) of 3GPP2, and IEEE 802.16e.

In an LTE system, as a representative example of the broadband wireless communication system, an orthogonal frequency division multiplexing (OFDM) scheme is employed in a DL, and a single carrier frequency division multiple access (SC-FDMA) scheme is employed in a UL. The UL refers to a radio link for a UE or MS to transmit data or a control signal to an eNode B or BS, and the DL refers to a radio link for a BS to transmit data or a control signal to a UE or MS. In the multiple access scheme as described above, data or control information regarding each user may be identified by performing allocation and operation so that time-frequency resources for carrying data or control information for each user do not overlap each other, that is, orthogonality therebetween is established.

As post-LTE systems, 5G systems need to support services capable of freely reflecting and simultaneously satisfying various requirements of users, service providers, and the like. Services considered for 5G communication systems include enhanced mobile broadband (eMBB), massive machine type communication (mMTC), and ultra-reliability low latency communication (URLLC).

eMBB aims to provide a data rate that is higher than that supported by legacy LTE, LTE-A, or LTE-Pro. For example, in a 5G communication system, eMBB needs to be able to provide a peak data rate of 20 Gbps in a DL and a peak data rate of 10 Gbps in an UL at one BS. Also, the 5G communication system needs to provide an enhanced peak data rate and simultaneously provide an increased user perceived data rate of the UE. In order to satisfy such requirements, there is a need to improve various transmission/reception technologies including a more advanced MIMO transmission technology. While LTE uses up to 20 MHz transmission bandwidth in a 2 GHz band for signal transmission, the 5G communication system may use frequency bandwidth wider than 20 MHz in 3 to 6 GHz bands or in 6 GHz or higher frequency bands. Therefore, the data rate required by the 5G communication system may be satisfied.

At the same time, mMTC is under consideration so as to support application services such as Internet of things (IoT) in the 5G communication system. In order to efficiently provide IoT, mMTC needs to support access of a massive UE in a cell, enhance coverage of the UE, increase battery time, and reduce costs of the UE. The IoT needs to be able to support a large number of UEs (e.g., 1,000,000 UEs/km$^2$) in a cell because it is attached to various sensors and various devices to provide communication functions. Also, because a UE supporting mMTC is likely to be located in a shadow region failing to be covered by the cell, such as the basement of a building, due to the characteristics of the service, the UE may require wider coverage than other services provided by the 5G communication system. The UE supporting mMTC needs to be configured as a low-cost UE and may require a very long battery life time such as 10 to 15 years because it is difficult to frequently replace the battery of the UE.

Finally, URLLC is a cellular-based wireless communication service used for a particular purpose (mission-critical). For example, URLLC may be used for services in remote control for robots or machinery, industrial automation, unmanned aerial vehicles, remote health care, emergency alerts, or the like. Therefore, communication provided by URLLC has to provide very low latency and very high reliability. For example, services supporting URLLC need to meet an air interface latency of less than 0.5 milliseconds and may simultaneously require a packet error rate equal to or lower than $10^{-5}$. Therefore, for services supporting URLLC, the 5G system needs to provide a smaller transmit time interval (TTI) than other services, and may simultaneously require a design matter that has to allocate a wide resource in a frequency band so as to ensure reliability of a communication link.

The three services of 5G (i.e., eMBB, URLLC, and mMTC), may be multiplexed and transmitted in a single system. In order to satisfy different requirements of the services, different transmission/reception schemes and transmission/reception parameters may be used for the services. 5G is not limited to the above-described three services.

A frame structure in a wireless communication system is described in greater detail below with reference to the accompanying drawings.

FIG. 1 is a diagram illustrating a basic structure of a time-frequency domain that is a radio resource domain in which data or a control channel is transmitted in a wireless communication system, according to an embodiment.

Referring to FIG. 1, a horizontal axis represents a time domain, and a vertical axis represents a frequency domain. A basic resource unit of a subframe 110 in the time and frequency domain is a resource element (RE) 101, which may be defined as an OFDM symbol 102 on a time axis and a subcarrier 103 on a frequency axis. In the frequency domain, $N_{sc}^{RB}$ (e.g., 12) consecutive REs may constitute a single resource block (RB) 104.

Figure 2:
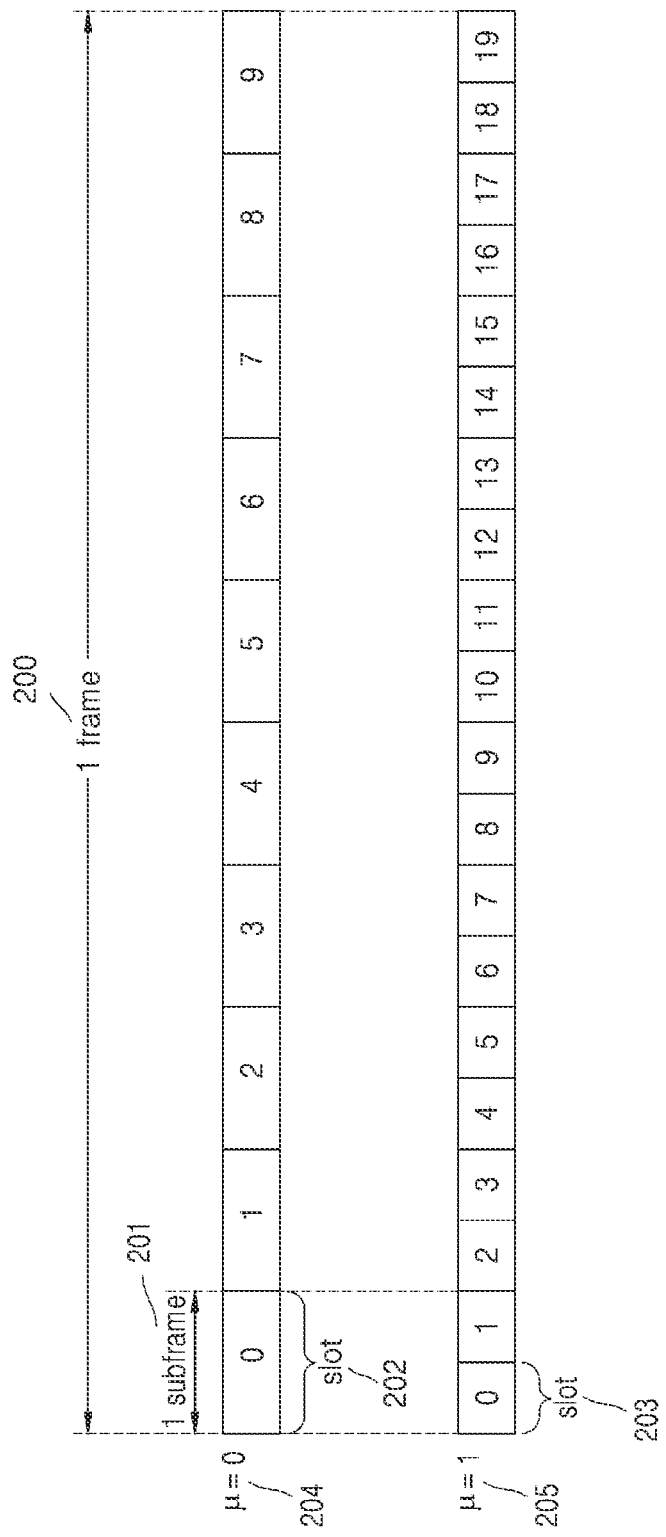
FIG. 2 is a diagram illustrating an example of a slot structure used in a wireless communication system, according to an embodiment.

FIG. 2 is a diagram illustrating an example of a slot structure used in a wireless communication system, according to an embodiment.

FIG. 2 provides an example of structures of a frame 200, a subframe 201, and a slot 202. One frame 200 may be defined to be 10 ms. One subframe 201 may be defined to be 1 ms, and thus, a total of 10 subframes 201 may constitute the one frame 200. One slot 202 or 203 may be defined to have 14 OFDM symbols (that is, the number $N_{symb}^{slot}$ of symbols per slot=14). The one subframe 201 may include one or more slots 202 and 203, and the number of slots 202 and 203 per one subframe 201 may vary depending on subcarrier spacing (SCS) configuration values µ 204 and 205. In FIG. 2, the SCS configuration values are 0 and 1 (i.e., µ=0 204 and µ=1 205). In the case of µ=0 204, the one subframe 201 may include one slot 202, and in the case of µ=1 205, the one subframe 201 may include two slots 203. That is, depending on the SCS configuration value µ, the number of slots per one subframe ($N_{slot}^{subframe,\mu}$) may vary, and the number of slots per one frame ($N_{slot}^{frame,\mu}$) may vary accordingly. $N_{slot}^{subframe,\mu}$ and $N_{slot}^{frame,\mu}$ according to each SCS configuration µ may be defined as in Table 1 below.

TABLE 1

| µ | $N_{symb}^{slot}$ | $N_{slot}^{frame,\mu}$ | $N_{slot}^{subframe,\mu}$ |
|---|---|---|---|
| 0 | 14 | 10 | 1 |
| 1 | 14 | 20 | 2 |

TABLE 1-continued

| µ | $N_{symb}^{slot}$ | $N_{slot}^{frame,\mu}$ | $N_{slot}^{subframe,\mu}$ |
|---|---|---|---|
| 2 | 14 | 40 | 4 |
| 3 | 14 | 80 | 8 |
| 4 | 14 | 160 | 16 |
| 5 | 14 | 320 | 32 |

A bandwidth part (BWP) configuration in a 5G communication system is described in greater detail below with reference to the drawings.

Figure 3:
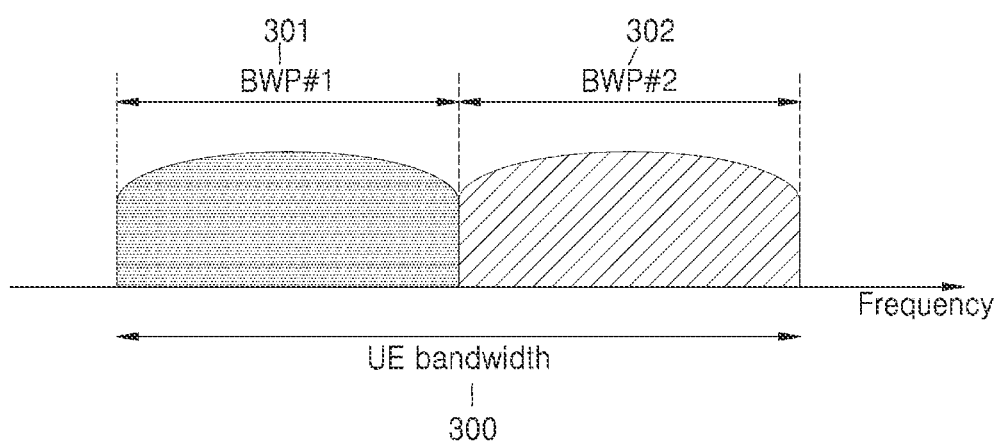
FIG. 3 is a diagram illustrating an example of a bandwidth part (BWP) configuration in a wireless communication system, according to an embodiment.

FIG. 3 is a diagram illustrating an example of a BWP configuration in a wireless communication system, according to an embodiment of the disclosure.

FIG. 3 illustrates an example in which a UE bandwidth 300 is configured into two BWPs, (i.e., a BWP #1 301 and a BWP #2 302). The BS may configure one or more BWPs in the UE and may configure various pieces of information for each BWP, as described in Table 2 below.

TABLE 2

| BWP ::= | SEQUENCE { |
|---|---|
| bwp-Id | BWP-Id, |
| (Bandwidth part identity) | |
| locationAndBandwidth | INTEGER (1..65536), |
| (Bandwidth part location) | |
| subcarrierSpacing | ENUMERATED {n0, n1, n2, n3, n4, n5}, |
| cyclicPrefix | ENUMERATED { extended } |
| } | |

Configuration of the BWP is not limited to the example above, and various parameters related to the BWP in addition to the above-described configuration information may be configured for the UE. The BS may transmit pieces of configuration information to the UE via higher layer signaling (e.g., radio resource control (RRC) signaling). At least one BWP among the one or more configured BWPs may be activated. An indication indicating whether to activate a configured BWP may be transmitted from the BS to the UE semi-statically by RRC signaling or dynamically in DL control information (DCI).

The UE, before being RRC connected, may be configured by the BS with an initial BWP for initial access through a master information block (MIB). Specifically, the UE may receive, through the MIB in an initial access stage, configuration information for a search space and a control resource set (CORESET) where a physical downlink control channel (PDCCH) for reception of system information (e.g., remaining system information (RMSI) or system information block 1 (SIB1)) required for initial access may be transmitted. The CORESET and search space configured through the MIB may each be regarded as identity (ID) 0. The BS may notify the UE of configuration information, such as frequency allocation information, time allocation information, numerology, etc., for a CORESET #0, through the MIB. Also, the BS may notify the UE of configuration information for a monitoring period and an occasion for the CORESET #0 (i.e., configuration information for a search space #0) through the MIB. The UE may regard a frequency domain configured as the CORESET #0 obtained from the MIB as the initial BWP for initial access. In this case, an ID of the initial BWP may be regarded as 0.

Configuration of a BWP supported in a 5G wireless communication system may be used for various purposes.

When a bandwidth supported by the UE is smaller than a system bandwidth, the BS may support data transmission/ reception by the UE through configuration of a BWP. For example, the BS configures a frequency location of the BWP (configuration information 2) in the UE, such that the UE may transmit or receive data at a particular frequency location in the system bandwidth.

Also, the BS may configure a plurality of BWPs in the UE for the purpose of supporting different numerologies. For example, in order to support data transmission/reception using both a SCS of 15 KHz and a SCS of 30 KHz for a UE, two BWPs may be configured with SCSs of 15 KHz and 30 KHz, respectively. Different BWPs may be frequency division multiplexed, and when the BS is to transmit or receive data at a particular SCS, a BWP configured with the SCS may be activated.

For the purpose of reducing power consumption of the UE, the BS may configure BWPs having different magnitudes of bandwidths in the UE. For example, when the UE supports a very large bandwidth (e.g., a bandwidth of 100 MHz), and always transmits or receives data in the bandwidth, the UE may consume very large power. In a particular situation where there is no traffic, monitoring an unnecessary DL control channel in a large bandwidth of 100 MHz may be very inefficient in terms of power consumption. For the purpose of reducing power consumption of the UE, the BS may configure a BWP with a relatively small bandwidth (e.g., a BWP of 20 MHz), in the UE. In the situation where there is no traffic, the UE may perform monitoring in the BWP of 20 MHz, and when data is generated, the UE may transmit or receive data in the BWP of 100 MHz under instructions from the BS.

In the method of configuring the BWP, the UEs, before being RRC connected, may receive configuration information regarding an initial BWP through an MIB in an initial access stage. Specifically, the UE may be configured with a CORESET for a DL control channel on which DCI for scheduling a system information block (SIB) may be transmitted from an MIB of a physical broadcast channel (PBCH). A bandwidth of the CORESET configured through the MIB may be regarded as an initial BWP, and the UE may receive a physical downlink shared channel (PDSCH) on which the SIB is transmitted in the configured initial BWP. In addition to the purpose of receiving the SIB, the initial BWP may also be used for other system information (OSI), paging, or random access.

When one or more BWPs are configured for the UE, the BS may instruct the UE to switch a BWP by using a BWP indicator field in the DCI. For example, when a BWP of the UE currently activated is a BWP #1 301 in FIG. 3, the BS may indicate a BWP #2 302 with a BWP indicator in DCI to the UE, and the UE may switch the BWP to the BWP #2 302 indicated with the BWP indicator in the received DCI.

As the DCI-based BWP switching may be indicated by DCI that schedules a PDSCH or a PUSCH as described above, when a BWP switching request is received, the UE may need to transmit or receive the PDSCH or the PUSCH scheduled by the DCI in the switched BWP without difficulty. For this, a standard defines a requirement for a delay time $T_{BWP}$ required for BWP switching, which may be defined, for example, as follows.

TABLE 3

| μ | NR Slot length (ms) | BWP switch delay $T_{BWP}$ (slots) | |
|---|---|---|---|
| | | Type 1[Note 1] | Type 2[Note 1] |
| 0 | 1 | [1] | [3] |
| 1 | 0.5 | [2] | [5] |
| 2 | 0.25 | [3] | [9] |
| 3 | 0.125 | [6] | [17] |

Note 1:
Depends on UE capability.
Note 2:
If the BWP switch involves changing of SCS, the BWP switch delay is determined by the larger one between the SCS before BWP switch and the SCS after BWP switch.

The requirement for the BWP switching delay time $T_{BWP}$ may support Type 1 or Type 2 depending on a capability of the UE. The UE may report a supportable BWP delay time type to the BS.

According to the above-described requirement for the BWP switching delay time $T_{BWP}$, when the UE receives DCI including a BWP switching indicator in a slot n, the UE may complete switching to a new BWP indicated by the BWP switching indicator at a time point not later than a slot n+$T_{BWP}$. Accordingly, the UE may transmit or receive a data channel scheduled by the DCI in the switched new BWP. When the BS is to schedule the data channel with the new BWP, the BS may determine time domain resource allocation for the data channel by considering the BWP switching delay time $T_{BWP}$ of the UE. For example, as for a method of determining time domain resource allocation for the data channel, the BS may schedule the data channel after the BWP switching delay time $T_{BWP}$ in scheduling the data channel with the new BWP. Therefore, the UE may not expect that the DCI indicating BWP switching indicates a slot offset value K0 or K2 smaller than the BWP switching delay time $T_{BWP}$.

When the UE receives DCI indicating BWP switching (e.g., DCI format 1_1 or 0_1), the UE may not perform transmission or reception during a time period from a third symbol of a slot in which a PDCCH including the DCI is received to a start point of a slot indicated by the slot offset value K0 or K2 indicated in a time domain resource allocation indicator field in the DCI. For example, when the UE has received DCI indicating BWP switching in the slot n and a slot offset value indicated by the DCI is K, the UE may not perform transmission or reception from the third symbol of the slot n to a symbol before a slot n+K, i.e., a last symbol of a slot n+K−1.

A synchronization signal (SS)/PBCH block in the 5G wireless communication system is described in detail below.

The SS/PBCH block may refer to a physical layer channel block including a primary SS (PSS), a secondary SS (SSS), and a PBCH. In detail, functions of the PSS, the SSS, and the PBCH may be as follows.

PSS: a reference signal for DL time/frequency synchronization, which may provide partial information of a cell ID.

SSS: a reference signal for DL time/frequency synchronization, which may provide the rest of the cell ID information not provided by the PSS. The SSS may also serve as another reference signal for demodulation of the PBCH.

PBCH: a channel for providing essential SI required for transmission/reception of a data channel and a control channel for the UE. The essential SI may include search-space-related control information indicating radio resource mapping information regarding the control channel, scheduling control information for a separate data channel on which SI is transmitted.

SS/PBCH block: SS/PBCH block is a combination of a PSS, an SSS, and a PBCH. One or more SS/PBCH blocks may be transmitted in 5 ms, and each of the SS/PBCH blocks may be identified by an index.

The UE may detect the PSS and the SSS in the initial access stage and decode the PBCH. The UE may obtain an MIB from the PBCH and may be configured with a CORESET #0 (corresponding to a CORESET having a CORESET index of 0) through the MIB. The UE may assume that a demodulation reference signal (DMRS) transmitted in a selected SS/PBCH block and CORESET #0 is quasi co-located (QCL) and may perform monitoring on the CORESET #0. The UE may receive SI in DCI transmitted in the CORESET #0. The UE may obtain random-access-channel (RACH)-related configuration information required for initial access from the received SI. The UE may transmit a physical RACH (PRACH) to the BS in consideration of a selected SS/PBCH index, and the BS that has received the PRACH may obtain information about an SS/PBCH block index selected by the UE. The BS may identify which block has been selected by the UE from among the SS/PBCH blocks and that the UE monitors the CORESET #0 associated with the selected SS/PBCH block.

DCI in the 5G wireless communication system is described in greater detail below.

In the 5G system, scheduling information for UL data (or a PUSCH) or DL data (or a PDSCH) may be transmitted from the BS to the UE in the DCI. The UE may monitor a fallback DCI format and a non-fallback DCI format with respect to the PUSCH or the PDSCH. The fallback DCI format may include a fixed field pre-defined between the BS and the UE, and the non-fallback DCI format may include a configurable field.

The DCI may be transmitted on the PDCCH through channel coding and modulation processes. Cyclic redundancy check (CRC) may be appended to a DCI message payload, and the CRC may be scrambled by a radio network temporary identifier (RNTI) corresponding to an ID of the UE. Depending on the use of a DCI message (e.g., UE-specific data transmission), a power control command, a random access response, or the like, different RNTIs may be used. Specifically, the RNTI may be transmitted not explicitly, but in a CRC calculation process. When a DCI message transmitted on the PDCCH is received, the UE may identify CRC by using an allocated RNTI and determine that the DCI message is transmitted to the UE, based on a result of the identifying of the CRC.

For example, DCI that schedules a PDSCH for SI may be scrambled by an SI-RNTI. DCI that schedules a PDSCH for a random access response (RAR) message may be scrambled by an RA-RNTI. DCI that schedules a PDSCH for a paging message may be scrambled by a P-RNTI. DCI that notifies a slot format indicator (SFI) may be scrambled by an SFI-RNTI. DCI that notifies transmit power control (TPC) may be scrambled by a TPC-RNTI. DCI that schedules a UE-specific PDSCH or PUSCH may be scrambled by a cell RNTI (C-RNTI), a modulation coding scheme C-RNTI (MCS-C-RNTI), or a configured scheduling RNTI (CS-RNTI).

DCI format 0_0 may be used for fallback DCI that schedules a PUSCH, in which case the CRC may be scrambled by a C-RNTI. The DCI format 0_0 with the CRC scrambled by the C-RNTI may include, for example, the following information of Table 4.

TABLE 4

- Identifier for DCI formats-1 bit
  - The value of this bit field is always set to 0, indicating an UL DCI format
- Frequency domain resource assignment – $\lceil \log_2(N_{RB}^{UL,BWP} (N_{RB}^{UL,BWP} +1)/2) \rceil$ bits where $N_{RB}^{UL,BWP}$ is defined in subclause 7.3.1.0
  - For PUSCH hopping with resource allocation type 1:
    - $N_{UL\_hop}$ MSB bits are used to indicate the frequency offset according to Subclause 6.3 of [6, TS 38.214], where $N_{UL\_hop}$ = 1 if the higher layer parameter frequencyHoppingOffsetLists contains two offset values and $N_{UL\_hop}$ = 2 if the higher layer parameter frequencyHoppingOffsetLists contains four offset values
    - $\lceil \log_2 (N_{RB}^{UL,BWP} (N_{RB}^{UL,BWP} +1)/2) \rceil - N_{UL\_hop}$ bits provide the frequency domain resource allocation according to Subclause 6.1.2.2.2 of [6, TS 38.214]
  - For non-PUSCH hopping with resource allocation type 1:
    - $\lceil \log_2(N_{RB}^{UL,BWP} (N_{RB}^{UL,BWP} +1)/2) \rceil$ bits provide the frequency domain resource allocation according to Subclause 6.1.2.2.2 of [6, TS 38.214]
- Time domain resource assignment-4 bits as defined in Subclause 6.1.2.1 of [6, TS 38.214]
- Frequency hopping flag-1 bit according to Table 7.3.1.1.1-3, as defined in Subclause 6.3 of [6, TS 38.214]
- Modulation and coding scheme-5 bits as defined in Subclause 6.1.4.1 of [6, TS 38.214]
- New data indicator-1 bit
- Redundancy version-2 bits as defined in Table 7.3.1.1.1-2
- HARQ process number-4 bits
- TPC command for scheduled PUSCH-2 bits as defined in Subclause 7.1.1 of [5, TS 38.213]
- Padding bits, if required.
- UL/SUL indicator-1 bit for UEs configured with supplementaryUplink in ServingCellConfig in the cell as defined in Table 7.3.1.1.1-1 and the number of bits for DCI format 1_0 before padding is larger than the number of bits for DCI format 0_0 before padding; 0 bit otherwise. The UL/SUL indicator, if present, locates in the last bit position of DCI format 0_0, after the padding bit(s).
  - If the UL/SUL indicator is present in DCI format 0_0 and the higher layer parameter pusch-Config is not configured on both UL and SUL the UE ignores the UL/SUL indicator field in DCI format 0_0, and the corresponding PUSCH scheduled by the DCI format 0_0 is for the UL or SUL for which high layer parameter pucch-Config is configured;

TABLE 4-continued

- If the UL/SUL indicator is not present in DCI format 0_0 and pucch-Config is configured, the corresponding PUSCH scheduled by the DCI format 0_0 is for the UL or SUL for which high layer parameter pucch-Config is configured.
- If the UL/SUL indicator is not present in DCI format 0_0 and pucch-Config is not configured, the corresponding PUSCH scheduled by the DCI format 0_0 is for the uplink on which the latest PRACH is transmitted.

DCI format 0_1 may be used for non-fallback DCI that schedules a PUSCH, in which case the CRC may be scrambled by a C-RNTI. The DCI format 0_1 with the CRC scrambled by the C-RNTI may include, for example, the following information of Table 5.

TABLE 5

- Identifier for DCI formats − 1 bit
  - The value of this bit field is always set to 0, indicating an UL DCI format
- Carrier indicator − 0 or 3 bits, as defined in Subclause 10.1 of [5, TS38.213].
- UL/SUL indicator − 0 bit for UEs not configured with supplementaryUplink in ServingCellConfig in the cell or UEs configured with supplementaryUplink in ServingCellConfig in the cell but only PUCCH carrier in the cell is configured for PUSCH transmission; otherwise, 1 bit as defined in Table 7.3.1.1.1-1.
- Bandwidth part indicator − 0, 1 or 2 bits as determined by the number of UL BWPs $n_{BWP,RRC}$ configured by higher layers, excluding the initial UL bandwidth part. The bitwidth for this field is determined as $\lceil \log_2(n_{BWP}) \rceil$ bits, where
  - $n_{BWP} = n_{BWP,RRC} + 1$ if $n_{BWP,RRC} \leq 3$, in which case the bandwidth part indicator is equivalent to the ascending order of the higher layer parameter BWP-Id;
  - otherwise $n_{BWP} = n_{BWP,RRC}$, in which case the bandwidth part indicator is defined in Table 7.3.1.1.2-1:
  If a UE does not support active BWP change via DCI, the UE ignores this bit field.
- Frequency domain resource assignment − number of bits determined by the following, where $N_{RB}^{UL,BWP}$ is the size of the active UL bandwidth part:
  - $N_{RBG}$ bits if only resource allocation type 0 is configured, where $N_{RBG}$ is defined in Subclause 6.1.2.2.1 of [6, TS 38.214],
  - $\lceil \log_2(N_{RB}^{UL,BWP}(N_{RB}^{UL,BWP}+1)/2) \rceil$ bits if only resource allocation type 1 is configured, or max ($\lceil \log_2(N_{RB}^{UL,BWP}(N_{RB}^{UL,BWP}+1)/2) \rceil$, $N_{RBG}$)+1 bits if both resource allocation type 0 and 1 are configured.
  - If both resource allocation type 0 and 1 are configured, the MSB bit is used to indicate resource allocation type 0 or resource allocation type 1, where the bit value of 0 indicates resource allocation type 0 and the bit value of 1 indicates resource allocation type 1.
  - For resource allocation type 0, the $N_{RBG}$ LSBs provide the resource allocation as defined in Subclause 6.1.2.2.1 of [6, TS 38.214].
  - For resource allocation type 1, the $\lceil \log_2(N_{RB}^{UL,BWP}(N_{RB}^{UL,BWP}+1)/2) \rceil$ LSBs provide the resource allocation as follows:
    - For PUSCH hopping with resource allocation type 1:
      - $N_{UL\_hop}$ MSB bits are used to indicate the frequency offset according to Subclause 6.3 of [6, TS 38.214], where $N_{UL\_hop} = 1$ if the higher layer parameter frequencyHoppingOffsetLists contains two offset values and $N_{UL\_hop} = 2$ if the higher layer parameter frequencyHoppingOffsetLists contains four offset values
      - $\lceil \log_2(N_{RB}^{UL,BWP}(N_{RB}^{UL,BWP}+1)/2) \rceil - N_{UL\_hop}$ bits provide the frequency domain resource allocation according to Subclause 6.1.2.2.2 of [6, TS 38.214]
    - For non-PUSCH hopping with resource allocation type 1:
      - $\lceil \log_2(N_{RB}^{UL,BWP}(N_{RB}^{UL,BWP}+1)/2) \rceil$ bits provide the frequency domain resource allocation according to Subclause 6.1.2.2.2 of [6, TS 38.214]
  If "Bandwidth part indicator" field indicates a bandwidth part other than the active bandwidth part and if both resource allocation type 0 and 1 are configured for the indicated bandwidth part, the UE assumes resource allocation type 0 for the indicated bandwidth part if the bitwidth of the "Frequency domain resource assignment" field of the active bandwidth part is smaller than the bitwidth of the "Frequency domain resource assignment" field of the indicated bandwidth part.

TABLE 5-continued

- Time domain resource assignment − 0, 1, 2, 3, or 4 bits as defined in Subclause 6.1.2.1 of [6, TS38.214]. The bitwidth for this field is determined as $\lceil \log_2(I) \rceil$ bits, where I is the number of entries in the higher layer parameter pusch-TimeDomainAllocationList if the higher layer parameter is configured; otherwise I is the number of entries in the default table.
- Frequency hopping flag − 0 or 1 bit:
  - 0 bit if only resource allocation type 0 is configured or if the higher layer parameterfrequencyHopping is not configured;
  - 1 bit according to Table 7.3.1.1.1-3 otherwise, only applicable to resource allocation type 1, as defined in Subclause 6.3 of [6, TS 38.214].
- Modulation and coding scheme − 5 bits as defined in Subclause 6.1.4.1 of [6, TS 38.214]
- New data indicator − 1 bit
- Redundancy version − 2 bits as defined in Table 7.3.1.1.1-2
- HARQ process number − 4 bits
- 1st downlink assignment index − 1 or 2 bits:
  - 1 bit for semi-static HARQ-ACK codebook;
  - 2 bits for dynamic HARQ-ACK codebook.
- 2nd downlink assignment index − 0 or 2 bits:
  - 2 bits for dynamic HARQ-ACK codebook with two HARQ-ACK sub-codebooks;
  - 0 bit otherwise.
- TPC command for scheduled PUSCH − 2 bits as defined in Subclause 7.1.1 of [5, TS38.213]

- SRS resource indicator − $\left\lceil \log_2\left( \sum_{k=1}^{min\{L_{max},N_{SRS}\}} \binom{N_{SRS}}{k} \right) \right\rceil$ or $\lceil \log_2(N_{SRS}) \rceil$ bits, where $N_{SRS}$ is the number of configured SRS resources in the SRS resource set associated with the higher layer parameter usage of value 'codeBook' or 'nonCodeBook', $\left\lceil \log_2\left( \sum_{k=1}^{min\{L_{max},N_{SRS}\}} \binom{N_{SRS}}{k} \right) \right\rceil$ bits according to Tables 7.3.1.1.2-28/29/30/31 if the higher layer parameter txConfig = nonCodebook, where $N_{SRS}$ is the number of configured SRS resources in the SRS resource set associated with the higher layer parameter usage of value 'nonCodeBook' and
  - if UE supports operation with maxMIMO-Layers and the higher layer parameter maxMIMO-Layers of PUSCH-ServingCellConfig of the serving cell is configured, $L_{max}$ is given by that parameter
  - otherwise, $L_{max}$ is given by the maximum number of layers for PUSCH supported by the UE for the serving cell for non-codebook based operation.
  - $\lceil \log_2(N_{SRS}) \rceil$ bits according to Tables 7.3.1.1.2-32 if the higher layer parameter txConfig = codebook, where $N_{SRS}$ is the number of configured SRS resources in the SRS resource set associated with the higher layer parameter usage of value 'codeBook'.
- Precoding information and number of layers − number of bits determined
by the following:
  - 0 bits if the higher layer parameter txConfig = nonCodeBook;
  - 0 bits for 1 antenna port and if the higher layer parameter txConfig = codebook;
  - 4, 5, or 6 bits according to Table 7.3.1.1.2-2 for 4 antenna ports, if txConfig = codebook, and according to whether transform precoder is enabled or disabled, and the values of higher layer parameters maxRank,
    and codebookSubset;

TABLE 5-continued

- 2, 4, or 5 bits according to Table 7.3.1.1.2-3 for 4 antenna ports, if txConfig = codebook, and according to whether transform precoder is enabled or disabled, and the values of higher layer parameters maxRank,
  and codebookSubset;
- 2 or 4 bits according to Table 7.3.1.1.2-4 for 2 antenna ports, if txConfig = codebook, and according to whether transform precoder is enabled or disabled, and the values of higher layer parameters maxRank and codebookSubset;
- 1 or 3 bits according to Table7.3.1.1.2-5 for 2 antenna ports, if txConfig = codebook, and according to whether transform precoder is enabled or disabled, and the values of higher layer parameters maxRank and codebookSubset.
- Antenna ports – number of bits determined by the following
  - 2 bits as defined by Tables 7.3.1.1.2-6, if transform precoder is enabled, dmrs-Type=1, and maxLength=1;
  - 4 bits as defined by Tables 7.3.1.1.2-7, if transform precoder is enabled, dmrs-Type=1, and maxLength=2;
  - 3 bits as defined by Tables 7.3.1.1.2-8/9/10/11, if transform precoder is disabled, dmrs-Type=1, and maxLength=1, and the value of rank is determined according to the SRS resource indicator field if the higher layer parameter txConfig = nonCodebook and according to the Precoding information and number of layers field if the higher layer parameter txConfig = codebook;
  - 4 bits as defined by Tables 7.3.1.1.2-12/13/14/15, if transform precoder is disabled, dmrs-Type=1, and maxLength=2, and the value of rank is determined according to the SRS resource indicator field if the higher layer parameter txConfig = nonCodebook and according to the Precoding information and number of layers field if the higher layer parameter txConfig = codebook;
  - 4 bits as defined by Tables 7.3.1.1.2-16/17/18/19, if transform precoder is disabled, dmrs-Type=2, and maxLength=1, and the value of rank is determined according to the SRS resource indicator field if the higher layer parameter txConfig = nonCodebook and according to the Precoding information and number of layers field if the higher layer parameter txConfig = codebook;
  - 5 bits as defined by Tables 7.3.1.1.2-20/21/22/23, if transform precoder is disabled, dmrs-Type=2, and maxLength=2, and the value of rank is determined according to the SRS resource indicator field if the higher layer parameter txConfig = nonCodebook and according to the Precoding information and number of layers field if the higher layer parameter txConfig = codebook.
  where the number of CDM groups without data of values 1, 2, and 3 in Tables 7.3.1.1.2-6 to 7.3.1.1.2-23 refers to CDM groups {0}, {0,1}, and {0, 1,2} respectively.
  If a UE is configured with both dmrs-UplinkForPUSCH-MappingTypeA and dmrs-UplinkForPUSCH-MappingTypeB, the bitwidth of this field equals max$\{x_A, x_B\}$, where $x_A$ is the "Antenna ports" bitwidth derived according to dmrs-UplinkForPUSCH-MappingTypeA and $x_B$ is the "Antenna ports" bitwidth derived according to dmrs-UplinkForPUSCH-MappingTypeB. A number of $|x_A - x_B|$ zeros are padded in the MSB of this field, if the mapping type of the PUSCH corresponds to the smaller value of $x_A$ and $x_B$.
- SRS request – 2 bits as defined by Table 7.3.1.1.2-24 for UEs not configured with supplementaryUplink in ServingCellConfig in the cell;
  3 bits for UEs configured with supplementaryUplink in ServingCellConfig in the cell where the first bit is the non-SUL/SUL indicator as defined in Table 7.3.1.1.1-1 and the second and third bits are defined by Table 7.3.1.1.2-24. This bit field may also indicate the associated CSI-RS according to Subclause 6.1.1.2 of [6, TS 38.214].
- CSI request – 0, 1, 2, 3, 4, 5, or 6 bits determined by higher layer parameter reportTriggerSize.
- CBG transmission information (CBGTI) – 0 bit if higher layer parameter codeBlockGroupTransmission for PDSCH is not configured, otherwise, 2, 4, 6, or 8 bits determined by higher layer parameter maxCodeBlockGroupsPerTransportBlock for PUSCH.
- PTRS-DMRS association – number of bits determined as follows
  - 0 bit if PTRS-UplinkConfig is not configured and transform precoder is disabled, or if transform precoder is enabled, or if maxRank=1;
  - 2 bits otherwise, where Table 7.3.1.1.2-25 and 7.3.1.1.2-26 are used to indicate the association between PTRS port(s) and DMRS port(s) for transmission of one PT-RS port and two PT-RS ports respectively, and the DMRS ports are indicated by the Antenna ports field.
  If "Bandwidth part indicator" field indicates a bandwidth part other than the active bandwidth part and the "PTRS-DMRS association" field is present for the indicated bandwidth part but not present for the active bandwidth part, the UE assumes the "PTRS-DMRS association" field is not present for the indicated bandwidth part.
- beta_offset indicator – 0 if the higher layer parameter betaOffsets = semiStatic; otherwise 2 bits as defined by Table 9.3-3 in [5, TS 38.213].
- DMRS sequence initialization – 0 bit if transform precoder is enabled; 1 bit if transform precoder is disabled.
- UL-SCH indicator – 1 bit. A value of "1" indicates UL-SCH shall be transmitted on the PUSCH and a value of "0" indicates UL-SCH shall not be transmitted on the PUSCH. Except for DCI format 0_1 with CRC scrambled by SP-CSI-RNTI, a UE is not expected to receive a DCI format 0_1 with UL-SCH indicator of "0" and CSI request of all zero(s).

DCI format 1_0 may be used for fallback DCI that schedules a PDSCH, in which case the CRC may be scrambled by a C-RNTI. The DCI format 1_0 with the CRC scrambled by the C-RNTI may include, for example, the following information of Table 6.

TABLE 6

- Identifier for DCI formats-1 bit
  - The value of this bit field is always set to 1, indicating a DL DCI format
- Frequency domain resource assignment – $\lceil \log_2 (N_{RB}^{DL,BWP} (N_{RB}^{DL,BWP} +1)/2) \rceil$ bits where $N_{RB}^{DL,BWP}$ is given by subclause 7.3.1.0
If the CRC of the DCI format 1_0 is scrambled by C-RNTI and the "Frequency domain resource assignment" field are of all ones, the DCI format 1_0 is for random access procedure initiated by a PDCCH order, with all remaining fields set as follows:
  - Random Access Preamble index-6 bits according to ra-PreambleIndex in Subclause 5.1.2 of [8, TS38.321]
  - UL/SUL indicator-1 bit. If the value of the "Random Access Preamble index" is not all zeros and if the UE is configured with supplementaryUplink in ServingCellConfig in the cell, this field indicates which UL carrier in the cell to transmit the PRACH according to Table 7.3.1.1.1-1; otherwise, this field is reserved
  - SS/PBCH index-6 bits. If the value of the "Random Access Preamble index" is not all zeros, this field indicates the SS/PBCH that shall be used to determine the RACH occasion for the PRACH transmission; otherwise, this field is reserved.
  - PRACH Mask index-4 bits. If the value of the "Random Access Preamble index" is not all zeros, this field indicates the RACH occasion associated with the SS/PBCH indicated by "SS/PBCH index" for the PRACH transmission, according to Subclause 5.1.1 of [8, TS38.321]; otherwise, this field is reserved
  - Reserved bits-10 bits
Otherwise, all remaining fields are set as follows:
  - Time domain resource assignment-4 bits as defined in Subclause 5.1.2.1 of [6,
  - TS 38.214]
  - VRB-to-PRB mapping-1 bit according to Table 7.3.1.2.2-5
  - Modulation and coding scheme-5 bits as defined in Subclause 5.1.3 of [6, TS 38.214]
  - New data indicator-1 bit TABLE 6-continued

- Redundancy version-2 bits as defined in Table 7.3.1.1.1-2
- HARQ process number-4 bits
- Downlink assignment index-2 bits as defined in Subclause 9.1.3 of
  [5, TS38.213], as counter DAI
- TPC command for scheduled PUCCH-2 bits as defined in Subclause 7.2.1 of [5,
  TS 38.213]
- PUCCH resource indicator-3 bits as defined in Subclause 9.2.3 of
  [5, TS38.213]
- PDSCH-to-HARQ_feedback timing indicator-3 bits as defined in Subclause
  9.2.3 of [5, TS38.213]

DCI format 1_1 may be used for non-fallback DCI that schedules a PDSCH, in which case the CRC may be scrambled by a C-RNTI. The DCI format 1_1 with the CRC scrambled by the C-RNTI may include, for example, the following information of Table 7.

TABLE 7

- Identifier for DCI formats-1 bit
  - The value of this bit field is always set to 1, indicating a DL DCI format
- Carrier indicator-0 or 3 bits as defined in Subclause 10.1 of [5, TS 38.213].
- Bandwidth part indicator-0, 1 or 2 bits as determined by the number of DL
  BWPs $n_{BWP,RRC}$ configured by higher layers, excluding the initial DL bandwidth
  part. The bitwidth for this field is determined as $\lceil \log_2 (n_{BWP}) \rceil$ bits, where
  - $n_{BWP} = n_{BWP,RRC} + 1$ if $n_{BWP,RRC} \leq 3$, in which case the bandwidth part indicator is
    equivalent to the ascending order of the higher layer parameter BWP-Id;
  - otherwise $n_{BWP} = n_{BWP,RRC}$, in which case the bandwidth part indicator is defined
    in Table 7.3.1.1.2-1:
  If a UE does not support active BWP change via DCI, the UE ignores this bit
  field.
- Frequency domain resource assignment-number of bits determined by the
  following, where $N_{RB}^{DL,BWP}$ is the size of the active DL bandwidth part:
  - $N_{RBG}$ bits if only resource allocation type 0 is configured, where $N_{RBG}$ is
    defined in Subclause 5.1.2.2.1 of [6, TS38.214],
  - $\lceil \log_2 (N_{RB}^{DL,BWP} (N_{RB}^{DL,BWP} +1)/2) \rceil$ bits if only resource allocation type 1 is configured, or
  - max ($\lceil \log_2 (N_{RB}^{DL,BWP} (N_{RB}^{DL,BWP} +1)/2) \rceil$ , $N_{RBG}$ )+ 1 bits if both resource allocation
    type 0 and 1 are configured.
- If both resource allocation type 0 and 1 are configured, the MSB bit is used to
  indicate resource allocation type 0 or resource allocation type 1, where the bit
  value of 0 indicates resource allocation type 0 and the bit value of 1 indicates
  resource allocation type 1.
- For resource allocation type 0, the $N_{RBG}$ LSBs provide the resource allocation
  as defined in Subclause 5.1.2.2.1 of [6, TS 38.214].
- For resource allocation type 1, the $\lceil \log_2 (N_{RB}^{DL,BWP} (N_{RB}^{DL,BWP} +1)/2) \rceil$ LSBs provide
  the resource allocation as defined in Subclause 5.1.2.2.2 of [6, TS 38.214]
If "Bandwidth part indicator" field indicates a bandwidth part other than the
active bandwidth part and if both resource allocation type 0 and 1 are configured
for the indicated bandwidth part, the UE assumes resource allocation type 0 for
the indicated bandwidth part if the bitwidth of the "Frequency domain resource
assignment" field of the active bandwidth part is smaller than the bitwidth of the
"Frequency domain resource assignment" field of the indicated bandwidth part.
- Time domain resource assignment-0, 1, 2, 3, or 4 bits as defined in Subclause
  5.1.2.1 of [6, TS 38.214]. The bitwidth for this field is determined as $\lceil \log_2(I) \rceil$ bits,
  where I is the number of entries in the higher layer parameter pdsch-
  TimeDomainAllocationList if the higher layer parameter is configured; otherwise
  I is the number of entries in the default table.
- VRB-to-PRB mapping-0 or 1 bit:
  - 0 bit if only resource allocation type 0 is configured or if interleaved VRB-to-
    PRB mapping is not configured by high layers;
  -1 bit according to Table 7.3.1.2.2-5 otherwise, only applicable to resource
    allocation type 1, as defined in Subclause 7.3.1.6 of [4, TS 38.211].
- PRB bundling size indicator-0 bit if the higher layer parameter prb-
  BundlingType is not configured or is set to 'static', or 1 bit if the higher layer
  parameter prb-BundlingType is set to 'dynamic' according to Subclause 5.1.2.3 of
  [6, TS 38.214].
- Rate matching indicator-0, 1, or 2 bits according to higher layer parameters
  rateMatchPatternGroup1 and rateMatchPatternGroup2, where the MSB is used
  to indicate rateMatchPatternGroup1 and the LSB is used to indicate
  rateMatchPatternGroup2 when there are two groups.

TABLE 7-continued

- ZP CSI-RS trigger-0, 1, or 2 bits as defined in Subclause 5.1.4.2 of [6, TS 38.214]. The bitwidth for this field is determined as $\lceil \log_2 (n_{ZP} +1) \rceil$ bits, where $n_{ZP}$ is the number of aperiodic ZP CSI-RS resource sets configured by higher layer.

For transport block 1:
  - Modulation and coding scheme-5 bits as defined in Subclause 5.1.3.1 of [6, TS 38.214]
  - New data indicator-1 bit
  - Redundancy version-2 bits as defined in Table 7.3.1.1.1-2

For transport block 2 (only present if maxNrofCodeWordsScheduledByDCI equals 2):
  - Modulation and coding scheme-5 bits as defined in Subclause 5.1.3.1 of [6, TS 38.214]
  - New data indicator-1 bit
  - Redundancy version-2 bits as defined in Table 7.3.1.1.1-2

If "Bandwidth part indicator" field indicates a bandwidth part other than the active bandwidth part and the value of maxNrofCodeWordsScheduledByDCI for the indicated bandwidth part equals 2 and the value of maxNrofCodeWordsScheduledByDCI for the active bandwidth part equals 1, the UE assumes zeros are padded when interpreting the "Modulation and coding scheme", "New data indicator", and "Redundancy version" fields of transport block 2 according to Subclause 12 of [5, TS38.213], and the UE ignores the "Modulation and coding scheme", "New data indicator", and "Redundancy version" fields of transport block 2 for the indicated bandwidth part.

- HARQ process number-4 bits
- Downlink assignment index-number of bits as defined in the following
  - 4 bits if more than one serving cell are configured in the DL and the higher layer parameter pdsch-HARQ-ACK-Codebook=dynamic, where the 2 MSB bits are the counter DAI and the 2 LSB bits are the total DAI;
  - 2 bits if only one serving cell is configured in the DL and the higher layer parameter pdsch-HARQ-ACK-Codebook=dynamic, where the 2 bits are the counter DAI;
  - 0 bits otherwise.
- TPC command for scheduled PUCCH-2 bits as defined in Subclause 7.2.1 of [5, TS 38.213]
- PUCCH resource indicator-3 bits as defined in Subclause 9.2.3 of [5, TS 38.213]
- PDSCH-to-HARQ_feedback timing indicator-0, 1, 2, or 3 bits as defined in Subclause 9.2.3 of [5, TS 38.213]. The bitwidth for this field is determined as $\lceil \log_{2(I)} \rceil$ bits, where I is the number of entries in the higher layer parameter dl-DataToUL-ACK.
- Antenna port(s)-4, 5, or 6 bits as defined by Tables 7.3.1.2.2-1/2/3/4, where the number of CDM groups without data of values 1, 2, and 3 refers to CDM groups $\{0\}$, $\{0, 1\}$, and $\{0, 1, 2\}$ respectively. The antenna ports $\{p_0,...,p_{\upsilon-1}\}$ shall be determined according to the ordering of DMRS port(s) given by Tables 7.3.1.2.2-1/2/3/4.

If a UE is configured with both dmrs-DownlinkForPDSCH-MappingTypeA and dmrs-DownlinkForPDSCH-MappingTypeB, the bitwidth of this field equals $\max\{x_A, x_B\}$, where $x_A$ is the "Antenna ports" bitwidth derived according to dmrs-DownlinkForPDSCH-MappingTypeA and $x_B$ is the "Antenna ports" bitwidth derived according to dmrs-DownlinkForPDSCH-MappingTypeB. A number of $|x_A - x_B|$ zeros are padded in the MSB of this field, if the mapping type of the PDSCH corresponds to the smaller value of $x_A$ and $x_B$.
- Transmission configuration indication-0 bit if higher layer parameter tci-PresentInDCI is not enabled; otherwise 3 bits as defined in Subclause 5.1.5 of [6, TS38.214].

If "Bandwidth part indicator" field indicates a bandwidth part other than the active bandwidth part,
  - if the higher layer parameter tci-PresentInDCI is not enabled for the CORESET used for the PDCCH carrying the DCI format 1_1,
    - the UE assumes tci-PresentInDCI is not enabled for all CORESETs in the indicated bandwidth part;
  - otherwise,
    - the UE assumes tci-PresentInDCI is enabled for all CORESETs in the indicated bandwidth part.
- SRS request-2 bits as defined by Table 7.3.1.1.2-24 for UEs not configured with supplementaryUplink in ServingCellConfig in the cell; 3 bits for UEs configured with supplementaryUplink in ServingCellConfig in the cell where the first bit is the non-SUL/SUL indicator as defined in Table 7.3.1.1.1-1 and the second and third bits are defined by Table 7.3.1.1.2-24. This bit field may also indicate the associated CSI-RS according to Subclause 6.1.1.2 of [6, TS 38.214].
- CBG transmission information (CBGTI)-0 bit if higher layer parameter codeBlockGroupTransmission for PDSCH is not configured, otherwise, 2, 4, 6, or 8 bits as defined in Subclause 5.1.7 of [6, TS38.214], determined by the higher layer parameters maxCodeBlockGroupsPerTransportBlock and maxNrofCodeWordsScheduledByDCI for the PDSCH.
- CBG flushing out information (CBGFI)-1 bit if higher layer parameter codeBlockGroupFlushIndicator is configured as "TRUE", 0 bit otherwise.
- DMRS sequence initialization-1 bit.

A method of allocating a time domain resource for a data channel in the 5G wireless communication system is described in greater detail below.

The BS may configure, in the UE, a table regarding time domain resource allocation information for a PDSCH and a PUSCH, via higher layer signaling (e.g., RRC signaling). For the PDSCH, a table including up to 16 (maxNrofDL-Allocations=16) entries may be configured, and for the PUSCH, a table including up to 16 (maxNrofUL-Allocations=16) entries may be configured. The time domain resource allocation information may include, for example, a PDCCH-to-PDSCH slot timing (corresponding to a time period in a slot unit between a time point when the PDCCH is received and a time point when the PDSCH scheduled by the received PDCCH is transmitted, indicated by K0), or a PDCCH-to-PUSCH slot timing (corresponding to a time period in a slot unit between a time point when the PDCCH is received and a time point when the PUSCH scheduled by the received PDCCH is transmitted, indicated by K2), information about a location and length of a start symbol where the PDSCH or the PUSCH is scheduled within a slot, and a mapping type of the PDSCH or the PUSCH. For example, the BS may notify the UE of a plurality of pieces of information as shown in Table 8 and Table 9 below.

TABLE 8

PDSCH-TimeDomainResourceAllocationList information element
PDSCH-TimeDomainResourceAllocationList ::= SEQUENCE (SIZE(1..maxNrofDL-Allocations)) OF PDSCH-TimeDomainResourceAllocation
PDSCH-TimeDomainResourceAllocation ::= SEQUENCE {
  k0                                                     INTEGER(0..32)
OPTIONAL,   -- Need S
  (PDCCH-to-PDSCH timing, slot unit)
  mappingType                            ENUMERATED {typeA, typeB},
  (PDSCH mapping type)
  startSymbolAndLength            INTEGER (0..127)
  (start symbol and length of PDSCH)
}

TABLE 9

PUSCH-TimeDomainResourceAllocation information element
PUSCH-TimeDomainResourceAllocationList ::= SEQUENCE (SIZE(1..maxNrofUL-Allocations)) OF PUSCH-TimeDomainResourceAllocation
PUSCH-TimeDomainResourceAllocation ::= SEQUENCE {
  k2                                                    INTEGER(0..32)
OPTIONAL,   -- Need S
  (PDCCH-to-PUSCH timing, slot unit)
  mappingType                              ENUMERATED {typeA, typeB},
  (PUSCH mapping type)
  startSymbolAndLength            INTEGER (0..127)
  (start symbol and length of PUSCH)
}

The BS may notify the UE of at least one of the entries in the table about the time domain resource allocation information by L1 signaling (e.g., in DCI, especially indicated by a 'time domain resource allocation' field in the DCI). The UE may obtain the time domain resource allocation information for the PDSCH or the PUSCH, based on the DCI received from the BS.

A method of allocating a frequency domain resource for a data channel in the 5G wireless communication system is described in detail below.

In the 5G wireless communication system, two types (i.e., a resource allocation type 0 and a resource allocation type 1), are supported as a method of indicating frequency domain resource allocation information for a PDSCH and a PUSCH.

Resource Allocation Type 0

RB allocation information may be notified from the BS to the UE in a form of a bitmap for a resource block group (RBG). In this case, the RBG may include a set of consecutive virtual RBs (VRBs), and a size P of the RBG may be determined based on a value configured by a higher layer parameter rbg-Size and a size value of a BWP defined in Table 10 below.

TABLE 10

| | Nominal RBG size P | |
|---|---|---|
| Bandwidth Part Size | Configuration 1 | Configuration 2 |
| 1-36 | 2 | 4 |
| 37-72 | 4 | 8 |
| 73-144 | 8 | 16 |
| 145-275 | 16 | 16 |

Total number of RBGs ($N_{RBG}$) of a BWP i having a size of $N_{BWPi}^{size}$ may be defined as follows in Equation (1)

$$N_{RBG} = \lceil (N_{BWP,i}^{size} + (N_{BWP,i}^{start} \bmod P)) \rceil, \text{ where} \quad (1)$$

the size of the first RBG is $RBG_0^{size} = P - N_{BWP,i}^{start}, \bmod P$, the size of last RBG is $RBG_{last}^{size} = (N_{BWP,i}^{start} + N_{BWP,i}^{size}) \bmod P$ if $(N_{BWP,i}^{start} + N_{BWP,i}^{size}) \bmod P > 0$ and P otherwise, the size of all other RBGs is p.

Each bit of a bitmap having a $N_{RBG}$ bit size may correspond to each RBG. The RBGs may be assigned indexes in an increasing order of a frequency from the lowest frequency of a BWP. Regarding the $N_{RBG}$ RBGs within the BWP, RBG #0 to RBG #($N_{RBG}$−1) may be mapped from a most significant bit (MSB) to a least significant bit (LSB) of an RBG bitmap. When a particular bit value in the bitmap is 1, the UE may determine that an RBG corresponding to the particular bit value is allocated, and when the particular bit value in the bitmap is 0, the UE may determine that the RBG corresponding to the particular bit value is not allocated.

Resource Allocation Type 1

RB allocation information may be notified from the BS to the UE via information about a start location and length of consecutively allocated VRBs. In this case, interleaving or non-interleaving may be additionally applied to the consecutively allocated VRBs. A resource allocation field of the resource allocation type 1 may include a resource indication value (MV), and the MV may include a start point $RB_{start}$ of a VRB and a length $L_{RBs}$−1 of consecutively allocated RBs. In more detail, the MV within a BWP having a size of $N_{BWP}^{size}$ may be defined as shown in Equation (2) below.

$$\text{if } (L_{RBs} - 1) \le \lfloor N_{BWP}^{size} / 2 \rfloor \text{ then}$$

$$RIV = N_{BWP}^{size}(L_{RBs} - 1) + RB_{start}$$

else $$RIV = N_{BWP}^{size}\left(N_{BWP}^{size} - L_{RBs} + 1\right) + \left(N_{BWP}^{size} - 1 - RB_{start}\right)$$

where $L_{RBs} \ge 1$ and shall not exceed $N_{BWP}^{size} - RB_{start}$. (2)

The BS may configure a resource allocation type in the UE via higher layer signaling (e.g., a higher layer parameter resourceAllocation may be configured as one of resourceAllocationType0, resourceAllocationType1, or dynamicSwitch.). When the UE is configured with both the resource allocation type 0 and the resource allocation type 1 (or equally when higher layer parameter resourceAllocation is configured as dynamicSwitch), the BS may indicate whether a bit corresponding to an MSB of a field indicating resource allocation in a DCI format indicating scheduling is the resource allocation type 0 or the resource allocation type 1. Also, based on the indicated resource allocation type, resource allocation information may be indicated in remaining bits except for the bit corresponding to the MSB, and the UE may identify resource allocation field information of a DCI field based on the resource allocation information. When the UE is configured with one of the resource allocation type 0 or the resource allocation type 1 (or equally when the higher layer parameter resourceAllocation is configured as one of resourceAllocationType0 or resourceAllocationType1), resource allocation information may be indicated based on a resource allocation type for which a field indicating resource allocation in a DCI format indicating scheduling is configured, and the UE may identify resource allocation field information of a DCI field based on the resource allocation information.

An MCS used in the 5G wireless communication system is described in greater detail below.

In 5G, a plurality of MCS index tables is defined for PDSCH and PUSCH scheduling. Which MCS index table the UE is to assume among the plurality of MCS index tables may be configured or indicated via higher layer signaling or L1 signaling from the BS to the UE, or via an RNTI value assumed by the UE when a PDCCH is decoded.

MCS index table 1 for a PDSCH and a cyclic prefix (CP)-OFDM-based PUSCH (or PUSCH without transform precoding) may be as shown in Table 11 below.

TABLE 11

MCS index table 1 for PDSCH
Table 5.1.3.1-1: MCS index table 1 for PDSCH

| MCS Index $I_{MCS}$ | Modulation Order $Q_m$ | Target code Rate R × [1024] | Spectral efficiency |
|---|---|---|---|
| 0 | 2 | 120 | 0.2344 |
| 1 | 2 | 157 | 0.3066 |
| 2 | 2 | 193 | 0.3770 |
| 3 | 2 | 251 | 0.4902 |
| 4 | 2 | 308 | 0.6016 |
| 5 | 2 | 379 | 0.7402 |
| 6 | 2 | 449 | 0.8770 |
| 7 | 2 | 526 | 1.0273 |
| 8 | 2 | 602 | 1.1758 |
| 9 | 2 | 679 | 1.3262 |
| 10 | 4 | 340 | 1.3281 |
| 11 | 4 | 378 | 1.4766 |
| 12 | 4 | 434 | 1.6953 |
| 13 | 4 | 490 | 1.9141 |
| 14 | 4 | 553 | 2.1602 |
| 15 | 4 | 616 | 2.4063 |
| 16 | 4 | 658 | 2.5703 |
| 17 | 6 | 438 | 2.5664 |
| 18 | 6 | 466 | 2.7305 |
| 19 | 6 | 517 | 3.0293 |
| 20 | 6 | 567 | 3.3223 |
| 21 | 6 | 616 | 3.6094 |
| 22 | 6 | 666 | 3.9023 |
| 23 | 6 | 719 | 4.2129 |
| 24 | 6 | 772 | 4.5234 |
| 25 | 6 | 822 | 4.8164 |
| 26 | 6 | 873 | 5.1152 |
| 27 | 6 | 910 | 5.3320 |
| 28 | 6 | 948 | 5.5547 |
| 29 | 2 | reserved | |
| 30 | 4 | reserved | |
| 31 | 6 | reserved | |

MCS index table 2 for a PDSCH and a CP-OFDM-based PUSCH (or PUSCH without transform precoding) may be as shown in Table 12 below.

TABLE 12

MCS index table 2 for PDSCH
Table 5.1.3.1-2: MCS index table 2 for PDSCH

| MCS Index $I_{MCS}$ | Modulation Order $Q_m$ | Target code Rate R × [1024] | Spectral efficiency |
|---|---|---|---|
| 0 | 2 | 120 | 0.2344 |
| 1 | 2 | 193 | 0.3770 |
| 2 | 2 | 308 | 0.6016 |
| 3 | 2 | 449 | 0.8770 |
| 4 | 2 | 602 | 1.1758 |
| 5 | 4 | 378 | 1.4766 |
| 6 | 4 | 434 | 1.6953 |
| 7 | 4 | 490 | 1.9141 |
| 8 | 4 | 553 | 2.1602 |
| 9 | 4 | 616 | 2.4063 |
| 10 | 4 | 658 | 2.5703 |
| 11 | 6 | 466 | 2.7305 |
| 12 | 6 | 517 | 3.0293 |
| 13 | 6 | 567 | 3.3223 |
| 14 | 6 | 616 | 3.6094 |
| 15 | 6 | 666 | 3.9023 |
| 16 | 6 | 719 | 4.2129 |
| 17 | 6 | 772 | 4.5234 |
| 18 | 6 | 822 | 4.8164 |
| 19 | 6 | 873 | 5.1152 |
| 20 | 8 | 682.5 | 5.3320 |
| 21 | 8 | 711 | 5.5547 |

TABLE 12-continued

MCS index table 2 for PDSCH
Table 5.1.3.1-2: MCS index table 2 for PDSCH

| MCS Index $I_{MCS}$ | Modulation Order $Q_m$ | Target code Rate R × [1024] | Spectral efficiency |
|---|---|---|---|
| 22 | 8 | 754 | 5.8906 |
| 23 | 8 | 797 | 6.2266 |
| 24 | 8 | 841 | 6.5703 |
| 25 | 8 | 885 | 6.9141 |
| 26 | 8 | 916.5 | 7.1602 |
| 27 | 8 | 948 | 7.4063 |
| 28 | 2 | reserved | |
| 29 | 4 | reserved | |
| 30 | 6 | reserved | |
| 31 | 8 | reserved | |

MCS index table 3 for a PDSCH and a CP-OFDM-based PUSCH (or PUSCH without transform precoding) may be as shown in Table 13 below.

TABLE 13

MCS index table 3 for PDSCH
Table 5.1.3.1-3: MCS index table 3 for PDSCH

| MCS Index $I_{MCS}$ | Modulation Order $Q_m$ | Target code Rate R × [1024] | Spectral efficiency |
|---|---|---|---|
| 0 | 2 | 30 | 0.0586 |
| 1 | 2 | 40 | 0.0781 |
| 2 | 2 | 50 | 0.0977 |
| 3 | 2 | 64 | 0.1250 |
| 4 | 2 | 78 | 0.1523 |
| 5 | 2 | 99 | 0.1934 |
| 6 | 2 | 120 | 0.2344 |
| 7 | 2 | 157 | 0.3066 |
| 8 | 2 | 193 | 0.3770 |
| 9 | 2 | 251 | 0.4902 |
| 10 | 2 | 308 | 0.6016 |
| 11 | 2 | 379 | 0.7402 |
| 12 | 2 | 449 | 0.8770 |
| 13 | 2 | 526 | 1.0273 |
| 14 | 2 | 602 | 1.1758 |
| 15 | 4 | 340 | 1.3281 |
| 16 | 4 | 378 | 1.4766 |
| 17 | 4 | 434 | 1.6953 |
| 18 | 4 | 490 | 1.9141 |
| 19 | 4 | 553 | 2.1602 |
| 20 | 4 | 616 | 2.4063 |
| 21 | 6 | 438 | 2.5664 |
| 22 | 6 | 466 | 2.7305 |
| 23 | 6 | 517 | 3.0293 |
| 24 | 6 | 567 | 3.3223 |
| 25 | 6 | 616 | 3.6094 |
| 26 | 6 | 666 | 3.9023 |
| 27 | 6 | 719 | 4.2129 |
| 28 | 6 | 772 | 4.5234 |
| 29 | 2 | reserved | |
| 30 | 4 | reserved | |
| 31 | 6 | reserved | |

MCS index table 1 for a discrete Fourier transform-spread (DFT-s)-OFDM-based PUSCH (or PUSCH with transform precoding) may be as shown in Table 14 below.

TABLE 14

MCS index table for PUSCH with transform precoding and 64 quadrature amplitude modulation (QAM)
Table 6.1.4.1-1: MCS index table for PUSCH with transform precoding and 64QAM

| MCS Index $I_{MCS}$ | Modulation Order $Q_m$ | Target code Rate R × 1024 | Spectral efficiency |
|---|---|---|---|
| 0 | q | 240/q | 0.2344 |
| 1 | q | 314/q | 0.3066 |
| 2 | 2 | 193 | 0.3770 |
| 3 | 2 | 251 | 0.4902 |
| 4 | 2 | 308 | 0.6016 |
| 5 | 2 | 379 | 0.7402 |
| 6 | 2 | 449 | 0.8770 |
| 7 | 2 | 526 | 1.0273 |
| 8 | 2 | 602 | 1.1758 |
| 9 | 2 | 679 | 1.3262 |
| 10 | 4 | 340 | 1.3281 |
| 11 | 4 | 378 | 1.4766 |
| 12 | 4 | 434 | 1.6953 |
| 13 | 4 | 490 | 1.9141 |
| 14 | 4 | 553 | 2.1602 |
| 15 | 4 | 616 | 2.4063 |
| 16 | 4 | 658 | 2.5703 |
| 17 | 6 | 466 | 2.7305 |
| 18 | 6 | 517 | 3.0293 |
| 19 | 6 | 567 | 3.3223 |
| 20 | 6 | 616 | 3.6094 |
| 21 | 6 | 666 | 3.9023 |
| 22 | 6 | 719 | 4.2129 |
| 23 | 6 | 772 | 4.5234 |
| 24 | 6 | 822 | 4.8164 |
| 25 | 6 | 873 | 5.1152 |
| 26 | 6 | 910 | 5.3320 |
| 27 | 6 | 948 | 5.5547 |
| 28 | q | reserved | |
| 29 | 2 | reserved | |
| 30 | 4 | reserved | |
| 31 | 6 | reserved | |

MCS index table 2 for a DFT-s-OFDM-based PUSCH (or PUSCH with transform precoding) may be as shown in Table 15 below.

TABLE 15

MCS index table 2 for PUSCH with transform precoding and 64 QAM
Table 6.1.4.1-2: MCS index table 2 for PUSCH with transform precoding and 64QAM

| MCS Index $I_{MCS}$ | Modulation Order $Q_m$ | Target code Rate R × 1024 | Spectral efficiency |
|---|---|---|---|
| 0 | q | 60/q | 0.0586 |
| 1 | q | 80/q | 0.0781 |
| 2 | q | 100/q | 0.0977 |
| 3 | q | 128/q | 0.1250 |
| 4 | q | 156/q | 0.1523 |
| 5 | q | 198/q | 0.1934 |
| 6 | 2 | 120 | 0.2344 |
| 7 | 2 | 157 | 0.3066 |
| 8 | 2 | 193 | 0.3770 |
| 9 | 2 | 251 | 0.4902 |
| 10 | 2 | 308 | 0.6016 |
| 11 | 2 | 379 | 0.7402 |
| 12 | 2 | 449 | 0.8770 |
| 13 | 2 | 526 | 1.0273 |
| 14 | 2 | 602 | 1.1758 |
| 15 | 2 | 679 | 1.3262 |
| 16 | 4 | 378 | 1.4766 |
| 17 | 4 | 434 | 1.6953 |
| 18 | 4 | 490 | 1.9141 |
| 19 | 4 | 553 | 2.1602 |
| 20 | 4 | 616 | 2.4063 |
| 21 | 4 | 658 | 2.5703 |
| 22 | 4 | 699 | 2.7305 |

TABLE 15-continued

MCS index table 2 for PUSCH with
transform precoding and 64 QAM
Table 6.1.4.1-2: MCS index table 2 for PUSCH
with transform precoding and 64QAM

| MCS Index $I_{MCS}$ | Modulation Order $Q_m$ | Target code Rate R × 1024 | Spectral efficiency |
|---|---|---|---|
| 23 | 4 | 772 | 3.0156 |
| 24 | 6 | 567 | 3.3223 |
| 25 | 6 | 616 | 3.6094 |
| 26 | 6 | 666 | 3.9023 |
| 27 | 6 | 772 | 4.5234 |
| 28 | q | reserved | |
| 29 | 2 | reserved | |
| 30 | 4 | reserved | |
| 31 | 6 | reserved | |

An MCS index table for a PUSCH to which transform precoding or DFT precoding and 64 QAM are applied may be as shown in Table 16 below.

TABLE 16

| MCS Index $I_{MCS}$ | Modulation Order $Q_m$ | Target code Rate R × 1024 | Spectral efficiency |
|---|---|---|---|
| 0 | q | 240/q | 0.2344 |
| 1 | q | 314/q | 0.3066 |
| 2 | 2 | 193 | 0.3770 |
| 3 | 2 | 251 | 0.4902 |
| 4 | 2 | 308 | 0.6016 |
| 5 | 2 | 379 | 0.7402 |
| 6 | 2 | 449 | 0.8770 |
| 7 | 2 | 526 | 1.0273 |
| 8 | 2 | 602 | 1.1758 |
| 9 | 2 | 679 | 1.3262 |
| 10 | 4 | 340 | 1.3281 |
| 11 | 4 | 378 | 1.4766 |
| 12 | 4 | 434 | 1.6953 |
| 13 | 4 | 490 | 1.9141 |
| 14 | 4 | 553 | 2.1602 |
| 15 | 4 | 616 | 2.4063 |
| 16 | 4 | 658 | 2.5703 |
| 17 | 6 | 466 | 2.7305 |
| 18 | 6 | 517 | 3.0293 |
| 19 | 6 | 567 | 3.3223 |
| 20 | 6 | 616 | 3.6094 |
| 21 | 6 | 666 | 3.9023 |
| 22 | 6 | 719 | 4.2129 |
| 23 | 6 | 772 | 4.5234 |
| 24 | 6 | 822 | 4.8164 |
| 25 | 6 | 873 | 5.1152 |
| 26 | 6 | 910 | 5.3320 |
| 27 | 6 | 948 | 5.5547 |
| 28 | q | reserved | |
| 29 | 2 | reserved | |
| 30 | 4 | reserved | |
| 31 | 6 | reserved | |

An MCS index table for a PUSCH to which transform precoding or DFT precoding and 64 QAM are applied may be as shown in Table 17 below.

TABLE 17

| MCS Index $I_{MCS}$ | Modulation Order $Q_m$ | Target code Rate R × 1024 | Spectral efficiency |
|---|---|---|---|
| 0 | q | 60/q | 0.0586 |
| 1 | q | 80/q | 0.0781 |
| 2 | q | 100/q | 0.0977 |
| 3 | q | 128/q | 0.1250 |
| 4 | q | 156/q | 0.1523 |
| 5 | q | 198/q | 0.1934 |
| 6 | 2 | 120 | 0.2344 |
| 7 | 2 | 157 | 0.3066 |
| 3 | 2 | 193 | 0.3770 |
| 9 | 2 | 251 | 0.4902 |
| 10 | 2 | 308 | 0.6016 |
| 11 | 2 | 379 | 0.7402 |
| 12 | 2 | 449 | 0.8770 |
| 13 | 2 | 526 | 1.0273 |
| 14 | 2 | 602 | 1.1758 |
| 15 | 2 | 679 | 1.3262 |
| 16 | 4 | 378 | 1.4766 |
| 17 | 4 | 434 | 1.6953 |
| 18 | 4 | 490 | 1.9141 |
| 19 | 4 | 553 | 2.1602 |
| 20 | 4 | 616 | 2.4063 |
| 21 | 4 | 658 | 2.5703 |
| 22 | 4 | 699 | 2.7305 |
| 23 | 4 | 772 | 3.0156 |
| 24 | 6 | 567 | 3.3223 |
| 25 | 6 | 616 | 3.6094 |
| 26 | 6 | 666 | 3.9023 |
| 27 | 6 | 772 | 4.5234 |
| 28 | q | reserved | |
| 29 | 2 | reserved | |
| 30 | 4 | reserved | |
| 31 | 6 | reserved | |

A DL control channel in the 5G wireless communication system is described in greater detail below with reference to the drawings.

Figure 4:
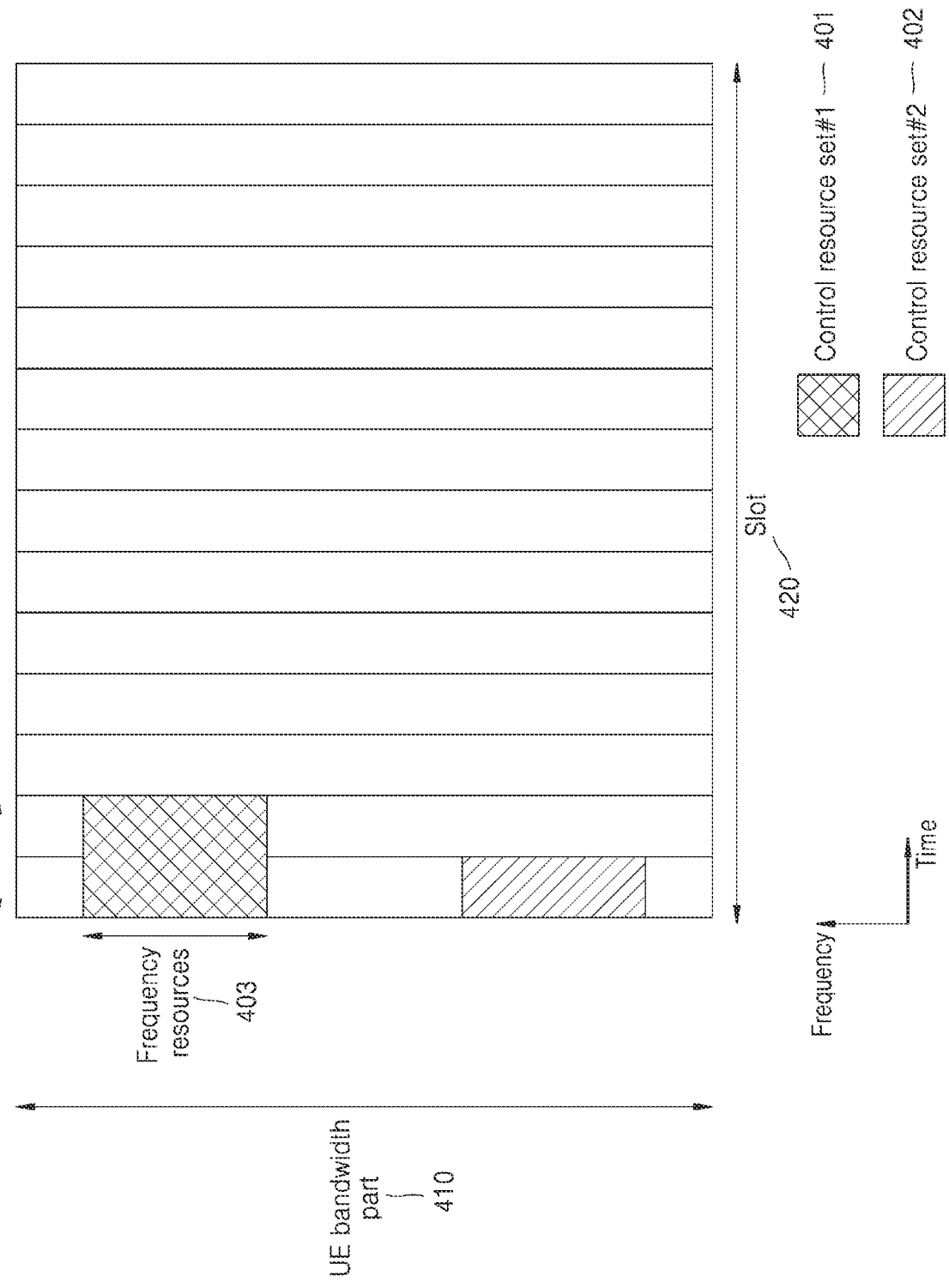
FIG. 4 is a diagram illustrating an example of a control resource set on which a downlink control channel is transmitted in a wireless communication system, according to an embodiment.

FIG. 4 is a diagram illustrating an example of a CORE-SET on which a SL control channel is transmitted in a wireless communication system, according to an embodiment.

Referring to FIG. 4, a UE BWP 410 may be configured in the frequency axis, and two CORESETs (a CORESET #1 401 and a CORESET #2 402) may be configured within one slot 420 in the time axis. The CORESETs 401 and 402 may be configured in a particular frequency resource 403 in the entire UE BWP 410 in the frequency axis. Also, the CORE-SETs 401 and 402 may be configured with one or more OFDM symbols in the time axis and may be defined as a CORESET duration 404. As shown in FIG. 4, the CORE-SET #1 401 is configured with a CORESET duration of two symbols, and the CORESET #2 402 is configured with a CORESET duration of one symbol.

In the 5G wireless communication system described above, the BS may configure each CORESET in the UE via higher layer signaling (e.g., SI, MIB, or RRC signaling). When the CORESET is configured for the UE, it means that information such as a CORESET ID, a frequency location of the CORESET, and a symbol length of the CORESET is provided to the UE. For example, the following information of Table 18 may be included.

TABLE 18

```
ControlResourceSet ::=        SEQUENCE {
-- Corresponds to L1
parameter 'CORESET-ID'
controlResourceSetId          ControlResource-
                                  SetId,
(Control resource set identity)
frequencyDomainResources      BIT STRING
                                  (SIZE (45)),
```

TABLE 18-continued

```
(Frequency axis resource allocation informa-
tion)
  duration                    INTEGER (1..
                                maxCoReSetDuration),
  (Time axis resource allocation information)
  cce-REG-MappingType         CHOICE {
    interleaved               SEQUENCE {
      reg-BundleSize           ENUMERATED
                                 {n2, n3, n6},
      precoderGranularity      ENUMERATED
                                 {sameAsREG-
    bundle, allContiguousRBs},
      interleaverSize          ENUMERATED
                                 {n2, n3, n6}
      shiftIndex
      INTEGER(0..maxNrofPhysicalResourceBlocks-1)
      OPTIONAL
      (Interleaver Shift)
    },
    nonInterleaved            NULL
  },
  tci-StatesPDCCH             SEQUENCE
                                (SIZE (1..maxN-
                                 rofTCI-
    StatesPDCCH)) OF TCI-      OPTIONAL,
  StateId
  (QCL configuration information)
  tci-PresentInDCI            ENUMERATED
                                 {enabled}
                                 OPTIONAL, -- Need S
}
```

In Table 18, tci-StatesPDCCH (simply referred to as transmission configuration indication (TCI) state) configuration information may include information about one or more SS/PBCH block indexes having a QCL relationship with a DMRS transmitted in a corresponding CORESET or channel state information reference signal (CSI-RS) indexes.

Figure 5:
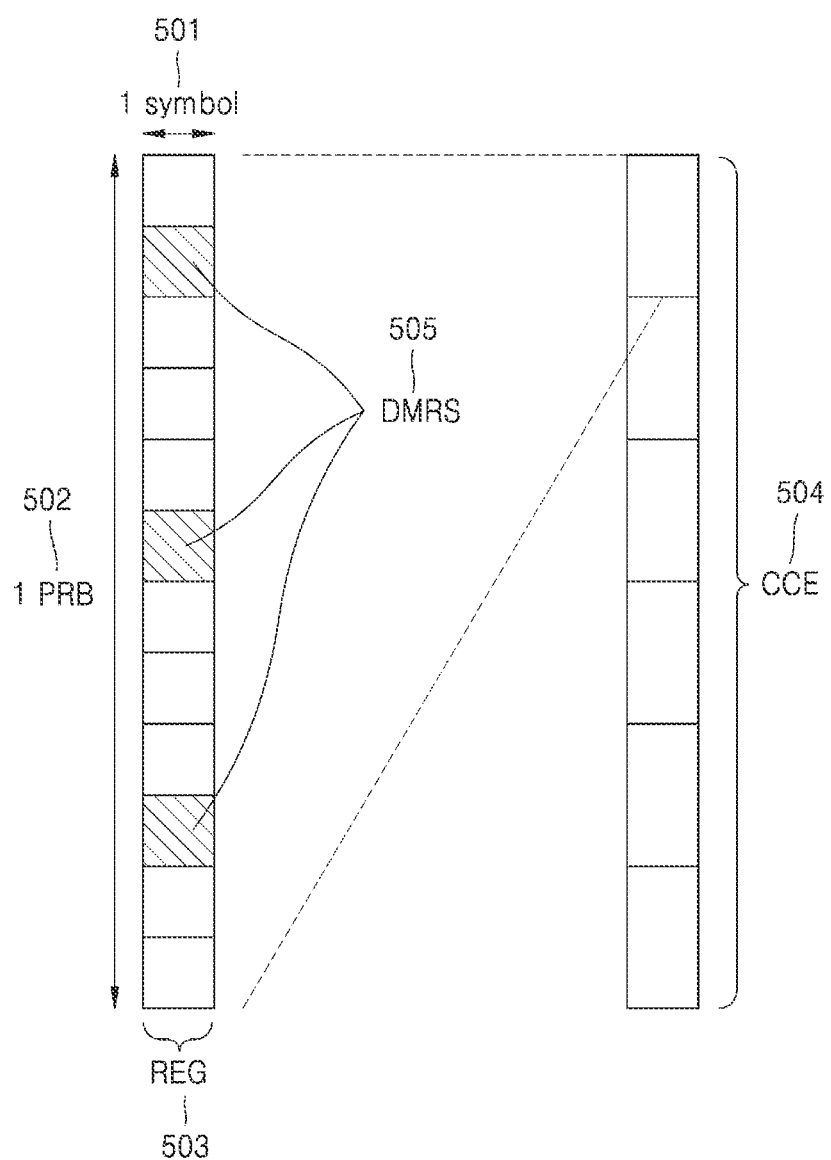
FIG. 5 is a diagram illustrating a structure of a downlink control channel of a wireless communication system, according to an embodiment.

FIG. 5 is a diagram illustrating a structure of a DL control channel of a wireless communication system, according to an embodiment.

That is, FIG. 5 is a diagram illustrating an example of a basic unit of time and frequency resources constituting a DL control channel that is usable in the 5G wireless communication system.

Referring to FIG. 5, a basic unit of time and frequency resources constituting a control channel is referred to as a resource element group (REG) 503. The REG 503 may be defined by one OFDM symbol 501 in the time axis and one physical resource block (PRB) 502 (i.e., 12 subcarriers), in the frequency axis. The BS may configure a DL control channel allocation unit by concatenating REGs 503.

As shown in FIG. 5, when a basic unit in which the DL control channel is allocated is referred to as a control channel element (CCE) 504 in the 5G wireless communication system, the one CCE 504 may include a plurality of REGs 503. For example, as shown in FIG. 5, the REG 503 may include 12 REs, and when one CCE 504 includes 6 REGs 503, the one CCE 504 may include 72 REs. When the DL CORESET is configured, the DL CORESET may include a plurality of CCEs 504, and a particular DL control channel may be transmitted by being mapped to one or more CCEs 504 based on an aggregation level (AL) in the CORESET. The CCEs 504 in the CORESET may be identified by numbers, which may be allocated to the CCEs 504 in a logical mapping method.

The basic unit of the DL control channel shown in FIG. 5 (i.e., the REG 503), may include both of REs to which DCI is mapped and regions to which a DMRS 505, which is a reference signal for decoding the REs, is mapped. As shown in FIG. 5, three DMRSs 505 may be transmitted in one REG 503. The number of CCEs required to transmit a PDCCH may be 1, 2, 4, 8, or 16 depending on the AL, and different numbers of CCEs may be used to implement link adaptation of the DL control channel. For example, when AL=L, one DL control channel may be transmitted in L CCEs. The UE needs to detect a signal while information about the DL control channel is not identified, and search space representing a set of CCEs is defined for blind decoding. The search space is a set of DL control channel candidates including CCEs that the UE needs to attempt to decode on a given AL. Because there are various ALs that form 1, 2, 4, 8, or 16 CCEs into one bundle, the UE may have a plurality of search spaces. A search space set may be defined as a set of search spaces at all configured ALs.

The search space may be classified into a common search space and a UE-specific search space. A certain group of UEs or all the UEs may monitor a common search space of the PDCCH in order to receive cell-common control information, such as, for example, a paging message or dynamic scheduling for SI. For example, PDSCH scheduling allocation information for transmission of an SIB including cell operator information or the like may be received by monitoring the common search space of the PDCCH. Because a certain group of UEs or all the UEs need to receive the PDCCH, the common search space may be defined as a set of pre-agreed CCEs. The UE may receive UE-specific PDSCH or PUSCH scheduling allocation information by monitoring the UE-specific search space of the PDCCH. The UE-specific search space is a function of a UE identity and various system parameters, and may be defined in a UE-specific manner.

In the 5G wireless communication system, parameters of the search space of the PDCCH may be configured for the UE by the BS via higher layer signaling (e.g., SIB, MIB, or RRC signaling). For example, the BS may configure, in the UE, the number of PDCCH candidates at each AL L, a monitoring period for a search space, a monitoring occasion in symbols within a slot for the search space, a search space type (i.e., a common search space or a UE-specific search space), a combination of an RNTI and a DCI format to be monitored in the search space, and an index of a CORESET for monitoring the search space. For example, the parameters for the search space of the PDCCH may include the following information of Table 19.

TABLE 19

```
SearchSpace ::=                   SEQUENCE {
-- Identity of the search
space. SearchSpaceId =
0 identifies the SearchSpace
  configured via PBCH (MIB) or
  ServingCellConfigCommon.
searchSpaceId                      SearchSpaceId,
(Search space identity)
controlResourceSetId               ControlResource-
                                     SetId,
(Control resource set identity)
monitoringSlotPeriodicityAnd-      CHOICE {
Offset
(Monitoring slot level periodicity)
  sl1                              NULL,
  sl2                              INTEGER (0..1),
  sl4                              INTEGER (0..3),
  sl5                              INTEGER (0..4),
  sl8                              INTEGER (0..7),
```

TABLE 19-continued

```
    s110                        INTEGER (0..9),
    s116                        INTEGER (0..15),
    s120                        INTEGER (0..19)
    }
                                OPTIONAL,
    duration(Monitoring length)   INTEGER (2..2559)
    monitoringSymbolsWithin-  BIT STRING (SIZE (14))
    Slot
                                OPTIONAL,
    (Monitoring symbol in symbol)
    nrofCandidates              SEQUENCE {
    (Number of PDCCH candidates per aggrega-
    tion level)
        aggregationLevel1       ENUMERATED
        {n0, n1, n2, n3, n4, n5, n6, n8},
        aggregationLevel2       ENUMERATED
        {n0, n1, n2, n3, n4, n5, n6, n8},
        aggregationLevel4       ENUMERATED
        {n0, n1, n2, n3, n4, n5, n6, n8},
        aggregationLevel8       ENUMERATED
        {n0, n1, n2, n3, n4, n5, n6, n8},
        aggregationLevel16      ENUMERATED
        {n0, n1, n2, n3, n4, n5, n6, n8}
    },
    searchSpaceType             CHOICE {
    -- Configures this search space as com-
    mon search space (CSS) and
    DCI formats to monitor.
        common                  SEQUENCE {
        (Common search space)
        }
        ue-Specific             SEQUENCE {
        (UE-specific search space)
        -- Indicates whether the UE monitors in
        this USS for DCI formats 0-0 and
        1-0 or for formats 0-1 and 1-1.
            formats             ENUMERATED
            {formats0-0-And-1-0, formats0-1-And-1-1},
            ...
        }
```

Based on configuration information, the BS may configure one or more search space sets in the UE. The BS may configure search space set 1 and search space set 2 in the UE, may configure DCI format A scrambled by an X-RNTI in the search space set 1 to be monitored in the common search space, and may configure DCI format B scrambled by a Y-RNTI in the search space set 2 to be monitored in the UE-specific search space.

The configuration information may indicate that there are one or more search space sets in the common search space or the UE-specific search space. For example, a search space set #1 and a search space set #2 may be configured as the common search space, and a search space set #3 and a search space set #4 may be configured as the UE-specific search space.

The following non-limiting exemplary combinations of DCI formats and RNTIs may be monitored in the common search space.

DCI format 0_0/1_0 with CRC scrambled by C-RNTI, CS-RNTI, MCS-C-RNTI, SP-CSI-RNTI, RA-RNTI, TC-RNTI, P-RNTI, SI-RNTI DCI format 2_0 with CRC scrambled by SFI-RNTI DCI format 2_1 with CRC scrambled by INT-RNTI DCI format 2_2 with CRC scrambled by TPC-PUSCH-RNTI, TPC-PUCCH-RNTI DCI format 2_3 with CRC scrambled by TPC-SRS-RNTI The following non-limiting exemplary combinations of DCI formats and RNTIs may be monitored in the UE-specific search space.

DCI format 0_0/1_0 with CRC scrambled by C-RNTI, CS-RNTI, TC-RNTI

DCI format 1_0/1_1 with CRC scrambled by C-RNTI, CS-RNTI, TC-RNTI

The RNTIs specified above may follow the following definitions and uses.

Cell RNTI (C-RNTI): used for UE-specific PDSCH scheduling

Modulation Coding Scheme C-RNTI (MCS-C-RNTI): used for a UE-specific PDSCH scheduling Temporary Cell RNTI (TC-RNTI): used for UE-specific PDSCH scheduling Configured Scheduling RNTI (CS-RNTI): used for semi-statically configured UE-specific PDSCH scheduling Random Access RNTI (RA-RNTI): used for PDSCH scheduling in a random access stage Paging RNTI (P-RNTI): used for scheduling a PDSCH on which paging is transmitted System Information RNTI (SI-RNTI): used for scheduling a PDSCH on which SI is transmitted Interruption RNTI (INT-RNTI): used for notifying whether a PDSCH is punctured Transmit Power Control for PUSCH RNTI (TPC-PUSCH-RNTI): used for indicating a power control command for a PUSCH Transmit Power Control for PUCCH RNTI (TPC-PUCCH-RNTI): used for indicating a power control command for a PUCCH Transmit Power Control for Sounding Reference Signal RNTI (TPC-SRS-RNTI): used for indicating a power control command for an SRS The DCI formats specified above may follow the following definitions of Table 20.

TABLE 20

| DCI format | Usage |
|---|---|
| 0_0 | Scheduling of PUSCH in one cell |
| 0_1 | Scheduling of PUSCH in one cell |
| 1_0 | Scheduling of PDSCH in one cell |
| 1_1 | Scheduling of PDSCH in one cell |
| 2_0 | Notifying a group of UEs of the slot format |
| 2_1 | Notifying a group of UEs of the PRB(s) and OFDM symbol(s) where UE may assume no transmission is intended for the UE |
| 2_2 | Transmission of TPC commands for PUCCH and PUSCH |
| 2_3 | Transmission of a group of TPC commands for SRS transmissions by one or more UEs |

In the 5G wireless communication system, a search space of an AL L in a CORESET p and a search space set s may be expressed as in Equation (3) below.

$$L \cdot \left\{ \left( Y_{p,n_{s,f}^\mu} + \left\lfloor \frac{m_{s,n_{CI}} \cdot N_{CCE,p}}{L \cdot M_{p,s,max}^{(L)}} \right\rfloor + n_{CI} \right) \mod \lfloor N_{CCE,p}/L \rfloor \right\} + i \quad (3)$$

L: AL $n_{CI}$: carrier index $N_{CCE,p}$: Total Number of CCEs present within CORESET p $n_{s,f}^\mu$: Slot Index $M_{p,s,max}^{(L)}$: Number of PDCCH Candidates of AL L $m_{snCI}=0, M^{(L)}_{p,s,max}-1$: Index of PDCCH candidate of AL L i=0, ..., L−1

$Y_{p,n_s,f^{\mu}} = (A_p \cdot Y_{p,n_s,f^{\mu}-1})$ mod D, $Y_{p,-i}=n_{RNTI}\neq 0$, $A_0=39827$, $A_1=39829$, $A_2=39839$, D=65537

$n_{RNTI}$: UE identifier

A value of $Y\_(p,n^{\mu}_{s,f})$ may correspond to 0 in the case of the common search space.

The value of $Y\_(p,n^{\mu}_{s,f})$ may correspond to a value that changes according to the UE identity (C-RNTI or ID that the BS configures in the UE) and a time index in the case of the UE-specific search space.

Figure 6:
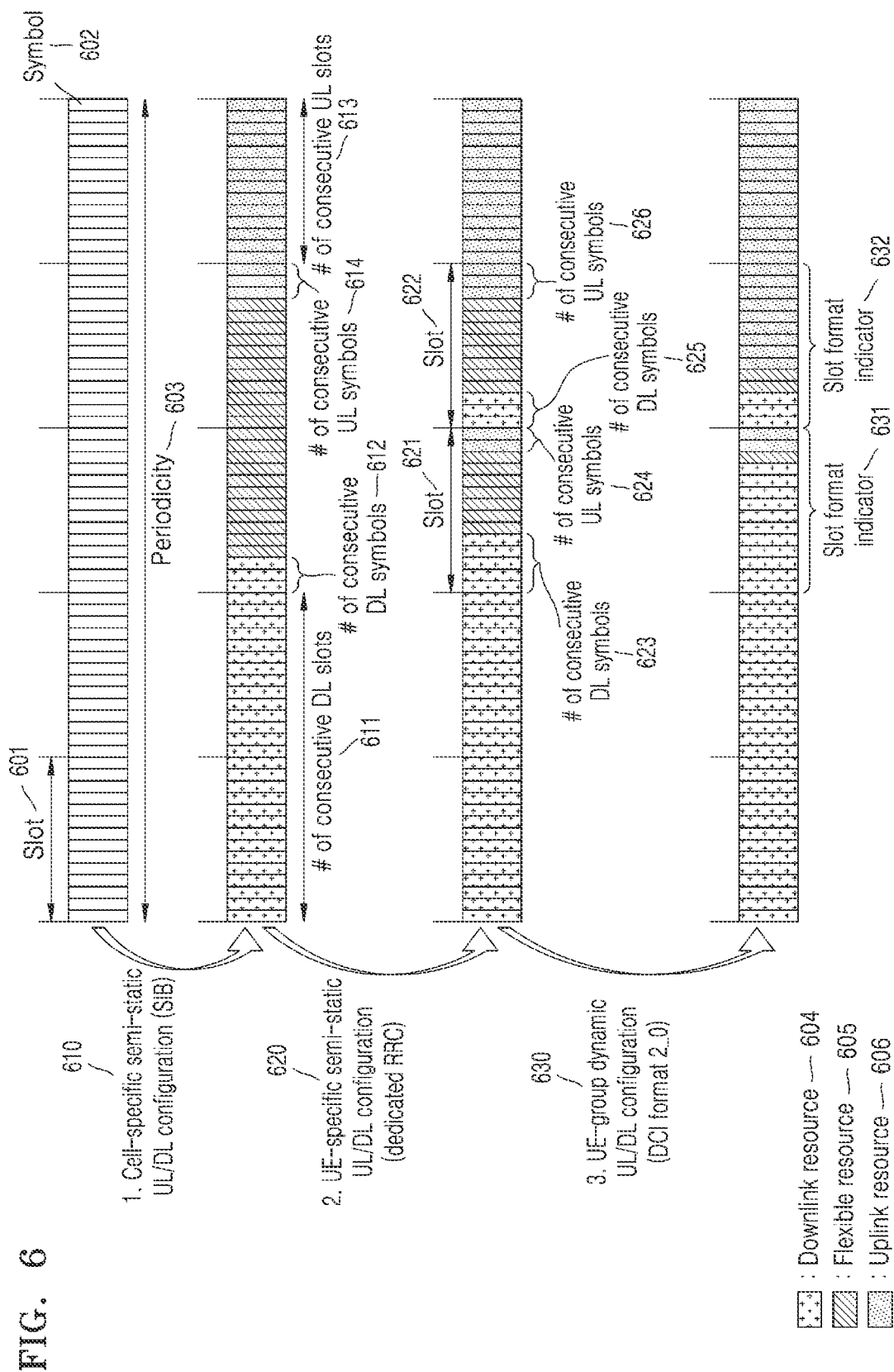
FIG. 6 is a diagram illustrating an example of a method of configuring uplink and downlink resources of a wireless communication system, according to an embodiment.

FIG. 6 is a diagram illustrating an example of UL-DL configuration considered in a 5G communication system, according to an embodiment.

Referring to FIG. 6, a slot 601 may include 14 symbols 602. In the 5G communication system, UL-DL configurations of symbols/slots may be performed in three steps. First, UL-DL configurations of symbols/slots may be semi-statically performed in symbols through cell-specific configuration information 610 in SI. In detail, cell-specific UL-DL configuration information in the SI may include UL-DL pattern information and reference subcarrier information. In the UL-DL pattern information, a pattern periodicity 603, the number of consecutive DL slots 611 from a start point of each pattern and the number of symbols 612 of the next slot, and the number of consecutive UL slots 613 from an end of the pattern and the number of symbols 614 of the next slot may be indicated. In this case, slots and symbols for which UL 606 or DL 604 are not indicated may be determined as flexible slots and symbols 605.

Second, based on user-specific configuration information via dedicated higher layer signaling 620, slots 621 and 622 including a flexible slot or a flexible symbol may be indicated with the numbers 623 and 625 of consecutive DL symbols from a start symbol of each slot and the numbers 624 and 626 of consecutive UL symbols from an end of each slot or may be indicated as a DL of all slots or a UL of all slots.

In order to dynamically switch between a DL signal transmission period and a UL signal transmission period 630, symbols indicated as the flexible symbols (i.e., symbols not indicated as DL or UL) in each slot may be indicated by slot format indicators (SFIs) 631 and 632 included in a DL control channel to indicate whether each symbol is a DL symbol, a UL symbol or a flexible symbol. An SFI may select one index from a table in which UL-DL configurations of 14 symbols within one slot are pre-configured as in Table 21 below.

TABLE 21

| Format | \multicolumn{14}{c}{Symbol number in a slot} | | | | | | | | | | | | | |
| --- | --- | --- | --- | --- | --- | --- | --- | --- | --- | --- | --- | --- | --- | --- |
|  | 0 | 1 | 2 | 3 | 4 | 5 | 6 | 7 | 8 | 9 | 10 | 11 | 12 | 13 |
| 0 | D | D | D | D | D | D | D | D | D | D | D | D | D | D |
| 1 | U | U | U | U | U | U | U | U | U | U | U | U | U | U |
| 2 | F | F | F | F | F | F | F | F | F | F | F | F | F | F |
| 3 | D | D | D | D | D | D | D | D | D | D | D | D | D | F |
| 4 | D | D | D | D | D | D | D | D | D | D | D | D | F | F |
| 5 | D | D | D | D | D | D | D | D | D | D | D | F | F | F |
| 6 | D | D | D | D | D | D | D | D | D | D | F | F | F | F |
| 7 | D | D | D | D | D | D | D | D | D | F | F | F | F | F |
| 8 | F | F | F | F | F | F | F | F | F | F | F | F | F | U |
| 9 | F | F | F | F | F | F | E | F | F | F | F | F | U | U |
| 10 | F | U | U | U | U | U | U | U | U | U | U | U | U | U |
| 11 | F | F | U | U | U | U | U | U | U | U | U | U | U | U |
| 12 | F | F | F | U | U | U | U | U | U | U | U | U | U | U |
| 13 | F | F | F | F | U | U | U | U | U | U | U | U | U | U |
| 14 | F | F | F | F | F | U | U | U | U | U | U | U | U | U |
| 15 | F | F | F | F | F | F | U | U | U | U | U | U | U | U |
| 16 | D | F | F | F | F | F | F | F | F | F | F | F | F | F |
| 17 | D | D | F | F | F | F | F | F | F | F | F | F | F | F |
| 18 | D | D | D | F | F | F | F | F | F | F | F | F | F | F |
| 19 | D | F | F | F | F | F | F | F | F | F | F | F | F | U |
| 20 | D | D | F | F | F | F | F | F | F | F | F | F | F | U |
| 21 | D | D | D | F | F | F | F | F | F | F | F | F | F | U |
| 22 | D | F | F | F | F | F | F | F | F | F | F | F | U | U |
| 23 | D | D | F | F | F | F | F | F | F | F | F | F | U | U |
| 24 | D | D | D | F | F | F | F | F | F | F | F | F | U | U |
| 25 | D | F | F | F | F | F | F | F | F | F | F | U | U | U |
| 26 | D | D | F | F | F | F | F | F | F | F | F | U | U | U |
| 27 | D | D | D | F | F | F | F | F | F | F | F | U | U | U |
| 28 | D | D | D | D | D | D | D | D | D | D | D | D | F | U |
| 29 | D | D | D | D | D | D | D | D | D | D | D | F | F | U |
| 30 | D | D | D | D | D | D | D | D | D | D | F | F | F | U |
| 31 | D | D | D | D | D | D | D | D | D | D | D | F | U | U |
| 32 | D | D | D | D | D | D | D | D | D | D | F | F | U | U |
| 33 | D | D | D | D | D | D | D | D | D | F | F | F | U | U |
| 34 | D | F | U | U | U | U | U | U | U | U | U | U | U | U |
| 35 | D | D | F | U | U | U | U | U | U | U | U | U | U | U |
| 36 | D | D | D | F | U | U | U | U | U | U | U | U | U | U |
| 37 | D | F | F | U | U | U | U | U | U | U | U | U | U | U |
| 38 | D | D | F | F | U | U | U | U | U | U | U | U | U | U |
| 39 | D | D | D | F | F | U | U | U | U | U | U | U | U | U |
| 40 | D | F | F | F | U | U | U | U | U | U | U | U | U | U |
| 41 | D | D | F | F | F | U | U | U | U | U | U | U | U | U |
| 42 | D | D | D | F | F | F | U | U | U | U | U | U | U | U |
| 43 | D | D | D | D | D | D | D | D | D | F | F | F | F | U |

TABLE 21-continued

| Format | Symbol number in a slot | | | | | | | | | | | | | |
|---|---|---|---|---|---|---|---|---|---|---|---|---|---|---|
| | 0 | 1 | 2 | 3 | 4 | 5 | 6 | 7 | 8 | 9 | 10 | 11 | 12 | 13 |
| 44 | D | D | D | D | D | D | F | F | F | F | F | F | U | U |
| 45 | D | D | D | D | D | D | F | F | U | U | U | U | U | U |
| 46 | D | D | D | D | D | F | U | D | D | D | D | D | F | U |
| 47 | D | D | F | U | U | U | U | D | D | F | U | U | U | U |
| 48 | D | F | U | U | U | U | U | D | F | U | U | U | U | U |
| 49 | D | D | D | D | F | F | U | D | D | D | F | F | F | U |
| 50 | D | D | F | F | U | U | U | D | F | F | F | U | U | U |
| 51 | D | F | F | U | U | U | U | D | F | F | U | U | U | U |
| 52 | D | F | F | F | F | F | U | D | F | F | F | F | F | U |
| 53 | D | D | F | F | F | F | U | D | D | F | F | F | F | U |
| 54 | F | F | F | F | F | F | F | D | D | D | D | D | D | D |
| 55 | D | D | F | F | F | U | U | U | D | D | D | D | D | D |
| 56-254 | | | | | | | Reserved | | | | | | | |
| 255 | UE determines the slot format for the slot based on TDD-UL-DL-ConfigurationCommon, or TDD-UL-DL-ConfigDedicated and, if any, on detected DCI formats | | | | | | | | | | | | | |

Regarding XDD

Although an additional coverage extension technology has been introduced for 5G mobile communication services, as compared to LTE communication services, actual 5G mobile communication services may mostly use a time-division duplexing (TDD) system suitable for a service with a higher DL traffic portion. As the center frequency increases to extend frequency bands, the coverage of the BS and the UE decreases, and thus, coverage enhancement is a key requirement in the 5G mobile communication services. In particular, because transmission power of the UE is generally lower than transmission power of the BS and a proportion of DL is higher than that of UL in the time domain to support a service having a higher DL traffic portion, coverage enhancement in a UL channel is a key requirement in the 5G mobile communication services. As a method of enhancing the coverage of the UL channel between the BS and the UE, there may be a method of increasing time resources in the UL channel, reducing the center frequency, or increasing transmission power of the UE. Changing the frequency, however, may be restricted because a frequency band is determined for each network operator. Also, because the maximum transmission power of the UE is determined within a rule to reduce interference, increasing the maximum transmission power of the UE to enhance coverage may be restricted.

Accordingly, in order to enhance the coverage of the BS and the UE, in addition to dividing UL and DL resources in the time domain depending on UL and DL traffic portions in the TDD system, UL and DL resources may be divided even in the frequency domain as in a frequency-division duplexing (FDD) system. A system that is able to flexibly divide UL and DL resources in the time domain and the frequency domain may be referred to as a X division duplexing (XDD) system, a flexible TDD system, a hybrid TDD system, a TDD-FDD system, a hybrid TDD-FDD system, or the like, but will be referred to herein as the XDD system. In XDD, X may refer to time or frequency.

Figure 7:
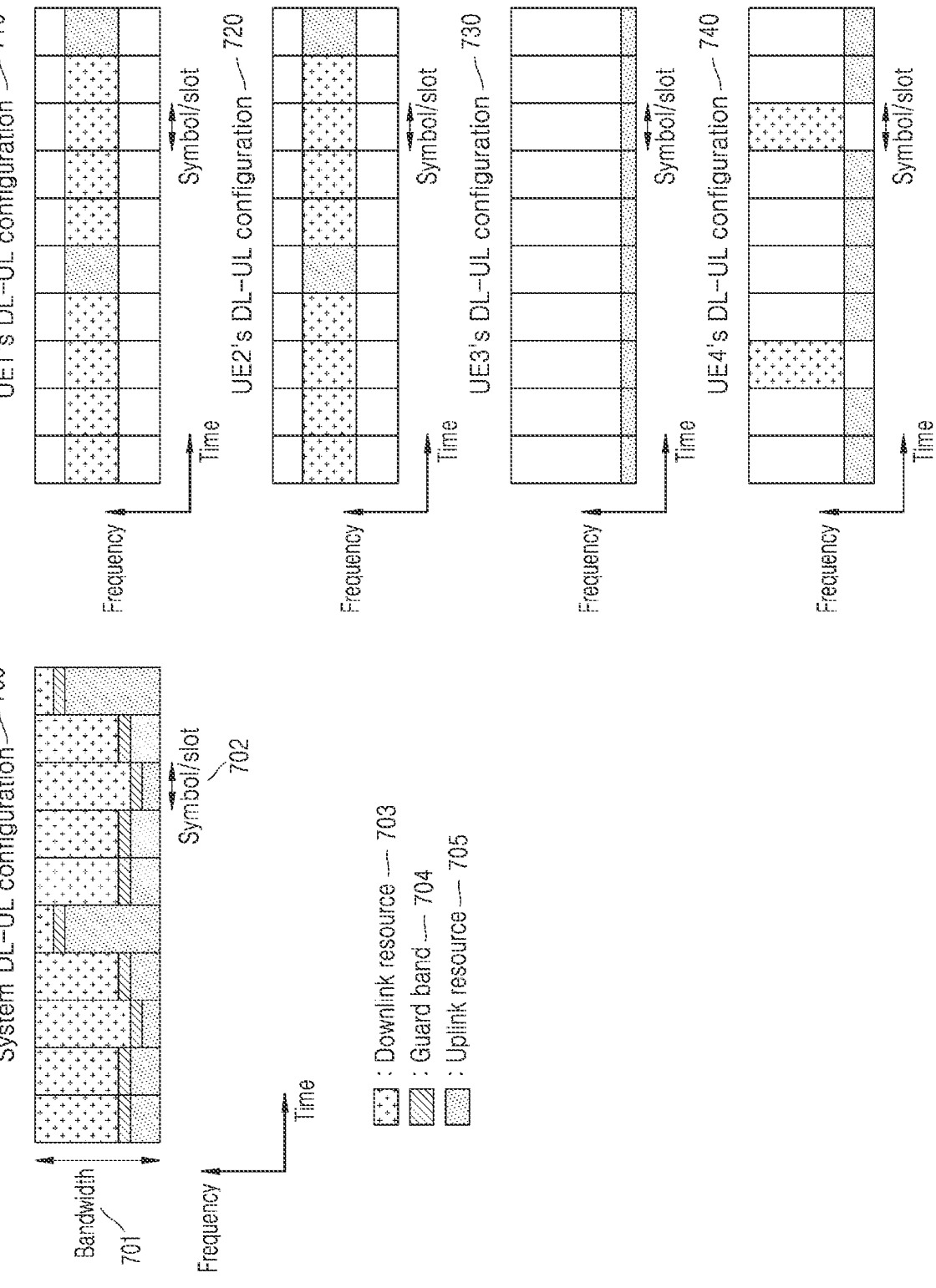
FIG. 7 is a diagram illustrating an example of a method of configuring uplink and downlink resources, according to an embodiment.

FIG. 7 is a diagram illustrating UL-DL resource configuration of an XDD system in which UL and DL resources are flexibly divided in the time domain and the frequency domain, according to an embodiment.

Referring to FIG. 7, from the perspective of the BS, an entire XDD system UL-DL configuration 700 may flexibly allocate a resource to each symbol/slot 702 depending on UL and DL traffic portions in an entire frequency band 701. However, this is only an example. A unit in which a resource is allocated is not limited to the symbol/slot 702, and a resource may be flexibly allocated according to a unit such as a mini slot. In this case, a guard band (GB) 704 may be allocated for a frequency band between a DL resource 703 and a UL resource 705. The GB 704 may be allocated as a method of reducing interference applied to reception of a UL channel or signal due to out-of-band (OOB) emission occurring when the BS transmits a DL channel or signal on the DL resource 703. In this case, for example, a UE 1 710 and a UE 2 720 generally having more UL traffic than DL traffic may be allocated DL and UL resources at a ratio of 4:1 in the time domain according to a configuration from the BS. At the same time, a UE 3 730 that operates on cell edges and has insufficient UL coverage may be allocated only a UL resource in a particular time period according to a configuration from the BS. In addition, a UE 4 740 that operates on cell edges and has insufficient UL coverage but relatively has lots of DL and UL traffic, may be allocated a lot of UL resources in the time domain for UL coverage and a lot of DL resources in a frequency band. As described above, UEs that operate relatively at the center of a cell and have lots of DL traffic may be allocated more DL resources in the time domain, and UEs that operate relatively on cell edges and do not have sufficient UL coverage may be allocated more UL resources in the time domain.

Figure 8:
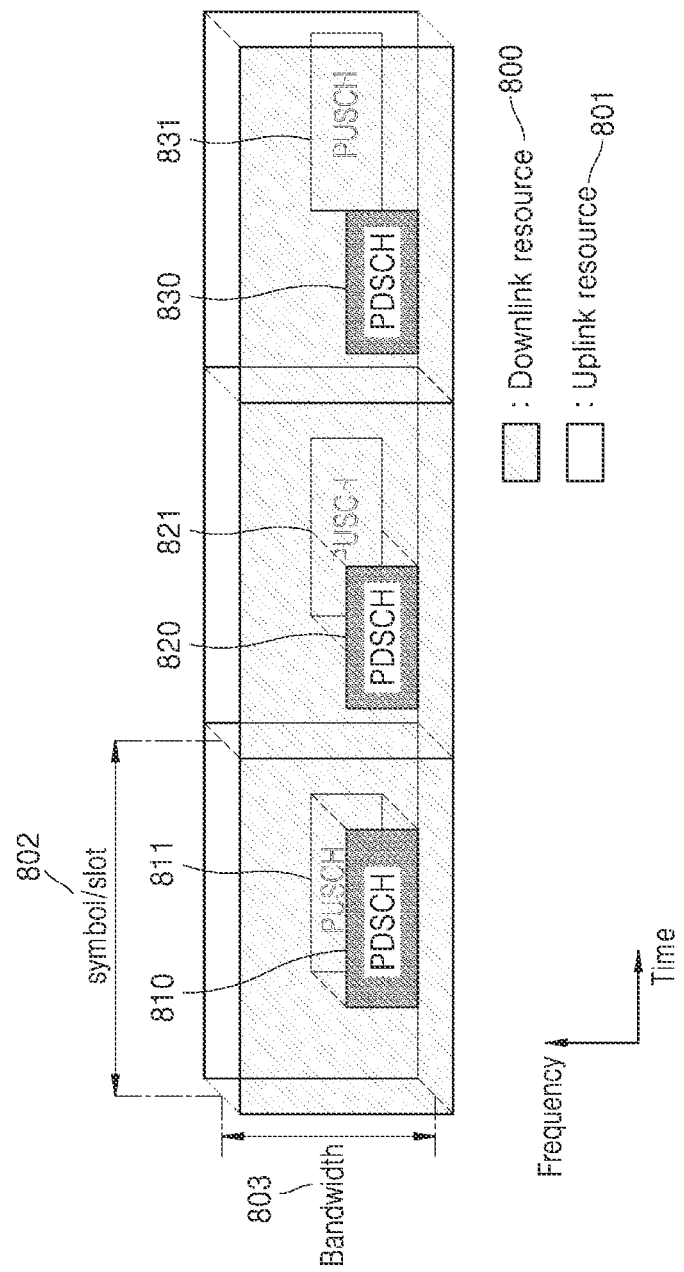
FIG. 8 is a diagram illustrating an example of a method of configuring uplink and downlink resources, according to an embodiment.

FIG. 8 is a diagram illustrating an example of UL-DL resource configuration of a full duplex communication system in which UL and DL resources are flexibly divided in the time domain and the frequency domain, according to an embodiment.

According to FIG. 8, all or part of a DL resource 800 and a UL resource 801 may be configured to overlap each other in the time and frequency domain. DL transmission from the BS to the UE may be performed in a region configured as the DL resource 800, and UL transmission from the UE to the BS may be performed in a region configured as the UL resource 801.

In FIG. 8, an entire DL resource 810 and UL resource 811 may be configured to overlap each other in a time resource corresponding to a symbol/slot 802 and a frequency resource corresponding to a bandwidth 803. In this case, because the DL resource 810 overlaps the UL resource 811 in the time and frequency domain, DL and UL transmission/reception by the BS or the UE may simultaneously occur in the same time and frequency resource.

In another example of FIG. 8, parts of a DL resource 820 and a UL resource 821 may be configured to overlap each other in a time resource corresponding to the symbol/slot 802 and a frequency resource corresponding to the bandwidth 803. In this case, DL and UL transmission/reception by the BS or the UE may simultaneously occur in a region in which the DL resource 820 and the UL resource 821 overlap.

In another example of FIG. 8, parts of a DL resource 830 and a UL resource 831 may be configured not to overlap each other in a time resource corresponding to the symbol/slot 802 and a frequency resource corresponding to the bandwidth 803.

Figure 9:
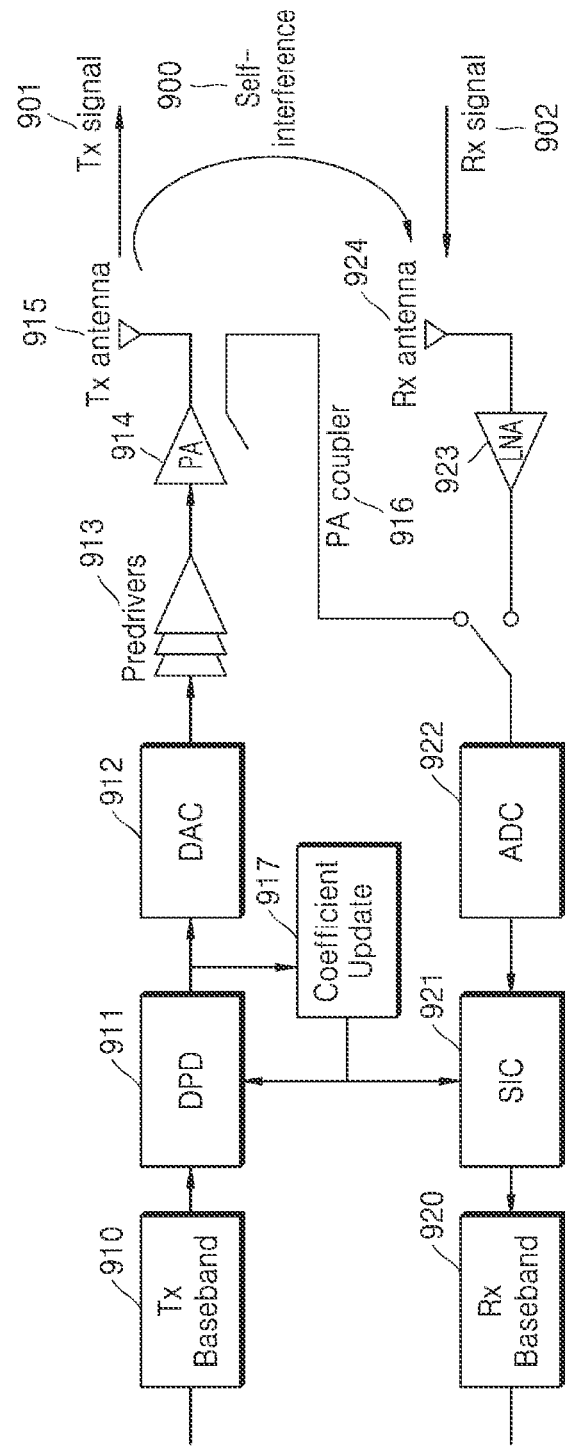
FIG. 9 is a diagram illustrating a transmitter structure and a receiver structure, according to an embodiment.

FIG. 9 is a diagram illustrating a transmission/reception structure for a duplex method, according to an embodiment.

The transmission/reception structure shown in FIG. 9 may be used in a BS or a UE. According to the transmission/reception structure shown in FIG. 9, a transmitter may include blocks, such as, for example, a transmit (Tx) baseband block 910, a digital pre-distortion (DPD) block 911, a digital-to-analog converter (DAC) 912, a pre-driver 913, a power amplifier (PA) 914, a Tx antenna 915, etc. Respective blocks may perform the following roles.

Tx baseband block 910: digital processing block for a Tx signal

DPD block 911: for pre-distortion of a digital Tx signal

DAC 912: for conversion of a digital signal into an analog signal

Pre-driver 913: for progressive power amplification of an analog Tx signal

PA 914: for power amplification of an analog Tx signal

Tx antenna 915: antenna for signal transmission

According to the transmission/reception structure shown in FIG. 9, a receiver may include blocks, such as a receive (Rx) antenna 924, a low noise amplifier (LNA) 923, an analog-to-digital converter (ADC) 922, a successive interference cancellator (SIC) block 921, an Rx baseband block 920, etc. Respective blocks may perform the following roles.

Rx antenna 924: antenna for signal reception

LNA 923: for minimization of noise amplification while amplifying power of an analog Rx signal ADC 922: for conversion of an analog signal into a digital signal SIC block 921: interference cancellator for a digital signal Rx baseband block 920: digital processing block for an Rx signal According to the transmission/reception structure shown in FIG. 9, a PA coupler 916 and a coefficient update block 917 may be present for further signal processing between the transmitter and the receiver. Respective blocks may perform the following roles.

PA coupler 916: block for the purpose of observing waveforms of an analog Tx signal that passed through the PA by the receiver Coefficient update block 917: for updating various coefficients necessary for digital domain signal processing by the transmitter and the receiver, wherein calculated coefficients may be used to configure various parameters at the DPD block 911 of the transmitter and the SIC block 921 of the receiver.

The transmission/reception structure shown in FIG. 9 may be utilized for the purpose of effectively controlling interference between a Tx signal and an Rx signal, when transmission and reception operations are simultaneously performed by the BS or the UE. For example, when transmission and reception simultaneously occur by an arbitrary apparatus, a Tx signal 901 transmitted via the Tx antenna 915 of the transmitter may be received via the Rx antenna 924 of the receiver, in which case the Tx signal 901 received by the receiver may interfere 900 with an Rx signal 902 that is originally intended to be received by the receiver. Interference between the Tx signal 901 received by the receiver and the Rx signal 902 is referred to as self-interference 900. For example, in detail, when the BS simultaneously performs DL transmission and UL reception, a DL signal transmitted by the BS may be received by a receiver of the BS, and accordingly, at the receiver of the BS, interference may occur between the DL signal transmitted by the BS and a UL signal that the BS originally intended to receive at the receiver. When the UE simultaneously performs DL reception and UL transmission, a UL signal transmitted by the UE may be received by a receiver of the UE, and accordingly, at the receiver of the UE, interference may occur between the UL signal transmitted by the UE and a DL signal that the UE originally intended to receive at the receiver. As described above, interference between links in different directions in the BS and the UE, that is, between a DL signal and a UL signal, may also be referred to as cross-link interference.

Self-interference between a Tx signal (or DL signal) and an Rx signal (or UL signal) may occur in a system in which transmission and reception may be simultaneously performed.

For example, self-interference may occur in the XDD system described above.

Figure 10:
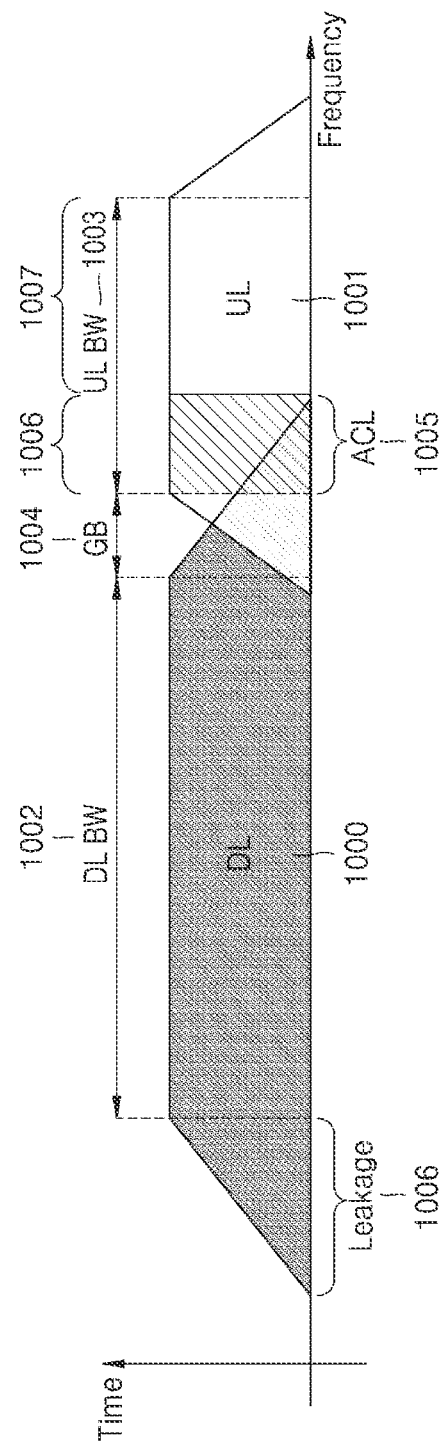
FIG. 10 is a diagram illustrating an example of uplink and downlink resource configuration and self-interference, according to an embodiment.

FIG. 10 is a diagram for describing an example of DL and UL resource configuration in an XDD system, according to an embodiment.

In XDD, a DL 1000 resource and a UL 1001 resource may be identified in the frequency domain, in which case a GB 1004 may be present between the DL 1000 resource and the UL 1001 resource. DL transmission may be performed within a DL bandwidth 1002, and UL transmission may be performed within a UL bandwidth 1003. In this case, a leakage 1006 may occur outside of UL and DL transmission bands. In a region in which the DL 1000 resource and the UL 1001 resource are adjacent to each other, interference caused by such leakage may occur, and such interference may be called an adjacent carrier leakage (ACL) 1005. FIG. 10 illustrates an example in which an ACL 1005 from the DL 1000 to the UL 1001 occurs. As the DL bandwidth 1002 and the UL bandwidth 1003 are close to each other, signal interference caused by the ACL 1005 may have a greater influence, and accordingly, performance deterioration may occur. For example, as shown in FIG. 10, a certain resource region 1006 within the UL bandwidth 1003, which is adjacent to the DL bandwidth 1002, may be greatly affected by the interference caused by the ACL 1005. In a certain resource region 1007 within the UL bandwidth 1003, which is relatively far from the DL bandwidth 1002, may be less affected by the interference caused by the ACL 1005. That is, the resource region 1006 that is relatively greatly affected by the interference and the resource region 1007 that is relatively less affected by the interference may be present in the UL bandwidth 1003. A GB 1004 may be inserted between the DL bandwidth 1002 and the UL bandwidth 1003 for the purpose of reducing performance deterioration caused by the ACL 1005. As the size of the GB 1004 increases, an influence of interference caused by the ACL 1005 between the DL bandwidth 1002 and the UL bandwidth 1003 may be reduced. However, as the size of the GB 1004 increases, the quantity of resources available for transmission/reception is reduced, which may result in lowering resource efficiency. In contrast, as the size of the GB 1004 decreases, the quantity of resources available for transmission/reception may increase, which may result in increasing resource efficiency. However, the influence of the interference caused by the ACL 1005 between the DL bandwidth 1002 and the UL bandwidth 1003 may increase. Accordingly, it may be important to determine an appropriate size of the GB 1004 in consideration of trade-off.

XDD BWP Operation Method

Figure 11:
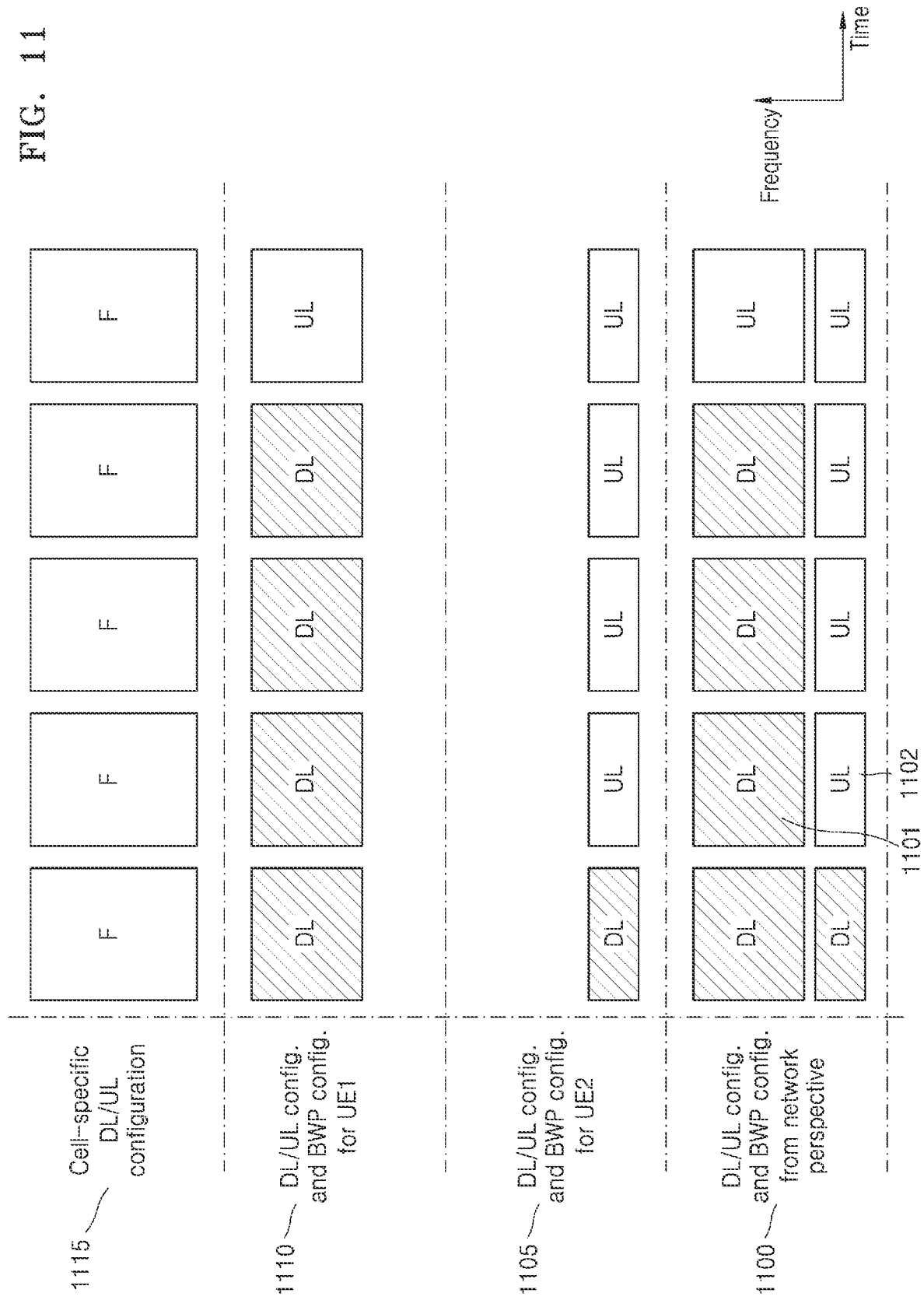
FIG. 11 is a diagram illustrating an example of uplink-downlink configuration of an X division duplex (XDD) system, according to an embodiment.

FIG. 11 is a diagram illustrating an example of UL-DL configuration of an XDD system, according to an embodiment.

From the perspective of the BS, an entire XDD system UL-DL configuration 1100 may flexibly allocate a resource to each symbol/slot depending on UL and DL traffic portions in an entire frequency band. In this case, a GB may be allocated for a frequency band between a DL resource 1101 and a UL resource 1102. The GB may be allocated as a method of reducing interference in receiving a UL channel or signal due to out-of-band emission occurring when the BS transmits a DL channel or signal on the DL resource. In this case, for example, a UE 1110 generally having more DL traffic than UL traffic may be allocated more DL resources than UL resources according to a configuration from the BS (in FIG. 11, it is assumed that a ratio of DL resources to UL resources is 4:1 in the time domain). At the same time, a UE 1105 that operates on cell edges and has insufficient UL coverage may be allocated less DL resources than UL resources according to a configuration from the BS (in FIG. 11, it is assumed that the ratio of DL resources to UL resources is 4:1 in the time domain). As in the above example, UEs that operate relatively at the center of a cell and have lots of DL traffic are allocated more DL resources in the time domain, such that DL transmission efficiency may be increased. UEs that operate relatively on cell edges may be allocated more UL resources in the time domain, such that coverage may be enhanced. In this case, a corresponding BS 1100 may configure most of time resources to flexible (F) when a cell-specific DL/UL configuration is performed for flexible DL/UL configuration 1115.

Only for UEs that do not support full duplex capable of performing simultaneous UL and DL transmission/reception within the same time-frequency resource, the BS needs to identify a DL resource and a UL resource of the UE 1110 that receives DL and the UE 1105 that transmits UL at a particular time (e.g., in a second to fourth time period of FIG. 11). The DL resource and the UL resource may be identified using one of the following two methods. A first method prevents frequency configuration information for a DL BWP of a UE 1 1110 and an UL BWP of a UE 2 1105 from overlapping each other. This method may minimize an influence on implementation of the UE and the BS, but BWP switching is required when a ratio of frequency resources is to be switched between the UL and the DL within one hour, and thus, the method is inflexible and requires a lot of time. The first method is referred to as a BWP-based XDD operation method herein. A second method allocates a scheduled PDSCH of the UE 1 1110 and a scheduled PUSCH of the UE 2 1105 not to overlap each other in the frequency axis. This method is based on BS scheduling and thus has very high flexibility and a very fast rate of switching the ratio of frequency resources between the DL and the UL. However, because frequency configuration information for the DL BWP of the UE 1 1110 and the UL BWP of the UE 2 1105 may partially or entirely overlap, there is a risk of various problems to be described below in the following embodiments. The second method is referred to as a scheduling based XDD operation method herein.

Figure 12:
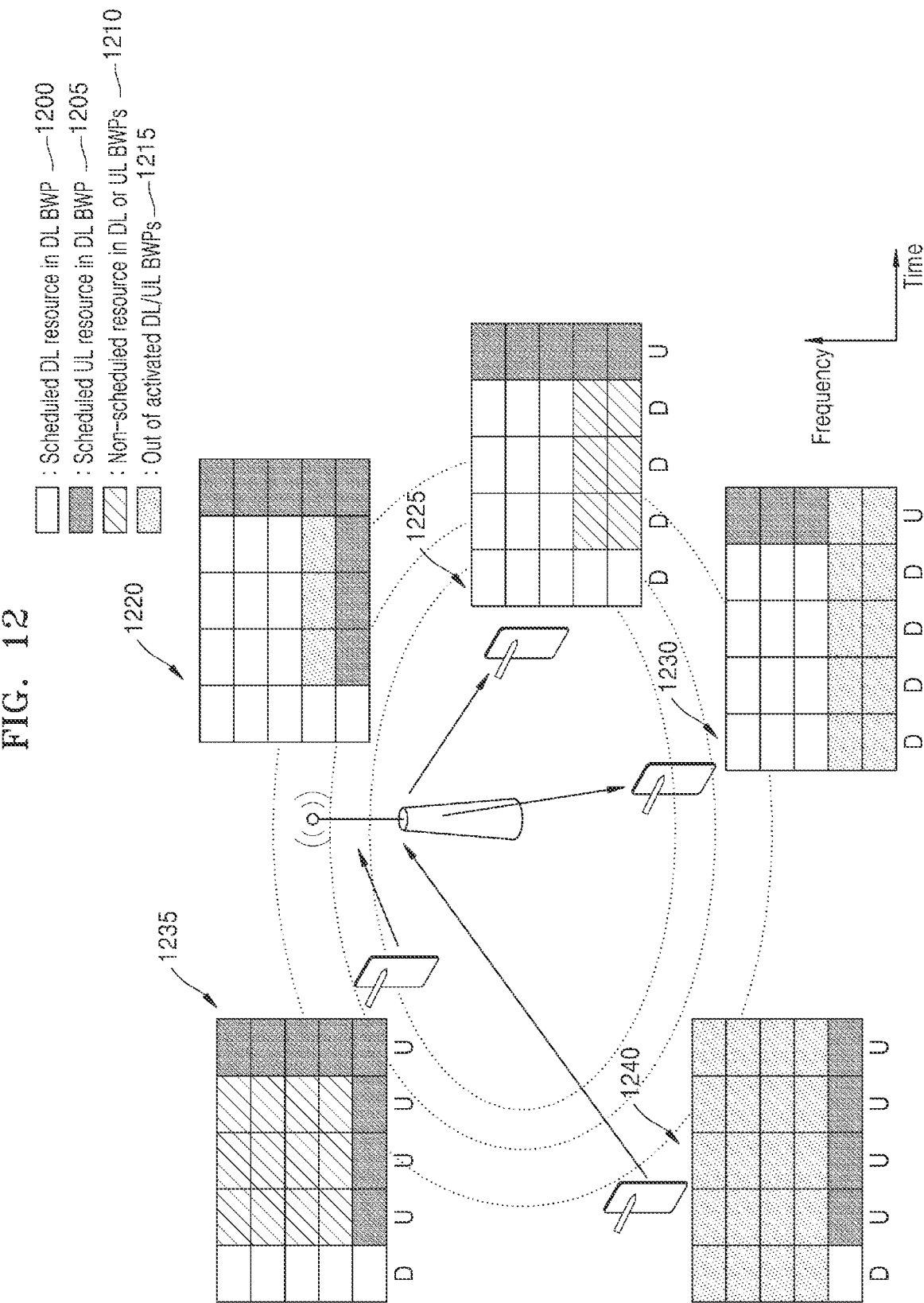
FIG. 12 is a diagram illustrating an example of uplink-downlink configuration of an XDD system, according to another embodiment.

FIG. 12 is a diagram illustrating an example of UL-DL configuration of an XDD system, according to another embodiment.

Referring to FIG. 12, the BS may properly use, for XDD, the above-described two methods of identifying DL and UL frequency resources. For example, from the perspective of the BS, a UL-DL configuration such as a case 1220 may be assumed. The BS may allocate DL and UL resources to UEs 1225 and 1230 having more DL traffic than UL traffic at a ratio of 4:1 in the time domain. In this case, when the BS applies the BWP-based XDD operation method to a certain UE 1230, a scheduled PDSCH 1200 and a scheduled PUSCH 1205 may not be allocated to a region 1215 other than an activated DL BWP and UL BWP, and thus, UL-DL throughput of the UE may be partially restricted. When the BS applies the scheduling-based XDD operation method to a certain UE 1225, the BS has a higher degree of scheduling freedom compared to the BWP-based XDD operation method, and thus, when required, may allocate a PDSCH to a wide band (e.g., in a first time period in the case of the UE 1225) or may not allocate a PDSCH to a period in which UL transmission of another UE is required (e.g., in a second to fourth time period in the case of the UE 1225). Similarly, the BS may allocate DL and UL resources to UEs 1235 and 1240 having more UL traffic than DL traffic or for which UL coverage is important at a ratio of 1:4 in the time domain. In this case, when the BS applies the BWP-based XDD operation method to a certain UE 1240, the scheduled PDSCH 1200 and the scheduled PUSCH 1205 may not be allocated to a region 1215 other than the activated DL BWP and UL BWP, and thus, UL-DL throughput of the UE may be partially restricted. When the BS applies the scheduling-based XDD operation method to a certain UE 1235, the BS has a higher degree of scheduling freedom compared to the BWP-based XDD operation method and thus, when required, may allocate a PUSCH to a wide band (e.g., in a fifth time period in the case of the UE 1235) or may not allocate a PUSCH to a period in which DL reception of another UE is required (e.g., in a second to fourth time period in the case of the UE 1235).

In addition, ambiguity may occur in operations of the BS and the UE on a resource 1210 that is included in the activated DL BWP or UL BWP in the above example, but for which a PDSCH or PUSCH is not actually allocated for XDD operation. For example, in the case of CSI-RS for tracking (TRS), because a smaller value between 52 RB and a BWP bandwidth in which the TRS is transmitted is used as a transmission bandwidth, there is a risk that a UE, such as the UE 1225, operating in an activated DL BWP including an XDD UL band of another UE may regard that the TRS is transmitted in a region 1210 to which a DL resource, such as a PDSCH, is not allocated for XDD operation. Similarly, there is a risk that a UE (e.g., the UE 1235), operating in an activated UL BWP including an XDD DL band of another UE may regard that a periodic or semi-persistent UL channel, such as an SRS or a PUCCH, is transmitted in the region 1210 to which a DL resource, such as a PUSCH, is not allocated for XDD operation.

PUSCH: Regarding Transmission Methods

A PUSCH transmission scheduling method is described in detail below. PUSCH transmission may be dynamically scheduled by UL grant in DCI, or operated by configured grant Type 1 or Type 2. Dynamic scheduling indication for PUSCH transmission may be indicated by DCI format 0_0 or 0_1.

Configured grant Type 1 PUSCH transmission may be semi-statically configured by receiving configuredGrant-Config including rrc-ConfiguredUplinkGrant of Table 22 below via higher layer signaling, without receiving UL grant in DCI. Configured grant Type 2 PUSCH transmission may be semi-persistently scheduled by UL grant in DCI after reception of configuredGrantConfig that does not include rrc-ConfiguredUplinkGrant of Table 22 via higher layer signaling. When the PUSCH transmission is operated by configured grant, parameters applied to the PUSCH transmission may be applied through configuredGrantConfig of Table 22 received via higher layer signaling, with the exception of dataScramblingIdentityPUSCH, txConfig, codebookSubset, maxRank, scaling of UCI-OnPUSCH provided via higher layer signaling pusch-Config of Table 23 below. When the UE receives transformPrecoder in configuredGrantConfig of Table 22 via higher layer signaling, the UE applies tp-pi2BPSK in pusch-Config of Table 23 for the PUSCH transmission operated by the configured grant.

TABLE 22

```
ConfiguredGrantConfig ::=    SEQUENCE {
  frequencyHopping             ENUMERATED
                               {intraSlot, interSlot}
OPTIONAL,   -- Need S,
  cg-DMRS-Configuration        DMRS-UplinkConfig,
  mcs-Table                    ENUMERATED
                               {qam256, qam64LowSE}
OPTIONAL,   -- Need S
  mcs-TableTransformPrecoder   ENUMERATED
                               {qam256, qam64LowSE}
OPTIONAL,   -- Need S
  uci-OnPUSCH                  SetupRelease
                               { CG-UCI-OnPUSCH }
OPTIONAL,   -- Need M
  resourceAllocation           ENUMERATED
{ resourceAllocationType0, resourceAllocation-
Type1,
dynamicSwitch },
  rbg-Size                     ENUMERATED
                               {config2}
OPTIONAL,   -- Need S
  powerControlLoopToUse        ENUMERATED
                               {n0, n1},
  p0-PUSCH-Alpha               P0-PUSCH-
                               AlphaSetId,
  transformPrecoder            ENUMERATED
                               {enabled, disabled}
OPTIONAL,   -- Need S
  nrofHARQ-Processes           INTEGER(1..16),
  repK                         ENUMERATED
                               {n1, n2, n4, n8},
  repK-RV                      ENUMERATED
                               {s1-0231, s2-0303, s3-
                               0000}
OPTIONAL,   -- Need R
  periodicity                  ENUMERATED {
                               sym2, sym7,
sym1x14, sym2x14, sym4x14, sym5x14, sym8x14,
sym10x14, sym16x14, sym20x14,
                               sym32x14,
sym40x14, sym64x14, sym80x14, sym128x14, sym160x14,
sym256x14, sym320x14, sym512x14,
                               sym640x14,
sym1024x14, sym1280x14, sym2560x14, sym5120x14,
                               sym6, sym1x12,
sym2x12, sym4x12, sym5x12, sym8x12, sym10x12,
sym16x12, sym20x12, sym32x12,
                               sym40x12,
sym64x12, sym80x12, sym128x12, sym160x12, sym256x12,
sym320x12, sym512x12, sym640x12,
                               sym1280x12,
                               sym2560x12
},
```

TABLE 22-continued

```
  configuredGrantTimer         INTEGER (1..64)
OPTIONAL,   -- Need R
  rrc-ConfiguredUplinkGrant    SEQUENCE {
    timeDomainOffset             INTEGER
                                 (0..5119),
    timeDomainAllocation         INTEGER
                                 (0..15),
    frequencyDomainAllocation    BIT STRING
                                 (SIZE(18)),
    antennaPort                  INTEGER
                                 (0..31),
    dmrs-SeqInitialization       INTEGER (0..1)
OPTIONAL,   -- Need R
    precodingAndNumberOfLayers   INTEGER (0..63),
    srs-ResourceIndicator        INTEGER (0..15)
OPTIONAL,   -- Need R
    mcsAndTBS                    INTEGER
(0..31),
    frequencyHoppingOffset       INTEGER (1..
maxNrofPhysicalResource-         OPTIONAL, --
Blocks-1)
                                 Need R
    pathlossReferenceIndex       INTEGER
(0..maxNrofPUSCH-PathlossReferenceRSs-1),
    ...
  }
OPTIONAL,   -- Need R
  ...
}
```

A PUSCH transmission method is described in detail below. A DMRS antenna port for PUSCH transmission is identical to an antenna port for SRS transmission. PUSCH transmission may follow a codebook-based transmission method or a non-codebook-based transmission method depending on whether a value of txConfig in higher layer signaling pusch-Config of Table 23 is 'codebook' or 'non-Codebook'.

As described above, the PUSCH transmission may be dynamically scheduled by DCI format 0_0 or 0_1, or semi-statically configured by the configured grant. When the UE receives an indication of scheduling of PUSCH transmission by DCI format 0_0, the UE performs beam configuration for PUSCH transmission by using pucch-spatial-RelationInfoID corresponding to a UE-specific PUCCH resource corresponding to the smallest ID in an activated UL BWP in a serving cell, in which case the PUSCH transmission is based on a single antenna port. The UE does not expect scheduling for the PUSCH transmission by DCI format 0_0 in a BWP in which a PUCCH resource including pucch-spatialRelationInfo is not configured. When the UE is not configured with txConfig in pusch-Config of Table 23, the UE does not expect to be scheduled in DCI format 0_1.

TABLE 23

```
PUSCH-Config ::=               SEQUENCE {
  dataScramblingIdentityPUSCH   INTEGER (0..1023)
OPTIONAL,   -- Need S
  txConfig                      ENUMERATED
                                {codebook, nonCodebook}
OPTIONAL,   -- Need S
  dmrs-UplinkForPUSCH-          SetupRelease
MappingTypeA                    { DMRS-UplinkConfig }
OPTIONAL,   -- Need M
  dmrs-UplinkForPUSCH-          SetupRelease
MappingTypeB                    { DMRS-UplinkConfig }
OPTIONAL,   -- Need M
  pusch-PowerControl            PUSCH-PowerControl
OPTIONAL,   -- Need M
  frequencyHopping              ENUMERATED
                                {intraSlot, interSlot}
```

TABLE 23-continued

```
OPTIONAL, -- Need S
  frequencyHoppingOffsetLists  SEQUENCE (SIZE
                                   (1..4)) OF
  INTEGER (1..maxNrofPhysicalResourceBlocks-1)
OPTIONAL, -- Need M
  resourceAllocation           ENUMERATED
                                 { resourceAllocation-
                                   Type0,
resourceAllocationType1, dynamicSwitch},
  pusch-TimeDomainAllocation-  SetupRelease { PUSCH-
List
TimeDomainResourceAlloca-      OPTIONAL, -- Need M
tionList }
  pusch-AggregationFactor      ENUMERATED
                                 { n2, n4, n8 }
OPTIONAL, -- Need S
  mcs-Table                    ENUMERATED
                                 {qam256, qam64LowSE}
OPTIONAL, -- Need S
  mcs-TableTransformPrecoder   ENUMERATED
                                 {qam256, qam64LowSE}
OPTIONAL, -- Need S
  transformPrecoder            ENUMERATED
                                 {enabled, disabled}
OPTIONAL, -- Need S
  codebookSubset               ENUMERATED
{fullyAndPartialAndNonCoherent, partialAndNonCoher-
ent
,nonCoherent}
OPTIONAL, -- Cond codebookBased
  maxRank                              INTEGER (1..4)
OPTIONAL, -- Cond codebookBased
  rbg-Size                     ENUMERATED
                                 { config2}
OPTIONAL, -- Need S
  uci-OnPUSCH                       SetupRelease
                                 { UCI-OnPUSCH}
OPTIONAL, -- Need M
  tp-pi2BPSK                   ENUMERATED
                                 {enabled}
OPTIONAL, -- Need S
  ...
}
```

Codebook-based PUSCH transmission is described in greater detail below. Codebook-based PUSCH transmission may be dynamically scheduled by DCI format 0_0 or 0_1, or semi-statically operated by the configured grant. When the codebook-based PUSCH transmission is dynamically scheduled by DCI format 0_1 or semi-statically configured by the configured grant, the UE determines a precoder for PUSCH transmission based on an SRS resource indicator (SRI), a transmission precoding matrix indicator (TPMI), and a transmission rank (the number of PUSCH transmission layers).

In this case, the SRI may be given by an SRS resource indicator, which is a field in DCI, or configured by higher layer signaling srs-ResourceIndicator. The UE may be configured with at least one and up to two SRS resources for codebook-based PUSCH transmission. When the UE receives the SRI by DCI, an SRS resource indicated by the SRI refers to an SRS resource corresponding to the SRI among SRS resources transmitted before the PDCCH including the SRI. Furthermore, the TPMI and the transmission rank may be given by 'precoding information and number of layers', which is a field in the DCI, or configured by higher layer signaling precodingAndNumberOfLayers. The TPMI is used to indicate a precoder to be applied for PUSCH transmission. When the UE is configured with one SRS resource, the TPMI is used to indicate a precoder to be applied in the configured SRS resource. When the UE is configured with a plurality of SRS resources, the TPMI is used to indicate a precoder to be applied in the SRS resource indicated by the SRI.

The precoder to be used for PUSCH transmission is selected from an UL codebook having the same number of antenna ports as a value of nrofSRS-Ports in higher layer signaling SRS-Config. In the codebook-based PUSCH transmission, the UE determines a codebook subset based on the TPMI and codebookSubset in higher layer signaling pusch-Config. The codebookSubset in the higher layer signaling pusch-Config may be configured as one of 'fullyAndPartialAndNonCoherent', 'partialAndNonCoherent', and 'nonCoherent' based on a UE capability reported by the UE to the BS. When the UE reports 'partialAndNonCoherent' in the UE capability, the UE does not expect that higher layer signaling codebookSubset is configured to have a value of 'fullyAndPartialAndNonCoherent'. When the UE reports 'nonCoherent' in the UE capability, the UE does not expect that higher layer signaling codebookSubset is configured to have a value of 'fullyAndPartialAndNonCoherent' or 'partialAndNonCoherent'. When nrofSRS-Ports in higher layer signaling SRS-ResourceSet indicates two SRS antenna ports, the UE does not expect that higher layer signaling codebookSubset is configured to have a value of 'partialAndNonCoherent'.

The UE may be configured with one SRS resource set with a value of the usage in higher layer signaling SRS-ResourceSet configured to 'codebook', and one SRS resource in the SRS resource set may be indicated by the SRI. When a plurality of SRS resources in the SRS resource set with a value of the usage in higher layer signaling SRS-ResourceSet configured to 'codebook' are configured, the UE expects that nrofSRS-Ports in higher layer signaling SRS-Resource is configured to have the same value for all SRS resources.

The UE transmits, to the BS, one or multiple SRS resources included in the SRS resource set with a value of the usage configured to 'codebook' by higher layer signaling, and the BS selects one of the SRS resources transmitted from the UE and indicates that the UE is allowed to perform PUSCH transmission by using transmission beam information regarding the SRS resource. In this case, as for the codebook based PUSCH transmission, the SRI is used as information for selecting an index of one SRS resource, and the SRI may be included in DCI. Additionally, the BS may add, to the DCI, information indicating a TPMI and a rank to be used by the UE for PUSCH transmission. The UE uses the SRS resource indicated by the SRI to perform PUSCH transmission by applying the precoder indicated by the rank and the TPMI indicated based on a transmission beam of the SRS resource.

Non-codebook based PUSCH transmission is described in greater detail below. Non-codebook based PUSCH transmission may be dynamically scheduled by DCI format 0_0 or 0_1, or semi-statically operated by the configured grant. When at least one SRS resource in the SRS resource set with a value of the usage in higher layer signaling SRS-ResourceSet configured to 'nonCodebook' is configured, the UE may be scheduled for non-codebook-based PUSCH transmission by DCI format 0_1.

The UE may be configured with one non-zero power CSI-RS (NZP CSI-RS) resource associated with the SRS resource set with a value of the usage in SRS-ResourceSet configured to 'nonCodebook' via higher layer signaling. The UE may perform calculation on a precoder for SRS transmission by measuring the NZP CSI-RS resource associated with the SRS resource set. When a gap between a last received symbol of an aperiodic NZP CSI-RS resource associated with the SRS resource set and the first symbol of aperiodic SRS transmission from the UE is less than 42 symbols, the UE does not expect information about the precoder for SRS transmission to be updated.

When a value of resourceType in higher layer signaling SRS-ResourceSet is configured to 'aperiodic', an associated NZP CSI-RS is indicated in an SRS request, which is a field in DCI format 0_1 or 1_1. In this case, when the associated NZP CSI-RS resource is an aperiodic NZP CSI-RS resource and a value of the SRS request, which is the field in DCI format 0_1 or 1_1, is not '00', it may indicate that there is an NZP CSI-RS associated with the SRS resource set. In this case, the DCI needs to not indicate cross carrier or cross BWP scheduling. Furthermore, when the value of the SRS request indicates the presence of the NZP CSI-RS, the NZP CSI-RS is located i—n a slot in which a PDCCH including the SRS request field is transmitted. In this case, TCI states configured for a scheduled subcarrier are not configured to QCL-TypeD.

When a periodic or semi-persistent SRS resource set is configured, an associated NZP CSI-RS may be indicated by associatedCSI-RS in higher layer signaling SRS-Resource-Set. For non-codebook-based transmission, the UE does not expect both higher layer signaling spatialRelationInfo for an SRS resource and associatedCSI-RS in the higher layer signaling SRS-ResourceSet to be configured.

When configured with a plurality of SRS resources, the UE may determine a precoder and a transmission rank to be applied for PUSCH transmission based on the SRI indicated by the BS. In this case, the SRI may be indicated by an SRS resource indicator, which is a field in DCI, or configured by higher layer signaling srs-ResourceIndicator. Similar to the codebook based PUSCH transmission, when the UE receives the SRI by DCI, an SRS resource indicated by the SRI refers to an SRS resource corresponding to the SRI among SRS resources transmitted before the PDCCH including the SRI. The UE may use one or more SRS resources for SRS transmission, and the maximum number of SRS resources available for simultaneous transmission in the same symbol in one SRS resource set and the maximum number of SRS resources are determined by a UE capability reported by the UE to the BS. In this case, the SRS resources simultaneously transmitted by the UE occupy the same RB. The UE configures one SRS port for each SRS resource. Only one SRS resource set with a value of the usage in the higher layer signaling SRS-ResourceSet configured to 'non-Codebook' may be configured, and up to four SRS resources may be configured for non-codebook-based PUSCH transmission.

The BS transmits one NZP-CSI-RS associated with the SRS resource set to the UE, and the UE calculates a precoder to be used for transmission of one or more SRS resources in the SRS resource set based on a result of measurement during reception of the NZP CSI-RS. The UE may apply the precoder calculated to transmit one or more SRS resources in the SRS resource set with the usage configured to 'non-Codebook' to the BS, and the BS selects one or more of the received SRS resources. In this case, as for the non-codebook based PUSCH transmission, the SRI indicates an index that may represent a combination of one or more SRS resources, and the SRI is included in DCI. In this case, the number of SRS resources indicated by the SRI transmitted from the BS may be the number of transmission layers of the PUSCH, and the UE transmits the PUSCH by applying the precoder applied for SRS resource transmission to each layer.

PUSCH: Preparation Procedure Time

A PUSCH preparation procedure time is described in detail below. When the BS schedules the UE to transmit a PUSCH using DCI format 0_0 or DCI format 0_1, the UE may need a PUSCH preparation procedure time to transmit the PUSCH by applying a transmission method (an SRS resource transmission precoding method, the number of transmission layers, or a spatial domain transmission filter) indicated by DCI. In NR, the PUSCH preparation procedure time is defined in consideration of the above. A PUSCH preparation procedure time of the UE may conform to Equation (4) below.

$$T_{proc,2}=\max((N_2+d_{2,1}+d_2)(2048+144)\kappa 2^{-\mu}T_c+T_{ext}+T_{switch},d_{2,2}) \quad (4)$$

Variables in $T_{proc,2}$ described in Equation (4) may have the following meanings:

$N_2$: the number of symbols determined according to a UE processing capability 1 or 2 of UE capability and numerology $\mu$. $N_2$ may have a value in Table 24 below when the UE processing capability 1 is reported in a UE capability report, and a value in Table 25 below when the UE processing capability 2 is reported in the UE capability report and the UE processing capability 2 is configured as being available by higher layer signaling.

TABLE 24

| $\mu$ | PUSCH preparation time $N_2$ [symbols] |
|---|---|
| 0 | 10 |
| 1 | 12 |
| 2 | 23 |
| 3 | 36 |

TABLE 25

| $\mu$ | PUSCH preparation time $N_2$ [symbols] |
|---|---|
| 0 | 5 |
| 1 | 5.5 |
| 2 | 11 for frequency range 1 |

$d_{2,1}$: the number of symbols determined to be 0 when resource elements of a first OFDM symbol of PUSCH transmission are all configured to consist of DMRSs, or 1 otherwise.

$\kappa$: 64

$\mu$: follows whichever of $\mu_{DL}$ or $\mu_{UL}$ makes $T_{proc,2}$ greater. $\mu_{DL}$ refers to numerology of a DL via which a PDCCH including DCI that schedules a PUSCH is transmitted, and $\mu_{UL}$ refers to numerology of a UL via which a PUSCH is transmitted.

$T_c$: $1/(\Delta f_{max} \cdot N_f)$, $\Delta f_{max}=480\cdot 10^3$ Hz, $N_f=4096$.

$d_{2,2}$: follows a BWP switching time when the DCI that schedules the PUSCH indicates BWP switching, or is 0 otherwise.

$d_2$: when OFDM symbols of a PUCCH, a PUSCH having a high priority index, and a PUCCH having a low priority index overlap each other in time, a $d_2$ value of the PUSCH having the high priority index may be used. Otherwise, $d_2$ is 0.

$T_{ext}$: when the UE uses a shared spectrum channel access scheme, the UE calculates $T_{ext}$ to be applied to the PUSCH preparation procedure time. Otherwise, $T_{ext}$ is assumed to be 0.

$T_{switch}$: $T_{switch}$ is assumed as a switching interval time when a UL switching interval is triggered. Otherwise, $T_{switch}$ is assumed to be 0.

The BS and the UE determine that the PUSCH preparation procedure time is not sufficient when a first symbol of the PUSCH starts earlier than a first UL symbol in which CP starts after $T_{proc,2}$ from a last symbol of the PDCCH including the DCI that schedules the PUSCH, in consideration of time axis resource mapping information regarding the PUSCH scheduled by the DCI and an influence of timing advance (TA) between the UL and the DL. Otherwise, the BS and the UE determine that the PUSCH preparation procedure time is sufficient. The UE may transmit the PUSCH only when the PUSCH preparation procedure time is sufficient, and may ignore the DCI that schedules the PUSCH when the PUSCH preparation procedure time is not sufficient.

A PUSCH repetitive transmission is described in detail below. In a case in which the UE is scheduled for PUSCH transmission in DCI format 0_1 in a PDCCH including CRC scrambled by a C-RNTI, an MCS-C-RNTI, or a CS-RNTI, when the UE is configured with higher layer signaling pusch-AggregationFactor, the same symbol allocation is applied in consecutive slots as many as pusch-AggregationFactor, and PUSCH transmission is limited to single rank transmission. For example, the UE needs to repeat the same transport block (TB) in consecutive slots as many as pusch-AggregationFactor and needs to apply the same symbol allocation to each slot. Table 26 represents a redundancy version applied to PUSCH repetitive transmission for each slot. When the UE is scheduled for PUSCH repetitive transmission in DCI format 0_1 in a plurality of slots and at least one symbol among slots in which PUSCH repetitive transmission is performed according to higher layer signaling tdd-UL-DL-ConfigurationCommon or tdd-UL-DL-ConfigurationDedicated information is indicated as a DL symbol, the UE does not perform PUSCH transmission in a slot in which the symbol is located.

TABLE 26

| $rv_{id}$ indicated by the | $rv_{id}$ to be applied to $n^{th}$ transmission occasion | | | |
|---|---|---|---|---|
| DCI scheduling the PUSCH | n mod 4 = 0 | n mod 4 = 1 | n mod 4 = 2 | n mod 4 = 3 |
| 0 | 0 | 2 | 3 | 1 |
| 2 | 2 | 3 | 1 | 0 |
| 3 | 3 | 1 | 0 | 2 |
| 1 | 1 | 0 | 2 | 3 |

PUSCH: Regarding Repetitive Transmission

UL data channel repetitive transmission in the 5G system is described in detail below. The 5G system supports two types of UL data channel repetitive transmission methods (i.e., PUSCH repetitive transmission type A and PUSCH repetitive transmission type B). The UE may be configured with one of the PUSCH repetitive transmission types A and B by higher layer signaling.

PUSCH Repetitive Transmission Type A (PUSCH Repetition Type A)

As described above, a symbol length and a start symbol location of a UL data channel may be determined in a time domain resource allocation method in one slot, and the BS may notify the UE of the number of repetitive transmissions by higher layer signaling (e.g., RRC signaling) or L1 signaling (e.g., DCI).

The UE may repetitively transmit the same UL data channel in consecutive slots of a repetitive transmission period identified based on a UL data channel length configured based on the start symbol and the number of repetitive transmissions. In this case, when there is a slot configured as DL for the UE by the B S in the repetitive transmission period or at least one symbol configured as DL among symbols of the UL data channel configured for the UE, the UE skips UL data channel transmission but counts the number of repetitive transmissions of the UL data channel in the slot or symbol.

PUSCH Repetitive Transmission Type B (PUSCH Repetition Type B)

As described above, a start symbol and length of a UL data channel may be determined in a time domain resource allocation method in one slot, and the BS may notify the UE of the number of repetitive transmissions, numberofrepetitions, by higher layer signaling (e.g., RRC signaling) or L1 signaling (e.g., DCI).

Based on the start symbol and length of the UL data channel configured earlier, nominal repetition of the UL data channel is determined as follows: A slot in which an n-th nominal repetition starts is given by $$K_s + \left\lfloor \frac{S + n \cdot L}{N_{symb}^{slot}} \right\rfloor,$$

and a start symbol in the slot is given by mod($S+n \cdot L$, $N_{symb}^{slot}$). A slot in which the n-th nominal repetition ends is given by $$K_s + \left\lfloor \frac{S + (n+1) \cdot L - 1}{N_{symb}^{slot}} \right\rfloor,$$

and an end symbol in the slot is given by mod($S+(n+1) \cdot L-1$, $N_{symb}^{slot}$). In this case, n=0, ..., numberofrepetitions−1, S denotes a start symbol of the configured UL data channel, and L denotes a symbol length of the configured UL data channel. κ indicates a slot in which PUSCH transmission starts, and $N_{symb}^{slot}$ indicates the number of symbols per slot.

For PUSCH repetitive transmission type B, the UE may determine a particular OFDM symbol as an invalid symbol for the following cases:

1. A symbol configured as DL by tdd-UL-DL-ConfigurationCommon or tdd-UL-DL-ConfigurationDedicated may be determined as an invalid symbol for the PUSCH repetitive transmission type B.

2 Symbols indicated by ssb-PositionsInBurst in SIB1 for SSB reception in an unpaired spectrum (TDD spectrum) or ssb-PositionsInBurst in higher layer signaling ServingCellConfigCommon may be determined as invalid symbols for the PUSCH repetitive transmission type B.

3. Symbols indicated by pdcch-ConfigSIB1 in an MIB to transmit a CORESET associated with a Type0-PDCCH CSS set in the unpaired spectrum (TDD spectrum) may be determined as invalid symbols for the PUSCH repetitive transmission type B.

4. When higher layer signaling numberOfInvalidSymbolsForDL-UL-Switching is configured in the unpaired spectrum (TDD spectrum), symbols as many as numberOfInvalidSymbolsForDL-UL-Switching from symbols configured as DL by tdd-UL-DL-ConfigurationCommon or tdd-UL-DL-ConfigurationDedicated may be determined as invalid symbols.

Furthermore, the invalid symbol may be configured in a higher layer parameter (e.g., InvalidSymbolPattern).

The higher layer parameter (e.g., InvalidSymbolPattern) may provide a symbol-level bitmap spanning one or two slots to configure invalid symbols. In the bitmap, '1' represents an invalid symbol. In addition, periodicity and a pattern of the bitmap may be configured in a higher layer parameter (e.g., periodicityAndPattern). When the higher layer parameter (e.g., InvalidSymbolPattern) is configured and parameter InvalidSymbolPatternIndicator-ForDCIFormat0_1 or InvalidSymbolPatternIndicator-ForDCIFormat0_2 indicates '1', the UE applies an invalid symbol pattern, and when the parameter indicates '0', the UE does not apply the invalid symbol pattern. When the higher layer parameter (e.g., InvalidSymbolPattern) is configured and the parameter InvalidSymbolPatternIndicator-ForDCIFormat0_1 or InvalidSymbolPatternIndicator-ForDCIFormat0_2 is not configured, the UE applies the invalid symbol pattern.

After the invalid symbol is determined, the UE may consider symbols other than the invalid symbol as valid symbols for each nominal repetition. When one or more valid symbols are included in each nominal repetition, the nominal repetition may include one or more actual repetitions. In this case, each of the actual repetitions includes a set of consecutive valid symbols available for the PUSCH repetitive transmission type B in one slot. In a case in which an OFDM symbol length of the nominal repetition is not 1, when a length of the actual repetition is 1, the UE may ignore transmission for the actual repetition.

Figure 13:
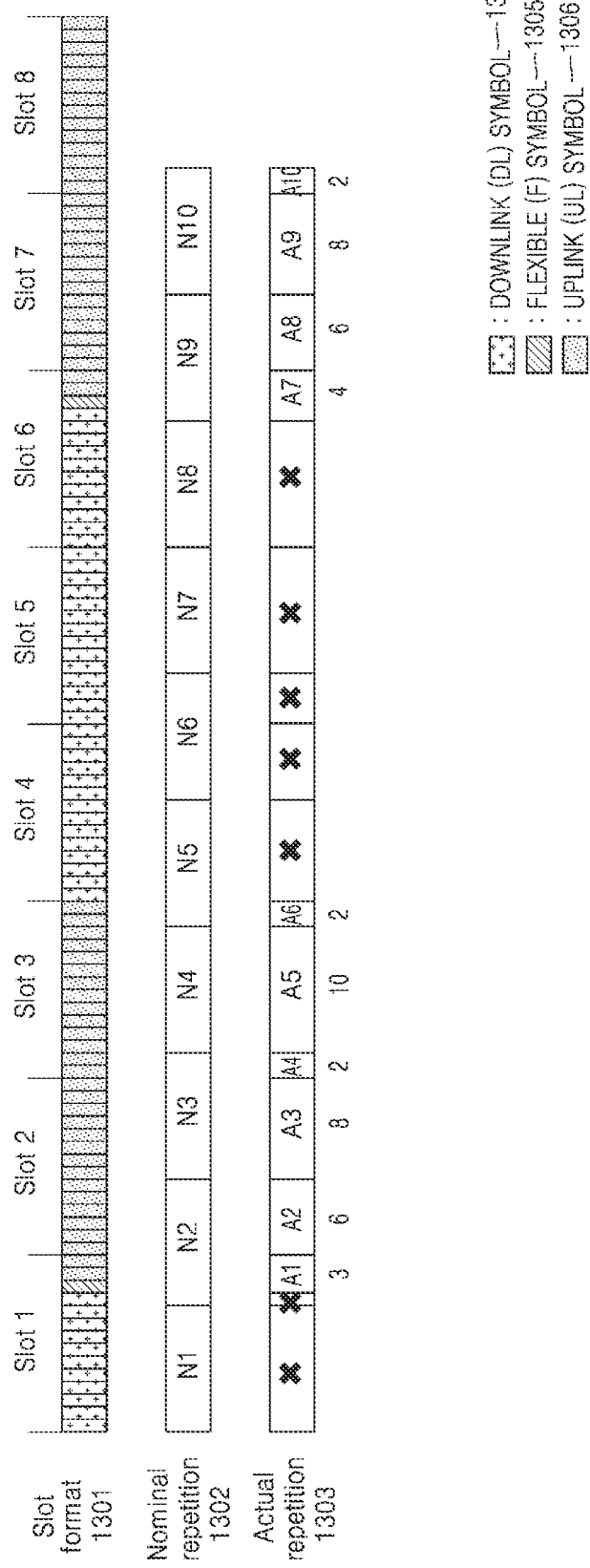
FIG. 13 illustrates an example of physical uplink shared channel (PUSCH) repetition type B according to an embodiment.

FIG. 13 illustrates an example of PUSCH repetition type B, according to an embodiment.

FIG. 13 illustrates an example in which, as for nominal repetition, the UE receives a transmission start symbol S configured as 0, a transmission symbol length L configured as 10, and a number of repetitive transmissions configured as 10, and the nominal repetition may be represented as N1 to N10 1302. The UE may determine actual repetition by determining an invalid symbol in consideration of a slot format 1301, and the actual repetition may be represented as A1 to A10 1303. The slot 1301 may include a DL symbol 1304, a flexible symbol 1305, and/or an UL symbol 1306. In this case, according to the above-described invalid symbol and actual repetition determination method, when the PUSCH repetition type B is not transmitted in a symbol in which slot format is determined to be DL, and there is a slot boundary within the nominal repetition, the nominal repetition may be divided into two actual repetitions based on the slot boundary and transmitted. For example, A1 that refers to a first actual repetition may be composed of three OFDM symbols, and A2 that may be transmitted thereafter may be composed of six OFDM symbols.

Moreover, as for PUSCH repetitive transmission, the NR release 16 may define additional methods for UL grant-based PUSCH transmission and configured grant-based PUSCH transmission across the slot boundary as follows:

Method 1 (mini-slot level repetition): two or more PUSCH repetitive transmissions in one slot or across consecutive slots are scheduled by one UL grant. Time domain resource allocation information in DCI indicates a resource for a first repetitive transmission. Furthermore, time domain resource information regarding the remaining repetitive transmissions may be determined according to the time domain resource information regarding the first repetitive transmission and a UL or DL direction determined for each symbol of each slot. Each repetitive transmission occupies consecutive symbols.

Method 2 (multi-segment transmission): two or more PUSCH repetitive transmissions in consecutive slots are scheduled by one UL grant. In this case, one transmission is designated for each slot, and each transmission may have a different start point or repetition length. Time domain resource allocation information in DCI indicates start points and repetition lengths of all the repetitive transmissions. Furthermore, in a case in which repetitive transmissions are performed in a single slot, when there are several groups of consecutive UL symbols in the slot, each repetitive transmission is performed for each of the UL symbol groups. When there is only one group of consecutive UL symbols in the slot, one PUSCH repetitive transmission is performed according to the method of NR release 15.

Method 3: two or more PUSCH repetitive transmissions in consecutive slots are scheduled by two or more UL grants. In this case, one transmission is designated for each slot, and an n-th UL grant may be received before PUSCH transmission scheduled by a (n−1)-th UL grant is completed.

Method 4: By one UL grant or one configured grant, one or more PUSCH repetitive transmissions in a single slot or two or more PUSCH repetitive transmissions across consecutive slots may be supported. The number of repetitions indicated by the BS to the UE is a nominal value, and the actual number of PUSCH repetitive transmissions performed by the UE may be greater than the nominal number of repetitions. Time domain resource allocation information in DCI or configured grant refers to a resource of the first repetitive transmission indicated by the BS. The time domain resource information regarding the remaining repetitive transmissions may be determined with reference to at least resource information regarding the first repetitive transmission and UL or DL directions of the symbols. When time domain resource information regarding the repetitive transmission indicated by the BS spans a slot boundary or includes a UL-DL switching point, the repetitive transmission may be divided into a plurality of repetitive transmissions. In this case, one repetitive transmission may be included in each UL period in one slot.

Rate Matching for Uplink Control Information (UCI) Multiplexed to PUSCH

Rate matching for UCI in the 5G system is described in detail below. First, before describing rate matching for UCI, a case in which UCI is multiplexed to a PUSCH is described. When the PUCCH overlaps the PUSCH and a timeline condition for UCI multiplexing is satisfied, the UE may multiplex HARQ-ACK and/or CSI information included in the PUCCH to the PUSCH according to UCI information included in the PUSCH and may not transmit the PUCCH. In this case, the timeline condition for UCI multiplexing may refer to 3GPP standard TS 38.213 clause 9.2.5. As an example of the timeline condition for UCI multiplexing, in a case in which one of PUCCH transmission or PUSCH transmission is scheduled by DCI, the UE may perform UCI multiplexing only when an earliest PUCCH among the PUCCH and the PUSCH overlapping a slot or a first symbol $S_0$ of the PUSCH satisfies the following conditions:

$S_0$ is not a symbol transmitted before a symbol including a CP starting after $T_{proc,1}^{max}$ from after a last symbol of a corresponding PDSCH. In this case, $T_{proc,1}^{max}$ is the maximum value among $\{T_{proc,1}^{max,i}, \ldots, T_{proc,1}^{max,i}, \ldots\}$ for an i-th PDSCH associated with HARQ-ACK transmitted to the PUCCH in overlapping PUCCH and PUSCH groups. $T_{proc,1}^{max,i}$ is defined as $T_{proc,1}^{max,i}=(N_1+d_{1,1})\cdot(2048+144)\cdot\kappa\cdot 2^{-\mu}\cdot T_C$ as a processing procedure time for the i-th PDSCH. In this case, $d_{1,1}$ is a value determined for the i-th PDSCH with reference to 3GPP standard TS 38.214 clause 5.3, and $N_1$ is a PDSCH processing time according to a PDSCH processing capability. In addition, μ is the smallest subcarrier configuration value among a PDCCH that schedules the i-th PDSCH, the i-th PDSCH, a PUCCH including HARQ-ACK for the i-th PDSCH, and all the PUSCH values of the overlapping PUCCH and PUSCH groups. $T_C$ is $1/(\Delta f_{max}\cdot N_f)$, $\Delta f_{max}=480\cdot 10^3$ Hz, $N_f=4096$, and κ is 64.

This is part of the timeline condition for UCI multiplexing, and when all conditions are satisfied with reference to 3GPP standard TS 38.213 clause 9.2.5, the UE may perform UCI multiplexing on the PUSCH.

When the PUCCH overlaps the PUSCH, the timeline condition for UCI multiplexing is satisfied, and the UE has determined to multiplex UCI included in the PUCCH to the PUSCH, the UE performs UCI rate matching for multiplexing the UCI. UCI multiplexing is performed in the order of HARQ-ACK and configured grant uplink control information (CG-UCI), CSI part 1, and CSI part 2. The UE performs rate matching in consideration of the order of UCI multiplexing. Accordingly, the UE calculates a coded modulation symbol per layer for HARQ-ACK and CG-UCI, and calculates a coded modulation symbol per layer for CSI part 1 in consideration of the coded modulation symbol per layer for HARQ-ACK and CG-UCI. Thereafter, the UE calculates a coded modulation symbol per layer for CSI part 2 in consideration of the coded modulation symbol per layer for HARQ-ACK, CG-UCI, and CSI part 1.

When rate matching is performed according to each UCI type, there are different methods of controlling the number of coded modulation symbols per layer, depending on a repetitive transmission type of the PUSCH to which the UCI is multiplexed and whether UL data (an UL shared channel, hereinafter referred to as UL-SCH) is included. For example, when rate matching is performed on HARQ-ACK, calculation formulae of the coded modulation symbol per layer according to the PUSCH to which the UCI is multiplexed are as in Equations (5), (6), and (7) below.

$$Q'_{ACK} = \min\left\{\left\lceil\frac{(O_{ACK}+L_{ACK})\cdot \beta_{offset}^{PUSCH}\cdot \sum_{l=0}^{N_{symb,all}^{PUSCH}-1} M_{sc}^{UCI}(l)}{\sum_{r=0}^{C_{UL-SCH}-1} K_r}\right\rceil\right. \quad (5)$$

$$\left.\left\lceil\alpha\cdot \sum_{l=l_0}^{N_{symb,all}^{PUSCH}-1} M_{sc}^{UCI}(l)\right\rceil\right\}$$

$$Q'_{ACK} = \min\left\{\left\lceil\frac{(O_{ACK}+L_{ACK})\cdot \beta_{offset}^{PUSCH}\cdot \sum_{l=0}^{N_{symb,nominal}^{PUSCH}-1} M_{sc,nominal}^{UCI}(l)}{\sum_{r=0}^{C_{UL-SCH}-1} K_r}\right\rceil\right. \quad (6)$$

$$\left.\left\lceil\alpha\cdot \sum_{l=0}^{N_{symb,nominal}^{PUSCH}-1} M_{sc,nominal}^{UCI}(l)\right\rceil\cdot\left\lceil\sum_{l=0}^{N_{symb,actual}^{PUSCH}-1} M_{sc,actual}^{UCI}(l)\right\rceil\right\}$$

$$Q'_{ACK} = \left\{\left\lceil\frac{(O_{ACK}+L_{ACK})\cdot \beta_{offset}^{PUSCH}}{R\cdot Q_m}\right\rceil\cdot\left\lceil\alpha\cdot\sum_{l=l_0}^{N_{symb,all}^{PUSCH}-1} M_{sc}^{UCI}(l)\right\rceil\right\} \quad (7)$$

Equation (5) is a calculation formula of a coded modulation symbol per layer for HARQ-ACK multiplexed to a PUSCH in a case in which a PUSCH repetitive transmission type B including a UL-SCH is not used, and Equation (6) is a calculation formula of a coded modulation symbol per layer for HARQ-ACK multiplexed to a PUSCH repetitive transmission type B including a UL-SCH. Equation (7) is a calculation formula of a coded modulation symbol per layer for HARQ-ACK multiplexed to a PUSCH that does not include a UL-SCH. In Equation (5), $O_{ACK}$ is the number of HARQ-ACK bits. $L_{ACK}$ is the number of CRC bits for HARQ-ACK. $\beta_{offset}^{PUSCH}$ is a beta offset for HARQ-ACK and is equal to $\beta_{offset}^{HARQ-ACK}$. $C_{UL-SCH}$ is the number of code blocks of the UL-SCH for PUSCH transmission, and $K_r$ is a code block size of an r-th code block. $M_{sc}^{UCI}(l)$ refers to the number of resource elements available for UCI transmission in a 1 symbol, and the number is determined according to the presence of a DMRS and a phase tracking reference signal (PTRS) of the 1 symbol. When the 1 symbol includes the DMRS, $M_{sc}^{UCI}(l)=0$. For a 1 symbol that does not include a DMRS, $M_{sc}^{UCI}(l)=M_{sc}^{PUSCH}-M_{sc}^{PT-RS}(l)$. $M_{sc}^{PUSCH}$ is the number of subcarriers for a bandwidth in which PUSCH transmission is scheduled, and $M_{sc}^{PT-RS}(l)$ is the number of subcarriers including a PTRS in the 1 symbol. $N_{symb,all}^{PUSCH}$ indicates the total number of symbols of the PUSCH. α is higher layer parameter scaling, which refers to a ratio of UCI-multiplexable resources to all PUSCH transmission resources. $I_e$ indicates an index of a first symbol that does not include a DMRS after a first DMRS. In Equation (6), $M_{sc,nominal}^{UCI}(l)$ indicates the number of resource elements available for UCI transmission for nominal repetition, a symbol including a DMRS is 0, a symbol that does not include a DMRS is equal to $M_{sc,nominal}^{UCI}(l)=M_{sc}^{PUSCH}-M_{sc,nominal}^{PT-RS}(l)$, and $M_{sc,nominal}^{PT-RS}$ and is the number of subcarriers including a PTRS in the 1 symbol for a PUSCH in which nominal repetition is assumed. $N_{symb,nominal}^{PUSCH}$ refers to the total number of symbols for nominal repetition of the PUSCH. $M_{sc,actual}^{UCI}(l)$ indicates the number of resource elements available for UCI transmission for actual repetition, a symbol including a DMRS is 0, a symbol that does not include a DMRS is equal to $M_{sc,actual}^{UCI}(l)=M_{sc}^{PUSCH}-M_{sc,actual}^{PT-RS}(l)$, and $M_{sc,actual}^{PT-RS}$ is the number of subcarriers including a PTRS in the 1 symbols for actual repetition of the PUSCH. $N_{symb,actual}^{PUSCH}$ refers to the total number of symbols for actual repetition of the PUSCH. In Equation (7), R is a code rate of the PUSCH, and $Q_m$ is a modulation order of the PUSCH.

The number of coded modulation symbols per layer for which rate matching of CSI part 1 is performed may also be calculated similarly to HARQ-ACK, but the maximum number of allocable resources among all resources is reduced to a value excluding the number of coded modulation symbols for HARQ-ACK/CG-UCI. Calculation formulae of a coded modulation symbol per layer for CSI part 1 are as shown in Equation (8), Equation (9), Equation (10), and Equation (11) depending on a PUSCH repetitive transmission type and whether a UL-SCH is included.

$$Q'_{CSI-1} = \min\left\{\left\lceil\frac{(O_{CSI-1}+L_{CSI-1})\cdot \beta_{offset}^{PUSCH}\cdot \sum_{l=0}^{N_{symb,all}^{PUSCH}-1} M_{sc}^{UCI}(l)}{\sum_{r=0}^{C_{UL-SCH}-1} K_r}\right\rceil\right. \quad (8)$$

$$\left.\left\lceil\alpha\cdot \sum_{l=0}^{N_{symb,all}^{PUSCH}-1} M_{sc}^{UCI}(l)\right\rceil - Q'_{ACK/CG-UCI}\right\}$$

-continued $$Q'_{CSI-1} = \min\left\{\left\lceil \frac{(O_{CSI-1} + L_{CSI-1}) \cdot \beta_{offset}^{PUSCH} \cdot \sum_{l=0}^{N_{symb,nominal}^{PUSCH}-1} M_{sc,nominal}^{UCI}(l)}{\sum_{r=0}^{C_{UL-SCH}-1} K_r} \right\rceil, \right.$$
$$\left\lceil \alpha \cdot \sum_{l=0}^{N_{symb,nominal}^{PUSCH}-1} M_{sc,nominal}^{UCI}(l) \right\rceil - $$
$$\left. Q'_{ACK/CG-UCI} \cdot \sum_{l=0}^{N_{symb,nominal}^{PUSCH}-1} M_{sc,actual}^{UCI}(l) - Q'_{ACK/CG-UCI} \right\} \quad (9)$$

$$Q'_{CSI-1} = \min\left\{\left\lceil \frac{(O_{CSI-1} + L_{CSI-1}) \cdot \beta_{offset}^{PUSCH}}{R \cdot Q_m} \right\rceil, \sum_{l=0}^{N_{symb,all}^{PUSCH}-1} M_{sc}^{UCI}(l) - Q'_{ACK} \right\} \quad (10)$$

$$Q'_{CSI-1} = \sum_{l=0}^{N_{symb,all}^{PUSCH}-1} M_{sc}^{UCI}(l) - Q'_{ACK} \quad (11)$$

Equation (8) is a calculation formula of a coded modulation symbol per layer for CSI part 1 multiplexed to a PUSCH in a case in which a PUSCH repetitive transmission type B including a UL-SCH is not used, and Equation (9) is a calculation formula of a coded modulation symbol per layer for CSI part 1 multiplexed to a PUSCH repetitive transmission type B including a UL-SCH. Equation (10) is a calculation formula of a coded modulation symbol per layer for multiplexed CSI part 1 when CSI part 1 and CSI part 2 are multiplexed to a PUSCH that does not include a UL-SCH. Equation (11) is a calculation formula of a coded modulation symbol per layer for multiplexed CSI part 1 when CSI part 2 is not multiplexed on a PUSCH that does not include a UL-SCH. In Equation (8), $O_{CSI-1}$ and $L_{CSI-1}$ refer to the number of bits for CSI part 1 and the number of CRC bits for CSI part 1, respectively. $\beta_{offset}^{PUSCH}$ is a beta offset for CSI part 1 and is equal to $\beta_{offset}^{CSI-part1}$. $Q'_{ACK/CG-UCI}$ is the number of coded modulation symbols per layer calculated for HARQ-ACK and/or CG-UCI. Other parameters are identical to parameters required to calculate the number of coded modulation symbols per layer for HARQ-ACK described above.

The number of coded modulation symbols per layer for which rate matching of CSI part 2 is performed may be calculated similarly to CSI part 1, but the maximum number of allocable resources among all resources is reduced to a value excluding the number of coded modulation symbols for HARQ-ACK/CG-UCI and the number of coded modulation symbols for CSI part 2. Calculation formulae of a coded modulation symbol per layer for CSI part 1 are as shown in Equation (12), Equation (13), and Equation (14) depending on a PUSCH repetitive transmission type and whether a UL-SCH is included.

$$Q'_{CSI-2} = \min\left\{\left\lceil \frac{(O_{CSI-2} + L_{CSI-2}) \cdot \beta_{offset}^{PUSCH} \cdot \sum_{l=0}^{N_{symb,all}^{PUSCH}-1} M_{sc}^{UCI}(l)}{\sum_{r=0}^{C_{UL-SCH}-1} K_r} \right\rceil, \right. \quad (12)$$

$$\left. \left\lceil \alpha \cdot \sum_{l=0}^{N_{symb,all}^{PUSCH}-1} M_{sc}^{UCI}(l) \right\rceil - Q'_{ACK/CG-UCI} - Q'_{CSI-1} \right\}$$

$$Q'_{CSI-2} = \min\left\{\left\lceil \frac{(O_{CSI-2} + L_{CSI-2}) \cdot \beta_{offset}^{PUSCH} \cdot \sum_{l=0}^{N_{symb,nominal}^{PUSCH}-1} M_{sc,nominal}^{UCI}(l)}{\sum_{r=0}^{C_{UL-SCH}-1} K_r} \right\rceil, \right. \quad (13)$$

$$\left\lceil \alpha \cdot \sum_{l=0}^{N_{symb,nominal}^{PUSCH}-1} M_{sc,nominal}^{UCI}(l) \right\rceil - Q'_{ACK/CG-UCI} - $$

$$\left. Q'_{CSI-1} \cdot \sum_{l=0}^{N_{symb,nominal}^{PUSCH}-1} M_{sc,actual}^{UCI}(l) - Q'_{ACK/CG-UCI} - Q'_{CSI-1} \right\}$$

$$Q'_{CSI-2} = \sum_{l=0}^{N_{symb,all}^{PUSCH}-1} M_{sc}^{UCI}(l) - Q'_{ACK} - Q'_{CSI-1} \quad (14)$$

Equation (12) is a calculation formula of a coded modulation symbol per layer for CSI part 2 multiplexed to a PUSCH in a case in which a PUSCH repetitive transmission type B including a UL-SCH is not used. Equation (13) is a calculation formula of a coded modulation symbol per layer for CSI part 2 multiplexed to a PUSCH repetitive transmission type B including a UL-SCH. Equation (14) is a calculation formula of a coded modulation symbol per layer for CSI part 2 multiplexed to a PUSCH that does not include a UL-SCH. In Equation (12), $O_{CSI-2}$ and $L_{CSI-2}$ refer to the number of bits for CSI part 2 and the number of CRC bits for CSI part 2, respectively. $\beta_{offset}^{PUSCH}$ is a beta offset for CSI part 2 and is equal to $\beta_{offset}^{CSI-part2}$. Other parameters are identical to parameters required to calculate the number of coded modulation symbols per layer for HARQ-ACK and CSI part 1 described above.

The number of coded modulation symbols per layer for which rate matching of CG-UCI is performed may also be calculated similarly to HARQ-ACK. A calculation formula of a coded modulation symbol per layer for CG-UCI multiplexed to a PUSCH including a UL-SCH is as shown in Equation (15) below.

$$Q'_{CG-UCI} = \min\left\{\left\lceil \frac{(O_{CG-UCI} + L_{CG-UCI}) \cdot \beta_{offset}^{PUSCH} \cdot \sum_{l=0}^{N_{symb,all}^{PUSCH}-1} M_{sc}^{UCI}(l)}{\sum_{r=0}^{C_{UL-SCH}-1} K_r} \right\rceil, \right. \quad (15)$$

$$\left. \left\lceil \alpha \cdot \sum_{l=l_0}^{N_{symb,all}^{PUSCH}-1} M_{sc}^{UCI}(l) \right\rceil \right\}$$

In Equation (15), $O_{CG-UCI}$ and $L_{CG-UCI}$ refer to the number of bits of CG-UCI and the number of CRC bits of CG-UCI, respectively. $\beta_{offset}^{PUSCH}$ is a beta offset for CG-UCI and is equal to $\beta_{offset}^{CG-UCI}$. Other parameters are identical to the parameters required to calculate the number of coded modulation symbols per layer for HARQ-ACK described above.

When HARQ-ACK and CG-UCI are multiplexed to a PUSCH including a UL-SCH, the number of coded modulation symbols per layer for which rate matching of HARQ-ACK and CG-UCI is performed may be calculated as in Equation (16) below.

$$Q'_{CG-UCI} = \min\left\{\left[\frac{(O_{ACK} + O_{CG-UCI} + L_{ACK}) \cdot \beta_{offset}^{PUSCH} \cdot \sum_{l=0}^{N_{symb,all}^{PUSCH}-1} M_{sc}^{UCI}(l)}{\sum_{r=0}^{C_{UL-SCH}-1} K_r}\right], \left[\alpha \cdot \sum_{l=l_0}^{N_{symb,all}^{PUSCH}-1} M_{sc}^{UCI}(l)\right]\right\} \quad (16)$$

In Equation (16), $\beta_{offset}^{PUSCH}$ is a beta offset for HARQ-ACK and is equal to $\beta_{offset}^{HARQ-ACK}$, and other parameters are identical to the parameters required to calculate the number of coded modulation symbols per layer for HARQ-ACK.

In order to effectively handle self-interference between a Tx signal (or DL signal) and an Rx signal (or UL signal), a special type of transmitter/receiver structure may be required. For example, the transmitter/receiver structure shown in FIG. 9 may be considered. In the transmitter structure and the receiver structure shown in FIG. 9, the above-described self-interference may be handled using various methods. For example, the DPD block 911 of the transmitter line-distorts a Tx signal 901 in a digital domain, such that leakage power (e.g., corresponding to the ACL 1005 shown in FIG. 10) emitted to an adjacent band may be minimized. In another example, the SIC block 921 block of the transmitter may serve to cancel a Tx signal received by the receiver, that is, self-interference, from an Rx signal. In addition, various transmission/reception techniques for effective interference control may be applied. In this case, in order for the BS or the UE to effectively handle interference between the transmitter and receiver, parameter values of each of transmitter/receiver blocks need to be set to particular values. In this regard, optimal parameter values of each of the transmitter/receiver blocks for effectively handling interference may be different depending on UL and DL transmission resource patterns. Accordingly, when the UL and DL transmission resource patterns are different, a delay time of a certain amount of time for changing the patterns may occur in each apparatus.

Various embodiments are provided for configuring resources for UL and DL transmission/reception in the time and frequency domain, and a method is provided for transmitting UL channels overlapping in a slot in particular UL and DL transmission/reception resource patterns.

Higher layer signaling may correspond to at least one or one or more combinations of the following signaling:
MIB
SIB or SIB X (X=1, 2, . . . )
RRC
Medium access control (MAC) control element (CE)
UE Capability Reporting
UE assistance information message Furthermore, L1 signaling may correspond to at least one or one or more combinations of the following physical layer channels or signaling:

PDCCH
DCI
UE-specific DCI
Group-common DCI
Common DCI
Scheduling DCI (e.g., DCI used for the purpose of scheduling DL or UL data)
Non-scheduling DCI (e.g., DCI used not for scheduling DL or UL data)
PUCCH
UCI Method of Configuring Resources in XDD System A method and an apparatus are provided for configuring resources for UL or DL transmission/reception in the time domain and the frequency domain through cell-specific configuration information in the XDD system. Through the method of configuring resources for UL or DL transmission/reception, the UE may be configured with a UL resource and a DL resource in different frequency domains within the same time domain. Accordingly, time domain resources on which the UE may perform UL transmission or DL reception may increase, such that UL coverage of the UE and the BS may be enhanced as described above. Hereinafter, for convenience of description, resource configuration for UL or DL transmission/reception will be referred to as UL-DL configuration.

As described above, in the XDD system, the UE may be allocated divided resources for UL and DL transmission/reception in the frequency domain as well as in the time domain, and thus, as in the TDD system, resource configuration for UL or DL transmission/reception is not performed only in the time domain, but rather may be performed in the time domain and the frequency domain, respectively. The BS configures a GB in the UE as described above through resource configuration for UL or DL transmission/reception in the time domain and the frequency domain, such that an influence of interference due to an OOB emission caused by frequency bands of UL and DL resources being relatively closer than in the FDD system may be controlled. Also, even though a UL BWP and a DL BWP have the same center frequency through resource configuration for UL or DL transmission/reception in the time domain and the frequency domain, the UE may determine in which frequency band a resource is actually scheduled and whether a resource may be transmitted or received.

Hereinafter, an UL or a DL configuration method in the time domain and the frequency domain of the XDD system is provided.

The following methods may be considered as a resource configuration method for UL or DL transmission/reception in the time domain and the frequency domain of the XDD system.

Method 1

The BS divides an entire frequency band into n frequency bands (a method of dividing the frequency band into n frequency bands is described in greater detail below), when configuring resources for UL or DL transmission/reception in the time domain and the frequency domain, and indicates the UE to configure UL and DL in the time domain for each of the n frequency bands. Each of the n frequency bands may be composed of a set of consecutive RBs, which may be referred to as a resource block set (RBS) or an RBG, and will be referred to as an RBS herein. In each of the frequency bands, UL-DL configuration information may include UL-DL pattern information and reference subcarrier information. The UL-DL pattern information may indicate a pattern periodicity 603 in the time domain, the number of consecutive DL slots 611 from a start point of each pattern, the number of symbols 612 of a next slot, the number of consecutive UL slots 613 from an end of the pattern, and the number of symbols 614 of a next slot. In this case, slots and symbols for which UL or DL is not indicated may be determined as flexible slots and symbols.

Figure 14:
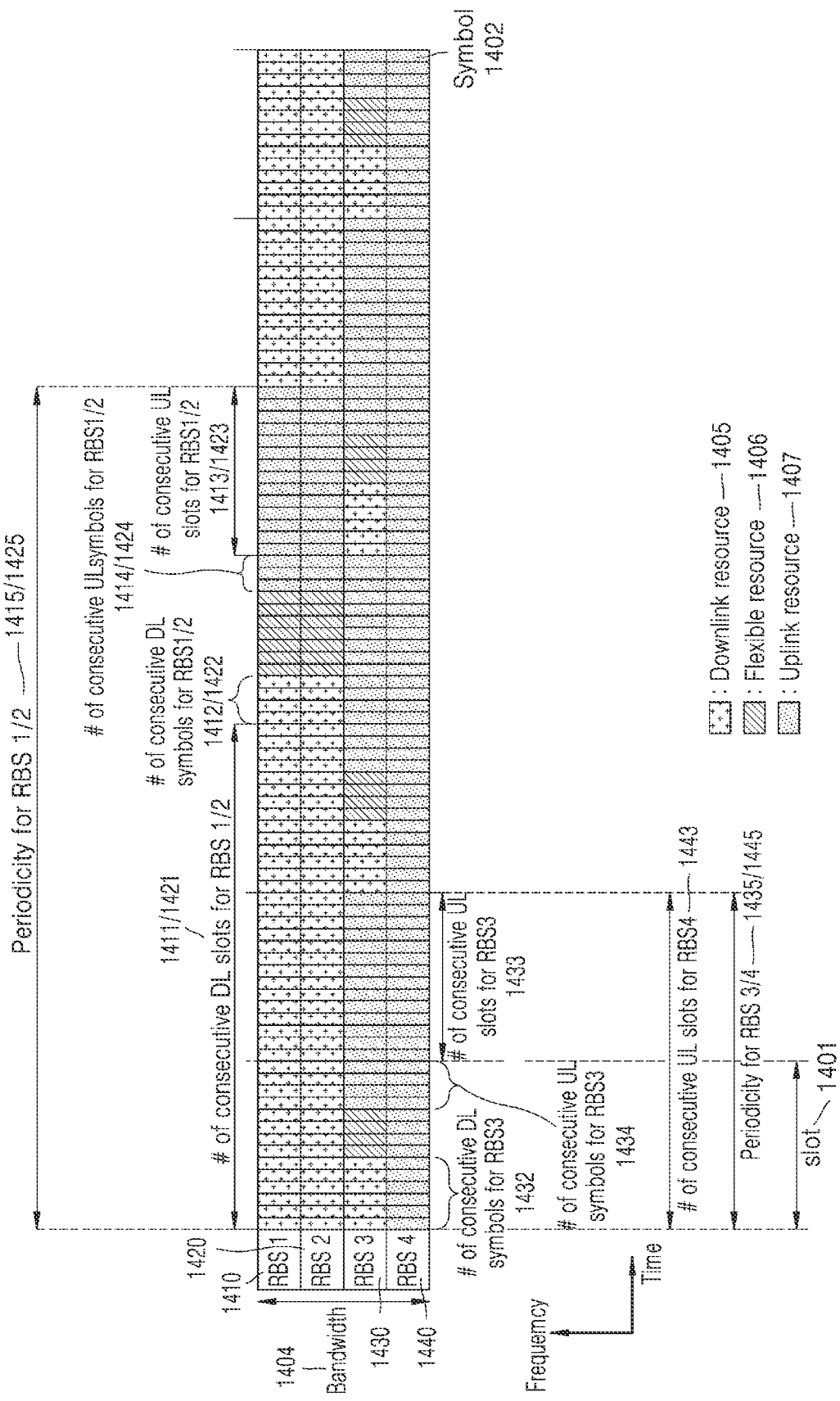
FIG. 14 is a diagram for describing uplink-downlink configuration in a time domain and a frequency domain of an XDD system, according to an embodiment.

FIG. 14 is a diagram for describing UL-DL configuration in a time domain and a frequency domain of an XDD system, according to an embodiment.

Referring to FIG. 14, the entire frequency band is divided into n=4 RBSs 1410, 1420, 1430, and 1440, and each UL-DL in the time domain is configured to each RBS. For example, pattern periodicity for RBS 1 1410 being 5 slots 1415 (or 5 ms based on 15 kHz of SCS), the number of consecutive DL slots from a start point of the pattern being three 1411, the number of DL symbols of a next slot being four 1412, the number of consecutive UL slots from an end of the pattern being one 1413, and the number of UL symbols of a next slot being three 1414 may be configured. UL-DL configuration of RBS 2 1420 may be identical to that of the RBS 1 1410. UL-DL pattern periodicity for RBS 3 1430 being 2 slots 1435 (or 2 ms based on 15 kHz of SCS), the number of consecutive DL slots from a start point of the pattern being zero, the number of DL symbols of a next slot being six 1432, the number of consecutive UL slots from an end of the pattern being one 1433, and the number of UL symbols of a next slot being four 1434 may be configured. Finally, UL-DL pattern periodicity for RBS 4 1440 being 2 slots 1435 (or 2 ms based on 15 kHz of SCS), the number of consecutive DL slots from a start point of the pattern being zero, the number of DL symbols of a next slot being zero, the number of consecutive UL slots from an end of the pattern being two 1433, and the number of UL symbols of a next slot being zero 1434 may be configured.

For UL-DL configuration, UL-DL is configured for each RBS within a limited overhead, and thus, UL or DL resources may be relatively flexibly configured in the time domain.

Method 2

The BS instructs the UE to configure UL-DL in the frequency domain by dividing an entire frequency band into n frequency bands in configuring UL-DL in the time domain and the frequency domain. In each pattern, UL-DL configuration information may include UL-DL pattern information and reference subcarrier information. In the UL-DL pattern information, the number of slot(s)/symbol(s) of the time domain having the same pattern, the number of consecutive DL RBSs from a start point of the entire frequency band, the number of DL RBs of a next RBS, the number of consecutive UL RBSs from an end of the entire frequency band, and the number of consecutive UL RBs of a next RBS may be indicated. In this case, the UE may determine RBSs and RBs for which UL or DL is not indicated as flexible RBSs/RBs.

Figure 15:
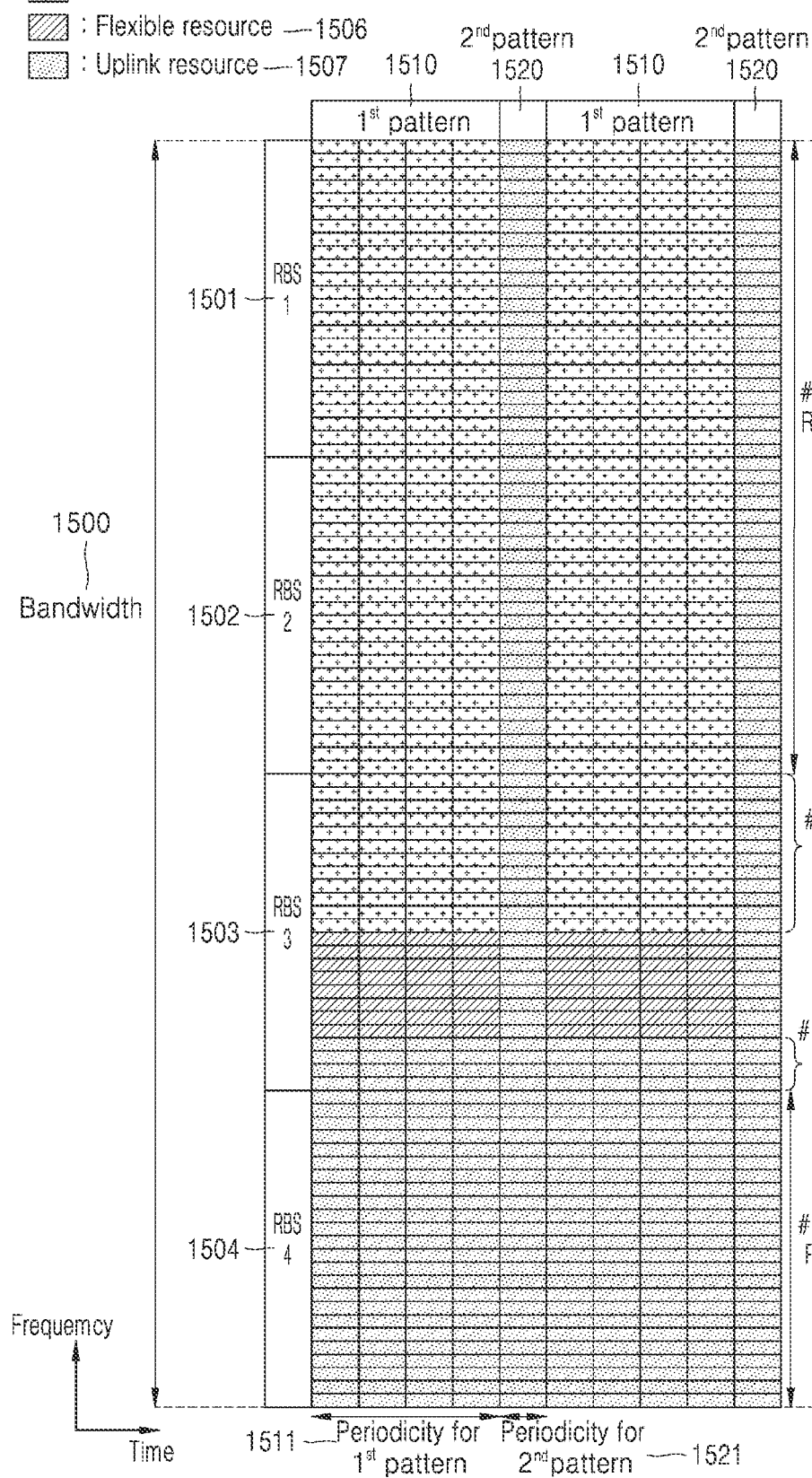
FIG. 15 is a diagram for describing uplink-downlink configuration in a time domain and a frequency domain of an XDD system, according to another embodiment.

FIG. 15 is a diagram for describing UL-DL configuration in a time domain and a frequency domain of an XDD system, according to another embodiment.

Referring to FIG. 15, each RBS includes 24 RBs by dividing an entire frequency band 1500 into 4 RBSs 1501, 1502, 1503, and 1504, and UL-DL is configured in the frequency domain for each pattern. For example, periodicity for a first pattern 1510 being 4 slots 1511 (or 4 ms based on 15 kHz of SCS), the number of consecutive DL RBSs from a start point of the entire frequency band being two 1512, the number of DL RBs of a next RBS being twelve 1513, the number of consecutive UL RBSs from an end of the entire frequency band being one 1514, and the number of UL RBs of a next RBS being 4 1515 may be configured. Periodicity of a second pattern 1520 being 1 slot 1521 (or 1 ms based on 15 kHz of SCS) and the number of consecutive UL RBSs from an end of the entire frequency band being 4 1524 may be configured.

Because UL-DL is configured in the frequency domain with periodicity for the time domain for each pattern within the limited overhead for UL-DL configuration, UL or DL may be relatively flexibly configured in the frequency domain. In this case, in the XDD system, a GB may be efficiently allocated as a method of reducing interference in receiving a UL channel or signal due to OOB emission occurring when the BS transmits a DL channel or signal on a DL resource.

Embodiment 2: Method of Dividing Frequency Band in XDD System

A method is provided of dividing the entire frequency band into n frequency bands. In detail, rather than dividing UL and DL resources only in the time domain as in the TDD system, it is necessary to divide frequency resources into particular units to configure UL-DL resources in the XDD system. In particular, in a case in which the entire frequency band is 100 MHz, when the SCS is 30 kHz, the entire frequency band may include 273 RBs. In this case, when each of the 273 RBs is configured as a UL or DL resource, a significant overhead may occur.

Accordingly, the following methods may be considered as a method of dividing a frequency band into groups for UL-DL configuration in the time domain and the frequency domain in the XDD system.

Method 1

RBs of a frequency band may be composed of n groups of a particular number of RBs. The number of RBs per group may be configured into n groups through UL-DL pattern configuration or based on a mutually pre-agreed number. For example, when the SCS is 30 kHz and the entire frequency band is 100 MHz, the total number of RBs is 273. In this case, when 24 RBs per group are included and indicated in UL-DL pattern configuration or when a mutually pre-agreed number of RBs is configured to 24, a total of n=⌈Total number of RBs/Number of RBs configured per group⌉=⌈273/24⌉=12 groups may be formed. This may be efficiently determined in order to reduce overhead for UL-DL configuration in the frequency domain as described above.

The above-described method is for configuring RBs of a frequency band into n groups of a particular number of RBs, and the number of RBs configured per group is not limited to being determined by UL-DL pattern configuration or a mutually pre-agreed value. Information necessary for configuring the number of RBs per group may also be included in an SIB, user-specific configuration information via dedicated higher layer signaling, an MAC CE, or L1 signaling DL control information.

Method 2

The entire frequency band may be composed of n groups of a particular frequency band. A particular frequency band value per group may be configured into n groups through the UL-DL pattern configuration or based on the mutually pre-agreed number. For example, given that the entire frequency band is 100 MHz, when a frequency band per group is 20 MHz and is included and indicated in UL-DL pattern configuration or when a mutually pre-agreed frequency band is configured to 20 MHz, a total of n=⌈Entire frequency band/Frequency band configured per group⌉=⌈100/20⌉=5 groups may be formed. This may be efficiently determined in order to reduce overhead for UL-DL configuration in the frequency domain as described above.

The above-described method is for configuring a frequency band into n groups of a specific frequency band. A method of configuring a frequency band value per group is not limited to configuring UL-DL patterns, and the frequency band value per group may be configured to a pre-agreed number of RBs. Information used to configure the frequency band value per group may also be included in an SIB, user-specific configuration information via dedicated higher layer signaling, an MAC CE, or L1 signaling DL control information.

Method 3

The entire frequency band may be composed of two groups based on a GB. A frequency band of the GB is indicated through UL-DL pattern configuration, such that two groups of a lower frequency band and a higher frequency band than that of the GB may be configured around the GB. For example, given that the entire frequency band is 100 MHz, when a start location and a size of the GB are configured to a $100^{th}$ common resource block (CRB) based on point A and 50 CRBs, respectively, the entire frequency band may be divided into a first group from point A, which is the frequency band lower than that of the GB, to a $99^{th}$ CRB and a second group from a $150^{th}$ CRB to a last CRB. This may be efficiently determined in order to reduce overhead for UL-DL configuration in the frequency domain as described above. In particular, it is very difficult for the BS to implement resource allocation that avoids consecutive DLs or ULs at the same time point, and as described above, interference caused by OOB may occur between the UL and the DL. Accordingly, when the DL or the UL needs to be always configured consecutively, the entire frequency band may be efficiently divided into two groups by a GB configured between the DL and the UL.

The above-described method is for configuring a frequency band into two groups based on a GB. A method of performing GB-related configuration is not limited to configuring UL-DL pattern, and the GB may be configured to a pre-agreed number of RBs. Information used to configure the GB may also be included in an SIB, user-specific configuration information via dedicated higher layer signaling, an MAC CE, or L1 signaling DL control information.

Embodiment 3: Method of Configuring UL-DL in XDD System

UL and DL resources may be flexibly configured in the time and frequency domain. That is, an arbitrary time and frequency resource may be configured as UL or DL. In the following descriptions, configuration of an arbitrary time and frequency resource as UL or DL will be referred to as "UL-DL configuration (UL_DL_Configuration)". The UL-DL configuration may include a DL symbol, a UL symbol, a flexible symbol, or the like.

The UL-DL configuration may be switched to static, semi-static, or dynamic. The BS may configure or indicate UL-DL configuration information to the UE via higher layer signaling, L1 signaling, or a combination of higher layer signaling and L1 signaling. For example, the BS may perform UL-DL configuration on the UE via higher layer signaling. In another example, the BS may perform one or more UL-DL configurations on the UE via higher layer signaling and may activate one of the UL-DL configurations via higher layer signaling (e.g., an MAC CE) or L1 signaling. The UE may obtain the UL-DL configuration information from the BS, expect to receive a signal on a resource configured as DL, and expect to transmit a signal on a resource configured as UL. Various specific UL-DL configuration methods may be provided.

The UL-DL configuration may be switched based on L1 signaling (e.g., DCI). Specifically, the BS may transmit, on a PDCCH, a DCI format including an indicator that switches from an arbitrary UL-DL configuration A to an arbitrary UL-DL configuration B. The UE may receive a DCI format including an indicator that switches the UL-DL configuration from the BS and may switch from the arbitrary UL-DL configuration A to the arbitrary UL-DL configuration B based on the received DCI format.

A table including a plurality of UL-DL configurations for switching the UL-DL configuration may be pre-defined, or configured for the UE by the BS via higher layer signaling. For example, a "UL-DL configuration table" including N UL-DL configurations {a UL-DL configuration #1, a UL-DL configuration #2, a UL-DL configuration #3, . . . , a UL-DL configuration #N} may be pre-defined, or configured for the UE by the BS via higher layer signaling. The BS may transmit an indicator that activates an arbitrary UL-DL configuration #X in the UL-DL configuration table to the UE via L1 signaling (e.g., a DCI format). The UE may activate the UL-DL configuration #X indicated by L1 signaling (e.g., the DCI format) received from the BS based on the pre-defined or pre-configured UL-DL configuration table.

When the UL-DL configuration is switched, an additional switching delay time $T_{delay}$ may be considered. As described above, optimal parameter values of respective transmitter/receiver blocks for effectively handling interference between the DL and the UL may be different depending on UL/DL transmission resource patterns, and accordingly, a delay time $T_{delay}$ of a certain time for changing transmitter/receiver parameter values may occur according to the switching of the UL-DL configuration.

Figure 16:
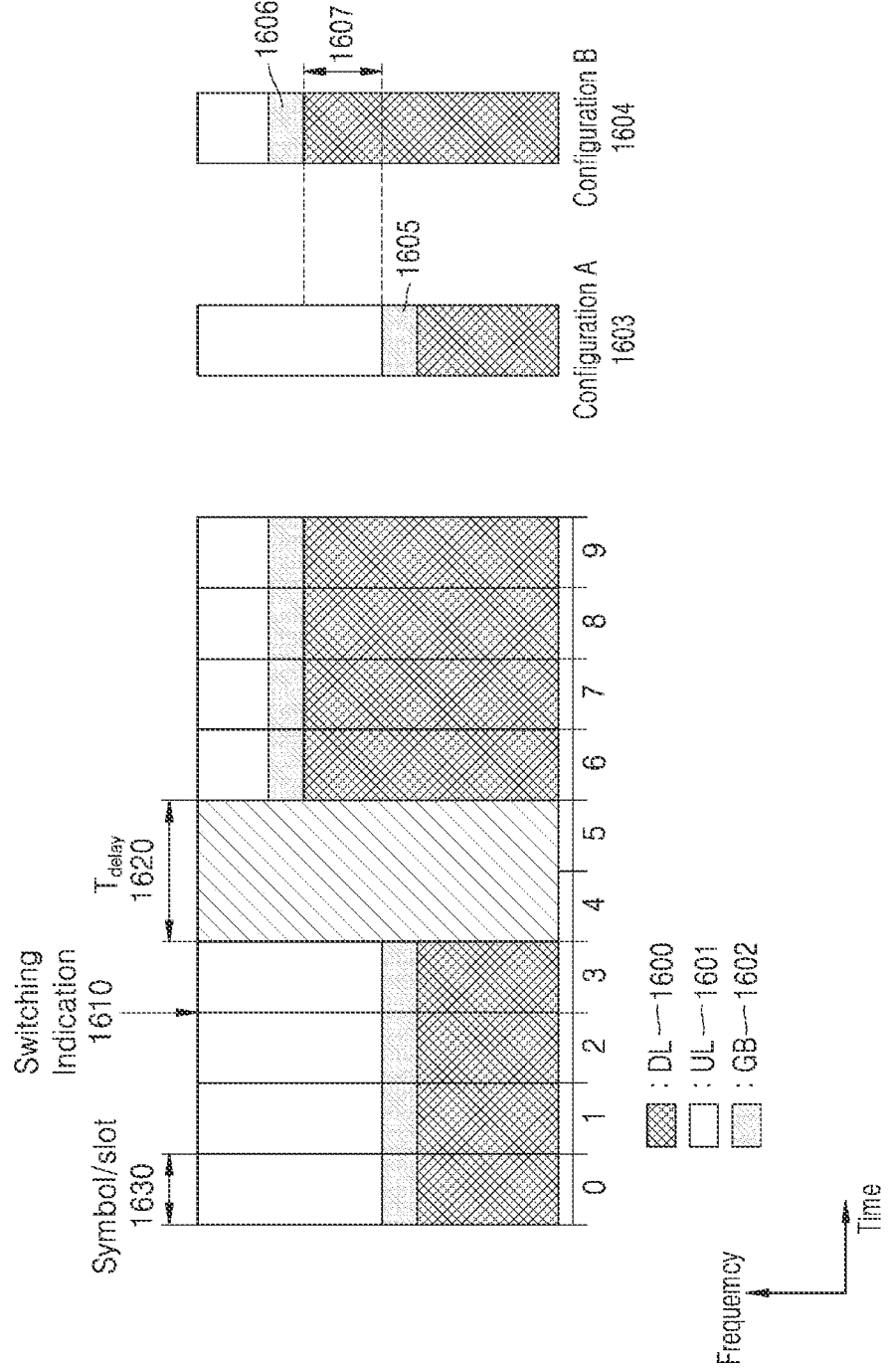
FIG. 16 is a diagram illustrating an example of switching uplink-downlink configuration, according to an embodiment.

FIG. 16 is a diagram for describing an example of switching UL-DL configuration, according to an embodiment.

FIG. 16 illustrates an example in which configuration switching occurs between an arbitrary UL-DL configuration A 1603 and an arbitrary UL-DL configuration B 1604. A resource unit of the time domain may include a symbol, a slot, or various other time units (e.g., a mini slot), and in an example of FIG. 16, a slot unit is assumed. The example of FIG. 16 illustrates an operation in which the BS transmits a UL-DL configuration switching indicator 1610 in a slot 3 and switches the UL-DL configuration from the UL-DL configuration A 1603 to the UL-DL configuration B 1604. In this case, in order to switch the UL-DL configuration from the UL-DL configuration A 1603 to the UL-DL configuration B 1604, a switching time corresponding to $T_{delay}$ 1620 may be required. That is, in order to switch the UL-DL configuration, the BS may transmit the UL-DL configuration switching indicator 1610 in an arbitrary slot n and may operate UL-DL based on UL-DL configuration switched from a time point after a slot $n+T_{delay}$. When the UE receives the UL-DL configuration switching indicator 1610 from the BS in the slot n, the UE may operate based on the UL-DL configuration switched from the time point after the slot $n+T_{delay}$.

The switching delay time $T_{delay}$ 1620 may be limitedly considered when a special "condition A" is satisfied. That is, when the condition A is satisfied, the $T_{delay}$ 1620 may have a value greater than 0, and when the condition A is not satisfied, the $T_{delay}$ 1620 may be 0. For example, at least one of the following conditions or a combination of one or more conditions is satisfied, the $T_{delay}$ 1620 may be considered.

Condition 1

When a UL/DL direction in a particular frequency domain resource is changed in a UL-DL configuration A before switching and a UL-DL configuration B after switching, a switching delay time $T_{delay}$ may be required. For example, in FIG. 16, the UL-DL configuration A 1603 is switched to the UL-DL configuration B 1604, a particular frequency domain resource 1607 may be switched from the UL to the DL. As described above, when a direction change between the UL and the DL occurs in the frequency domain resource, the switching delay time $T_{delay}$ 1620 may be required. When the direction change between the UL and the DL occurs in the frequency domain, because the state of interference between the UL and DL may be changed from the previous state, an additional switching delay time $T_{delay}$ may be required for the BS or the UE to set parameter values of the transmitter/receiver.

Condition 2

When a GB is different in the UL-DL configuration A before switching and the UL-DL configuration B after switching (e.g., when a location or a size of the GB is changed), the switching delay time $T_{delay}$ may be required. For example, in FIG. 16, the UL-DL configuration A 1603 before switching and the UL-DL configuration B 1604 after switching may have different GB locations 1605 and 1606, respectively, in which case the switching delay time $T_{delay}$ 1620 may be required. A GB in the UL-DL configuration may have different sizes and locations required depending on interference between the UL and the DL. That is, configuration information regarding the GB may also be different according to the UL-DL configuration, and a change in the GB may mean that the state of interference between the UL and the DL is different. Accordingly, when the GB is also changed along with the switching of the UL-DL configuration, it may mean that the state of interference between the UL and the DL is different from the previous state. Thus, the additional switching delay time $T_{delay}$ may be required for the BS or the UE to set the parameter values of the transmitter/receiver to optimal values.

Condition 3

When the UL-DL configuration A before switching corresponds to a particular UL-DL configuration X, the switching delay time $T_{delay}$ 1620 may be required. The particular UL-DL configuration X may be pre-defined, may be explicitly pre-configured for the UE by the BS via higher layer signaling, or may be implicitly determined by another system parameter. There may be one or more particular UL-DL configurations X, and when there are a plurality of UL-DL configurations X, the plurality of UL-DL configurations X may constitute a set of UL-DL configurations X. In this case, when the UL-DL configuration A before switching corresponds to an arbitrary UL-DL configuration in the set of UL-DL configurations X, a switching delay time may be required.

Condition 4

When the UL-DL configuration B after switching corresponds to a particular UL-DL configuration Y, the switching delay time $T_{delay}$ 1620 may be required. The particular UL-DL configuration Y may be pre-defined, may be explicitly pre-configured for the UE by the BS via higher layer signaling, or may be implicitly determined by another system parameter. There may be one or more particular UL-DL configurations Y, and when there are a plurality of UL-DL configurations Y, the plurality of UL-DL configurations Y may constitute a set of UL-DL configurations Y. In this case, when the UL-DL configuration B after switching corresponds to an arbitrary UL-DL configuration in the set of UL-DL configurations Y, the switching delay time may be required.

Condition 5

When the UL-DL configuration A before switching corresponds to a particular UL-DL configuration X and the UL-DL configuration B after switching corresponds to a particular UL-DL configuration Y, the switching delay time $T_{delay}$ 1620 may be required. The particular UL-DL configuration X and the UL-DL configuration Y may be pre-defined, may be explicitly pre-configured for the UE by the BS via higher layer signaling, or may be implicitly determined by another system parameter. There may be one or more particular UL-DL configurations X and UL-DL configurations Y, and when there are a plurality of UL-DL configurations X and UL-DL configurations Y, the UL-DL configurations X and the UL-DL configurations Y may constitute a set of UL-DL configurations X and a set of UL-DL configurations Y, respectively. In this case, when the UL-DL configuration A before switching corresponds to an arbitrary UL-DL configuration in the set of UL-DL configurations X and the UL-DL configuration B after switching corresponds to an arbitrary UL-DL configuration in the set of UL-DL configurations Y, the switching delay time may be required.

The switching delay time Tdelay 1620 may always be considered when switching of the UL-DL configuration occurs. That is, regardless of whether the above-described condition A is satisfied, the switching delay time $T_{delay}$ may always be requested.

A UL-DL switching delay time $T_{delay}$ value may be pre-defined as a fixed value. The BS and the US may determine the switching delay time based on the pre-defined $T_{delay}$ value.

The UL-DL switching delay time $T_{delay}$ value may be explicitly configured or notified by the BS to the UE via higher layer signaling. The UE may determine the switching delay time based on the $T_{delay}$ value notified from the BS.

The UL-DL switching delay time $T_{delay}$ value may be notified from the UE to the BS via UE capability signaling. The BS may determine the switching delay time based on the $T_{delay}$ value notified from the UE.

The UL-DL switching delay time $T_{delay}$ value may be defined as different values according to an SCS value. That is, $T_{delay,i}$ may be defined for an SCS i. For example, when the SCS is 15 kHz, $T_{delay,0}$ may be required, when the SCS is 30 kHz, $T_{delay,1}$ may be required, when the SCS is 60 kHz, $T_{delay,2}$ may be required, and when the SCS is 120 kHz, $T_{delay,3}$ may be required.

The UL-DL switching delay time $T_{delay}$ value may be defined as the same value regardless of the SCS value.

The UL-DL switching delay time $T_{delay}$ value may have different values according to UL-DL configuration information before or after switching. For example, when a UL-DL configuration A1 is switched to a UL-DL configuration B1, a switching delay time $T_{delay,1}$ may be required, and for example, when a UL-DL configuration A2 is switched to a UL-DL configuration B2, a switching delay time $T_{delay,2}$ may be required.

The UL-DL switching delay time $T_{delay}$ value may have different values according to a changed frequency domain resource range. The frequency domain resource range may be determined based on at least one of a frequency domain resource band or a frequency domain resource size.

The UE may not expect transmission or reception for the UL-DL switching delay time $T_{delay}$. Specifically, when the UE receives an indicator that switches the UL-DL configuration in the slot n, and the indicator corresponds to switching that requires a UL-DL switching delay time, the UE may not expect transmission or reception from the slot n to the slot n+$T_{delay}$.

A UL-DL configuration switching indicator may be transmitted from the BS to the UE by using at least one method from among common DCI (or a DCI format monitored in a common search space), group-common DCI (or a DCI format monitored in a type-3 common search space), UE-specific DCI (or a DCI format monitored in a UE-specific search space), a DCI format including scheduling, or a DCI format not including scheduling.

The UL-DL configuration switching indicator may include UL-DL configuration information regarding one or more slots. That is, the BS may transmit a configuration switching indicator that indicates UL-DL configuration for one or more slots to the UE, and the UE may receive the configuration switching indicator that indicates the UL-DL configuration for the one or more slots from the BS.

Figure 17A:
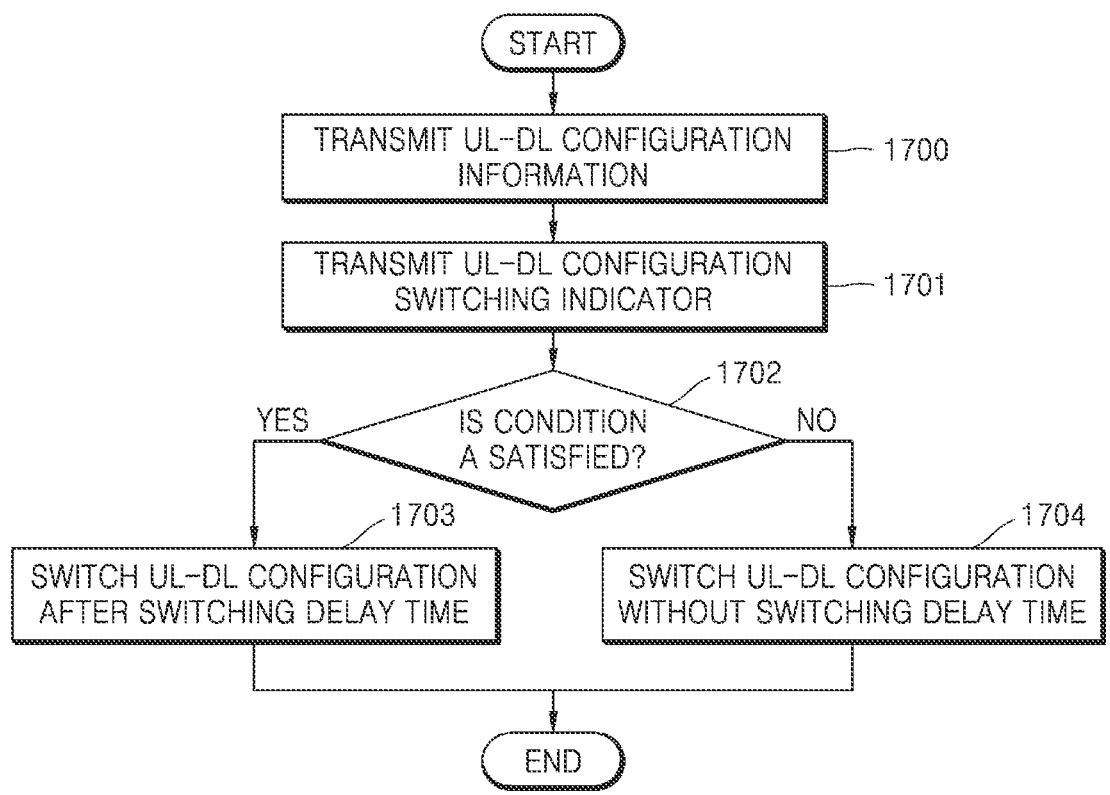
FIG. 17A is a diagram illustrating a procedure performed by a base station according to an embodiment.

FIG. 17A is a diagram illustrating a procedure performed by the BS, according to an embodiment.

First, referring to FIG. 17A, in operation 1700, the BS may transmit configuration information regarding the UL and the DL to the UE. In operation 1701, the BS may transmit a UL-DL configuration switching indicator to the BS. In operation 1702, the BS may determine whether a condition A is satisfied. When it is determined that the condition A is satisfied, in operation 1703, the BS may switch UL-DL configuration in consideration of a switching delay time. When it is determined that the condition A is not satisfied, in operation 1704, the BS may switch the UL-DL configuration without the switching delay time.

Figure 17B:
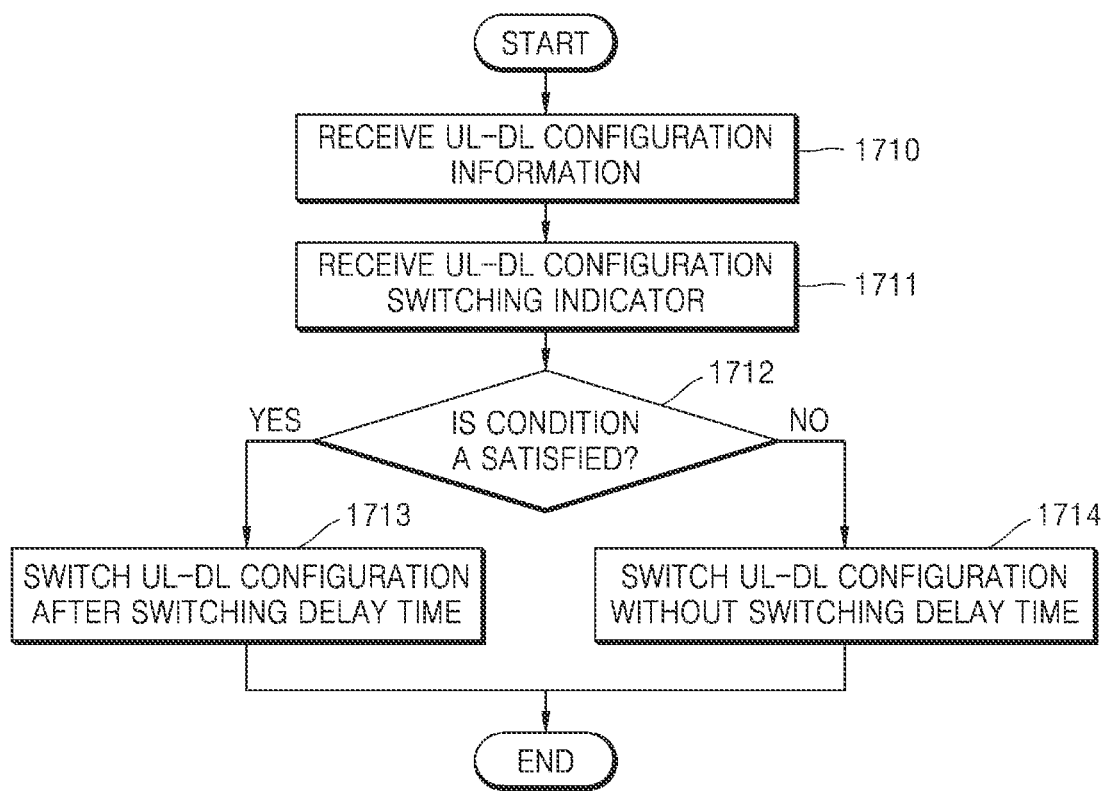
FIG. 17B is a diagram illustrating a procedure performed by a terminal according to an embodiment.

FIG. 17B is a diagram illustrating a procedure performed by the UE, according to an embodiment.

Referring to FIG. 17B, in operation 1710, the BS may receive configuration information regarding the UL and the DL from the BS. In operation 1711, the UE may receive a UL-DL configuration switching indicator from the BS. In operation 1712, the UE may determine whether a condition A is satisfied. When it is determined that the condition A is satisfied, in operation 1713, the UE may switch UL-DL configuration in consideration of a switching delay time. When it is determined that the condition A is not satisfied, in operation 1714, the UE may switch the UL-DL configuration without the switching delay time.

Embodiment 4: Method of Transmitting Overlapping UL Channels in XDD System Using Single Carrier A method of transmitting overlapping UL signals (e.g., a PUCCH and a PUSCH) in a single carrier based XDD system rather than carrier aggregation (CA) is described in detail below.

In the XDD system, a case in which a UL resource and a DL resource in a particular time resource (slot or OFDM symbol) are present in different frequency resources may be considered. This case may occur through a method of two-dimensionally configuring TDD or indicating TDD configuration to the UE within the same time resource. Alternatively, this case may also occur when a currently activated UL BWP of the UE overlaps a deactivated DL BWP configured for the UE in some frequency resources. The BS may schedule the deactivated DL BWP of the UE to be used as an activated BWP for another UE by using such a configuration method. Accordingly, for both cases, although the former case is when a DL resource is actually allocated, and the latter case is when a UL resource is actually allocated but overlaps the DL resource in some frequency resource region parts, in the following descriptions of the disclosure, both cases may be referred to as a case in which some frequency resources are DL resources. That is, a slot in which some frequency resources are DL resources means that a DL resource and a UL resource in a particular slot are present in different frequency resources. (Herein, the slot in which some frequency resources are DL resources is referred to as an XDD slot. This is exemplary only and this slot may be referred to as other names.) In this case, a certain guard may be present between the DL resource and the UL resource depending on a UE capability.

In NR Release 15/16, as described above, when the PUCCH overlaps the PUSCH and the timeline condition for UCI multiplexing is satisfied, the UE may multiplex HARQ-ACK and/or CSI information included in the PUCCH to the PUSCH according to UCI information included in the PUSCH and may not transmit the PUCCH. When the UE multiplexes UCI of the PUCCH overlapping the PUSCH, as described above, the UE performs rate matching according to the UCI and transmitted PUSCH and multiplexes a coded modulation symbol determined based on this to the PUSCH. In this case, due to the multiplexed UCI added to a scheduled PUSCH resource, the quantity of resources for information to be transmitted to the scheduled PUSCH may be reduced, and an effective channel code rate of information (e.g., a UL-SCH) to be transmitted to the scheduled PUSCH may be increased. In addition, when the PUSCH is not able to be transmitted in some PRBs of the scheduled PUSCH because a DL resource and a UL resource in a particular slot are present in different frequency resources in the XDD system, the effective channel code rate of the UL-SCH may be greatly increased due to a reduced number of resources on which the PUSCH may be transmitted and a reduced quantity of resources for the UL-SCH caused by UCI multiplexing. As described above, in the XDD system, a method of processing overlapping UL signals in consideration of UCI multiplexing and an increase in the effective channel code rate due to UL and DL resource configuration patterns of a particular slot is required. When UL channels (e.g., a PUCCH and a PUSCH) overlap each other in the single carrier based XDD system, a method by which the UE transmits a UL channel is described below in consideration of this. Specifically, in a case in which UCI in a PUCCH is multiplexed to a PUSCH according to the overlapping rule of the NR Release 15/16, the PUSCH is transmitted in an XDD slot, and accordingly, a scheduled PRB resource in a certain frequency domain is not able to be transmitted, operations of the UE are described in detail below. Alternatively, a method of, rather than multiplexing UCI of a PUCCH to a PUSCH in an overlapping slot within a slot, multiplexing the UCI of the PUCCH to a PUSCH in another slot is also described in detail below. In another example, when PUSCH repetitive transmission is supported, a method of determining a PUSCH to which the UCI of the PUCCH is to be multiplexed is described in detail below. A method of determining a particular UL channel transmitted by the UE when UL channels overlap each other is also described in detail below.

Method of Multiplexing UCI of Overlapping PUCCH in Slot to Transmitted PUSCH

A method of, when a PUSCH overlaps a PUCCH in the XDD system, multiplexing UCI of the overlapping PUCCH to the transmitted PUSCH will is described in detail below.

In a case in which a PUCCH and a PUSCH overlaps in an XDD slot, when the timeline condition for UCI multiplexing is satisfied according to the overlapping rule of the NR Release 15/16, the UE may multiplex HARQ-ACK and/or CSI information among UCI of the PUCCH to the PUSCH transmitted in a corresponding XDD slot. When the PUSCH transmitted in the XDD slot may be transmitted on a scheduled resource, the UCI may be multiplexed in the same procedure as in the NR Release 15/16. However, when another frequency part in the XDD slot is allocated as a DL resource, and the UE is not able to use some PRB resources of a scheduled PUSCH for PUSCH transmission, the UE may multiplex UCI of a PUCCH overlapping a PUSCH, to the PUSCH by using the following methods.

Regardless of a PRB resource not available for PUSCH transmission due to DL resources in the XDD slot, the UE may perform rate matching on UCI multiplexed to the PUSCH based on a scheduled PUSCH resource. Thereafter, the UE may multiplex the UCI to the PUSCH by using a result of the rate matching.

In consideration of a PRB resource not available for PUSCH transmission due to DL resources in the XDD slot, the UE may perform rate matching on UCI multiplexed to the PUSCH based on a resource on which the PUSCH is actually transmitted in the XDD slot. Thereafter, the UE may multiplex the UCI to the PUSCH by using a result of the rate matching.

According to one of the above-described methods, the UE may multiplex UCI of the overlapping PUCCH to the PUSCH transmitted in the XDD slot and transmit the same to the BS.

In addition, a PUSCH to which UCI of the overlapping PUCCH in the XDD slot is multiplexed needs to be transmitted with a quantity of resources greater than or equal to a certain value. This is because when the quantity of resources of the PUSCH that may be transmitted in a corresponding slot is very small due to DL resources in the XDD slot, the UE may not multiplex the UCI of the PUCCH overlapping the PUSCH, to the PUSCH. A reference quantity of resources may be configured as a threshold value for the BS to determine whether to multiplex the UCI of the overlapping PUCCH to the UE by a new higher layer parameter (e.g., ThresholdforXDD), based on a UE capability for XDD and a UE capability related to rate matching and UCI multiplexing that may be newly defined due to the support for the XDD system. Alternatively, the threshold value may be explicitly configured via an MAC CE or L1 signaling (e.g., DCI) rather the higher layer parameter, or may be implicitly defined as a particular value between the BS and the UE. When the quantity of resources of the PUSCH overlapping the PUCCH is less than a threshold value corresponding to a new higher layer parameter value, the UE may drop PUSCH transmission or determine a UL channel to be transmitted according to the priority of information included in the PUSCH and the PUCCH, as described below. When the threshold value corresponding to the new higher layer parameter value is not configured for the quantity of resources of the PUSCH overlapping the PUCCH, the UE may multiplex UCI of the overlapping PUCCH to the PUSCH regardless of the quantity of available resources of the PUSCH.

Figure 18:
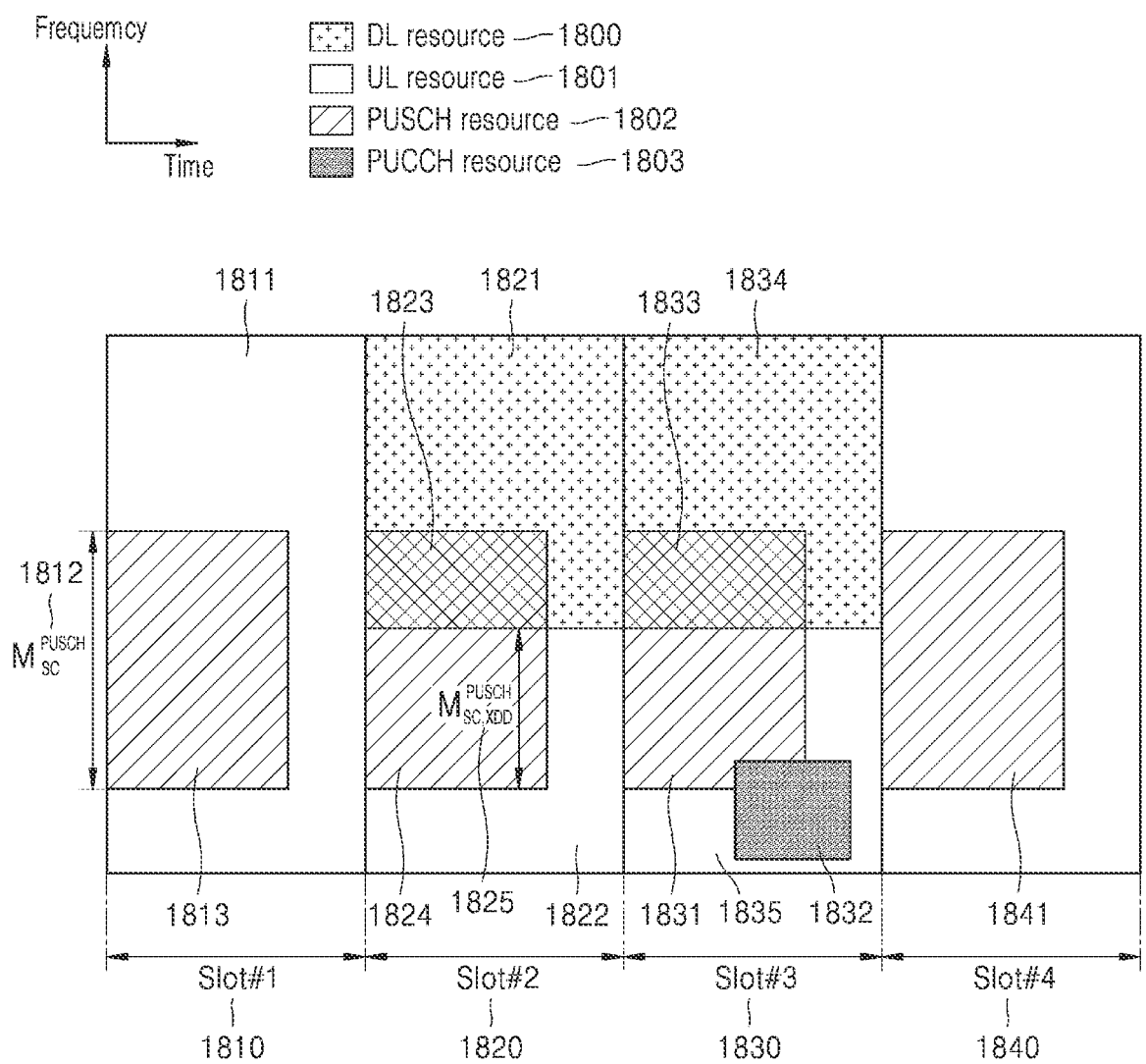
FIG. 18 illustrates an example in which a PUSCH overlaps a physical uplink control channel (PUCCH) in an XDD slot, for PUSCH repetitive transmission type A, according to an embodiment.

FIG. 18 illustrates an example in which a PUSCH overlaps a PUCCH in an XDD slot, for PUSCH repetitive transmission type A, according to an embodiment.

In FIG. 18, a slot #2 1820 and a slot #3 1830 are XDD slots in which DL resources 1821 and 1834 and UL resources 1822 and 1835 are present in different frequency resources. In this case, a scheduled PUSCH is divided into resources 1823 and 1833 that may not be transmitted due to the DL resources and resources 1824 and 1831 that are transmitted as UL resources. In this regard, the UE may rate-match UCI of a PUCCH 1832 overlapping a PUSCH (composed of the resources 1831 and 1833) according to a scheduled PUSCH resource 1813. In contrast, the UE may rate-match UCI of the PUCCH 1832 overlapping the PUSCH (composed of the resources 1831 and 1833) according to a PUSCH 1831 actually transmitted in an XDD slot. Thereafter, the UE may multiplex the UCI to the PUSCH 1831 by using a result of the rate matching.

As another example, when a plurality of PUSCHs overlap one PUCCH in the XDD slot, a PUSCH to which UCI of the PUCCH is to be multiplexed needs to be determined from among the plurality of overlapping PUSCHs. In the XDD system using a single carrier, because the plurality of PUSCHs overlap each other in the same slot having the same numerology as the PUCCH, UCI may be multiplexed to a PUSCH transmitted earliest by the UE in the slot from among the plurality of PUSCHs. In this case, as for whether to multiplex UCI to the PUSCH, by comparing the quantity of resources available for PUSCH transmission with a threshold value indicated by a new higher layer parameter as described above, when the quantity of resources is greater than the threshold value, the UCI may be multiplexed. When the quantity of resources is less than the threshold value, a comparison may be performed with the threshold value for multiplexing UCI to a PUSCH transmitted earliest by the UE in the slot among PUSCHs overlapping another PUCCH rather than the PUSCH.

Method of Selecting PUSCH for Multiplexing UCI During PUSCH Repetitive Transmission A method of, when a repetitively transmitted PUSCH overlaps a single-transmitted PUCCH in an XDD slot in the XDD system, selecting a PUSCH to which UCI is to be multiplexed in consideration of the repetitively transmitted PUSCH will now be described.

In NR Release 15/16, when the repetitively transmitted PUSCH overlaps the single-transmitted PUCCH, UCI of the PUCCH is multiplexed to the PUSCH overlapping the PUCCH based on the timeline condition for multiplexing and the overlapping rule. However, in the XDD system, in a repetitive transmission period of the PUSCH overlapping the PUCCH, the PUSCH may not be transmitted on some scheduled resources due to DL resources in the XDD slot. When the UCI of the PUCCH is multiplexed to a reduced quantity of PUSCH resources, the effective channel code rate may be significantly increased as described above, compared to multiplexing UCI in an NR system rather than the existing XDD system. Accordingly, in the XDD system, in consideration in which an XDD slot in which a DL resource and a UL resource are mixed in different frequency domains, multiplexing of UCI of the overlapping PUCCH not in a repetitive transmission period of the overlapping PUSCH but in another repetitive transmission period of the same PUSCH may be considered. Specifically, the UE identifies that PUSCH repetitive transmission overlaps PUCCH single transmission. In addition, the UE identifies the timeline condition for whether the UCI of the PUCCH may be multiplexed to the PUSCH. Thereafter, when multiplexing is possible, the UE identifies available resources of the PUSCH overlapping the PUCCH. When the quantity of available resources of the PUSCH to which the UCI needs to be multiplexed is reduced due to DL resources in the XDD slot, the UE may multiplex the UCI of the PUCCH in another repetitive transmission period of the PUSCH. In this case, in order to determine whether to perform multiplexing in a repetitive transmission period of a PUSCH other than an PUSCH in an overlapping slot, by comparing a threshold value (e.g., ThresholdforXDD) that may be configured by a new higher layer parameter similarly as described above, when the quantity of available resources of the PUSCH in the XDD slot is greater than the threshold value, the UE multiplexes UCI to the PUSCH. When the quantity of available resources is less than the threshold value, the UE searches for another repetitive transmission period of the PUSCH for multiplexing the UCI to the PUSCH. In this case, the UE may identify the quantity of resources from a first PUSCH repetitive transmission period for multiplexing the UCI of the PUCCH and may multiplex the UCI of the PUCCH in the first PUSCH repetitive transmission period having a greater quantity of resources than the threshold value configured by the higher layer parameter. When a specific example is described using FIG. 18, the UE identifies that PUSCH repetitive transmission 1831 overlaps PUCCH transmission 1832 in the slot #3 1830 that is an XDD slot in which a DL resource 1834 and a UL resource 1835 are present. In this case, when the quantity of resources for PUSCH repetitive transmission 1831 in the slot is less than the threshold value that may be configured by the higher layer parameter or the like, the UE identifies another PUSCH repetitive transmission period for multiplexing the UCI of the PUCCH. The UE may identify whether UCI multiplexing is possible from a first PUSCH repetitive transmission in the slot #1 1810. Because the entire slot #1 1810 is composed of UL resources, UCI multiplexing may be performed in the same manner as in the NR Release 15/16, and thus, the UE multiplexes UCI of the PUCCH 1832 overlapping the PUSCH 1831 in the slot #3 1830 to a first PUSCH repetitive transmission 1813.

In the specific method described above, when the quantity of available resources of the PUSCH in a slot in which the PUSCH overlaps the PUCCH is less than the threshold value, it is identified whether UCI multiplexing is possible from the first PUSCH repetitive transmission. However, a slot closest to the overlapping slot may be checked first in another method. For example, a PUSCH to which the UCI of the PUCCH is to be multiplexed may be determined by identifying whether UCI multiplexing is possible in slot #3 of FIG. 18 and comparing the quantity of resources of the PUSCH in the slot with the threshold value for UCI multiplexing in the order of slot #2→slot #4→slot #1. In this case, the UCI of the PUCCH may be multiplexed to a PUSCH 1841 transmitted in a slot #4 1840.

Method of Dropping Transmission of PUSCH and Transmitting PUCCH

According to an embodiment, a method of, when a PUCCH overlaps a PUSCH in an XDD slot in the XDD system, dropping transmission of a PUSCH and transmitting only a PUCCH according to the quantity of available resources of the PUSCH in the slot will now be described.

Unlike NR Release 15/16, when the BS and the UE support the XDD system, a slot in which a PUCCH overlaps a PUSCH is an XDD slot, and the quantity of available resources of the PUSCH is reduced due to DL resources in the XDD slot, the UE may drop (not transmit) a PUSCH and transmit only the PUCCH, rather than multiplexing UCI of the PUCCH to the PUSCH. This may be considered because it may not be efficient to transmit the PUSCH with an insufficient quantity or resources. As described above, by comparing the quantity of available resources of the PUSCH with a threshold value of the quantity of resources for multiplexing the UCI of the PUCCH to the PUSCH, when the quantity of available resources is less than the threshold value, the UE may drop PUSCH transmission in the XDD slot and transmit only the PUCCH. When the quantity of available resources is greater than the threshold value, the UE may multiplex the UCI of the PUCCH to the overlapping PUSCH and transmit the same to the BS.

Alternatively, when the PUCCH overlaps the PUSCH in the XDD slot without a comparison between the threshold value and the quantity of available resources of the PUSCH in the XDD slot, the UE may transmit the PUCCH and drop transmission of the PUSCH.

Method of Selecting UL Channel to be Transmitted According to Priorities of Overlapping Channels A method of, when a PUCCH overlaps a PUSCH in an XDD slot in the XDD system, transmitting a high-priority UL channel according to the quantity of available resources of the PUSCH in the slot will now be described.

When the BS and the UE support the XDD system, a slot in which a PUCCH overlaps a PUSCH is an XDD slot, and the quantity of available resources of the PUSCH is reduced due to DL resources in the XDD slot, the UE may compare the priorities of the PUCCH and the PUSCH to determine a UL channel to be transmitted, rather than multiplexing UCI of the PUCCH to the PUSCH. Thereafter, the UE may transmit a high-priority UL channel and drop (not transmit) a low-priority UL channel. In this case, the UE may apply a method of determining an UL channel to be transmitted according to the priority by comparing the quantity of available resources of the PUSCH with a threshold value of the quantity of resources for multiplexing the UCI of the PUCCH to the PUSCH. When the quantity of available resources is less than the threshold value, the UE may compare the priorities of the PUSCH and the PUCCH in the XDD slot, drop transmission of the low-priority UL channel, and transmit only the high-priority UL channel. When the quantity of available resources is greater than the threshold value, the UE may multiplex the UCI of the PUCCH to the overlapping PUSCH and transmit the same to the BS.

Alternatively, when the PUCCH overlaps the PUSCH in the XDD slot without a comparison between the threshold value and the quantity of available resources of the PUSCH in the XDD slot, the UE may compare the priorities of the UL channels and transmit only the high-priority UL channel.

The UE may determine the priorities between the overlapping PUCCH and PUSCH in the XDD slot by using the following methods:

The UE may compare the priorities of pieces of UCI included in UL channels. Specifically, the UE may compare the priorities between UCI included in the PUCCH and UCI included in the PUSCH, and may determine that the PUCCH or PUSCH including UCI having a higher priority has a higher priority for the UE to perform UL transmission. The priorities between pieces of UCI included in the UL channels may be determined using various methods. For example, the priorities of pieces of UCI may be configured as follows in the order of highest: {HARQ-ACK in PUCCH>CG-UCI in PUSCH>SR in PUCCH>CSI information for aperiodic CSI reporting in PUSCH>CSI information for semi-persistent CSI reporting in PUSCH/PUCCH>CSI information for periodic CSI reporting in PUCCH>UL data in PUSCH}. This is exemplary only and may be used to determine transmission of overlapping UL channels by defining different orders of priorities between the BS and the UE.

Among overlapping UL channels, a UL channel transmitted earliest by the UE in a corresponding slot may have a higher priority. The priority may be determined according to a PUCCH scheduled by the BS and a start symbol in a slot of a PUSCH. In contrast, when locations of transmission start symbols in slots of two overlapping UL channels are identical, the UE may determine that the PUCCH has a higher priority (or may determine that the PUSCH has a higher priority, which may be determined according to a rule defined between the BS and the UE).

The UE may determine the priorities between overlapping UL channels by comparing the size of the quantity of resources transmitted in a corresponding slot. As a specific example, the UE may compare the quantities of available resources of the overlapping PUCCH and the PUSCH in the XDD slot. When the quantity of available resources of the PUCCH is greater than the quantity of available resources of the PUSCH, the UE may transmit the PUCCH and not transmit the PUSCH by determining that the PUCCH has a higher priority. This is exemplary method of determining the priority based on the quantity of available resources. Various methods may be considered, such as a method of assigning a higher priority to a smaller quantity of resources by comparing the quantities of resources, or a method of determining the priority based on the quantity of resources scheduled by the BS rather than the quantity of actually transmitted resources.

Figure 19:
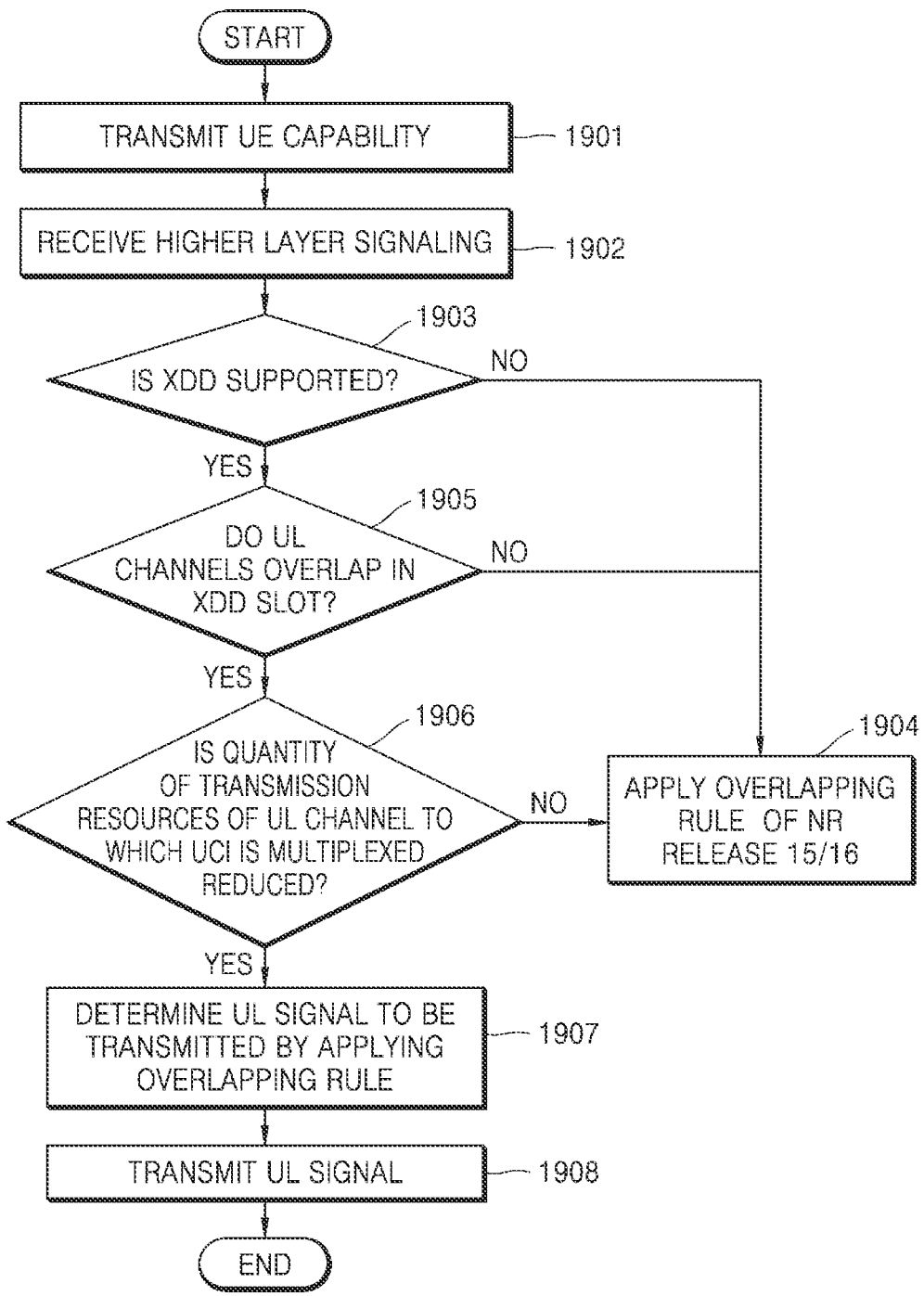
FIG. 19 is a flowchart for describing operations performed by a terminal for transmitting overlapping uplink channels, according to an embodiment.

FIG. 19 is a flowchart for describing operations performed by the UE for transmitting overlapping UL channels, according to an embodiment.

The UE may report a UE capability to the BS, at 1901. In this case, the UE capability reported by the UE to the BS may include whether the XDD system is supported, whether the methods of configuring resources in the XDD system are supported, whether the methods (including methods described above and below) of transmitting overlapping UL channels, described above in the disclosure, in consideration of the XDD system are supported, or the like. Thereafter, the UE receives higher layer signaling from the BS, at 1902. The UE may receive higher layer configuration for supporting the XDD system as well as configuration for supporting an NR UL or DL via the higher layer signaling. In this case, the higher layer configuration for supporting the XDD system may include resource configuration information regarding the XDD system, a rate matching-related parameter considering the XDD system, a new higher layer parameter (e.g., ThresholdforXDD) for applying an overlapping rule of overlapping channels considering the XDD system, or the like. The UE identifies whether XDD is supported based on the received higher layer configuration, at 1903. In a case in which the UE does not receive XDD support from the BS, when UL channels overlap each other in a slot, the UE performs UL transmission according to the overlapping rule of the NR Release 15/16, at 1904 and 1908. When the UE receives XDD support from the BS and the UL channels (e.g., a PUCCH and a PUSCH) overlap each other in the slot, the UE identifies whether the overlapping slot is an XDD slot in which a DL resource and a UL resource are present in different frequency domains, at 1905. When the overlapping slot is not an XDD slot but a UL slot in which all resources in the slot are UL resources, the UE performs UL transmission according to the overlapping rule of the NR Release 15/16, at 1904 and 1908. When the UL channels (e.g., the PUCCH and the PUSCH) overlap each other in the XDD slot, the UE identifies whether the quantity of available resources of a UL channel (e.g., the PUSCH) to which UCI is multiplexed is reduced than a scheduled quantity of resources due to DL resources in the XDD slot, at 1906. When the quantity of available resources of the UL channel (e.g., the PUSCH) to which the UCI is multiplexed is not reduced and is equal to the scheduled quantity of resources, the UE performs UL transmission according to the overlapping rule of the NR Release 15/16, at 1904 and 1908. When the quantity of available resources of the UL channel (e.g., the PUSCH) to which the UCI is multiplexed is reduced, the UE determines a UL channel to be transmitted from among the overlapping UL channels by applying the overlapping rule according to one or a combination of the methods described above in the embodiments of the disclosure, and determines whether to perform UCI multiplexing, at 1907. Thereafter, the UE generates a UL signal based on the determined UL channel and whether UCI is performed, and transmits the UL signal to the BS, at 1908.

Figure 20:
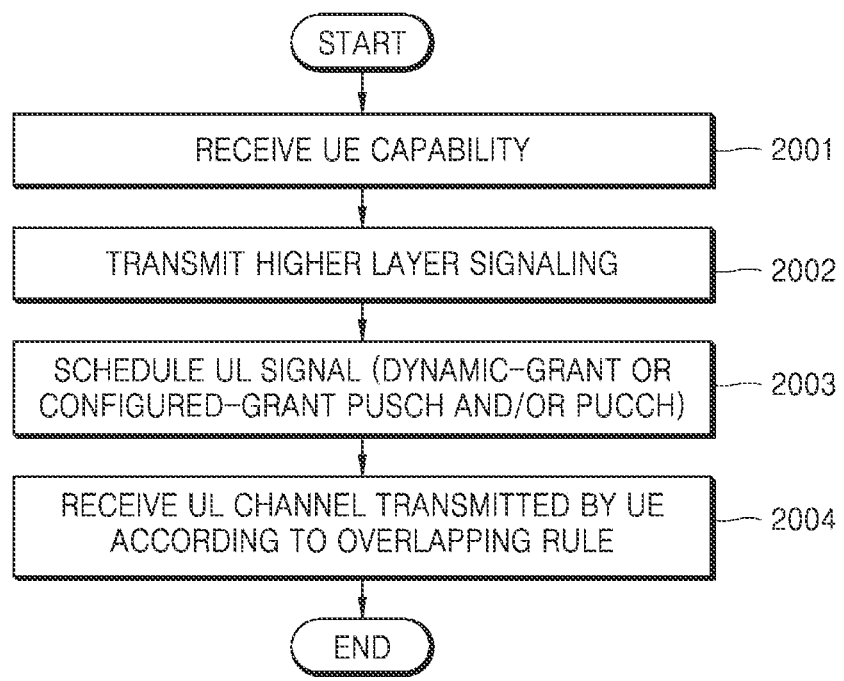
FIG. 20 is a flowchart for describing operations performed by a base station for receiving uplink channels, according to an embodiment.

FIG. 20 is a flowchart for describing operations performed by the BS for receiving UL channels, according to an embodiment.

The BS receives a UE capability report from the UE, at 2001. The BS transmits higher layer signaling to the UE based on UE capability information received from the UE, at 2002. Thereafter, the BS schedules a UL signal to the UE by performing a series of procedures (e.g., scheduling a dynamic grant-based PUSCH after receiving a scheduling request (SR) from the UE) for scheduling a UL signal (e.g., a dynamic grant-based or configured grant-based PUSCH and/or PUCCH), at 2003. Thereafter, the BS receives a UL channel transmitted by the UE according to an overlapping rule, at 2004. For a method by which the UE transmits a UL channel according to the overlapping rule, as described above, whether XDD is supported, a UL channel determined by the UE according to the priority of UCI included in each scheduled UL channel, UCI multiplexing according to the quantity of resources on which the UE may transmit a UL channel in the case of an XDD slot, or the like may be considered.

Method of Transmitting Overlapping UL Channels in XDD System Using Multi-Carrier A method of transmitting overlapping UL signals (e.g., a PUCCH and a PUSCH) in a multi-carrier based XDD system rather than CA is described below.

When CA using a multi-carrier supports a flexible UL-DL resource configuration method according to the XDD system for each carrier, a UL channel (e.g., a PUSCH) is scheduled for each carrier, such that a plurality of PUSCHs may overlap each other in one slot in the time domain. When the plurality of PUSCHs are transmitted in one slot for a plurality of support cells according to the NR Release 15/16 (that is, the plurality of PUSCHs overlap each other in one slot in the time domain), aperiodic CSI is not multiplexed to any of the plurality of PUSCHs, and UCI is multiplexed to one of the plurality of PUSCHs, the UE multiplexes UCI of a PUSCH of a support cell having the smallest higher layer parameter ServCellIndex when the timeline condition for UCI multiplexing (refer to 3GPP standard TS 38.213 clause 9.2.5) is satisfied. As described above, when the XDD system supports a multi-carrier-based CA operation, an XDD slot in which a DL resource and a UL resource are present in different frequency domains may be configured for each carrier of each support cell. When the PUSCH of the support cell having the smallest higher layer parameter ServCellIndex to which UCI is multiplexed is scheduled to be transmitted in the XDD slot in a Ca environment, the UE may transmit the PUSCH with a bandwidth smaller than a scheduled bandwidth due to DL resources in the XDD slot. In consideration of this, the UE may consider the following methods to multiplex UCI to one PUSCH in the XDD system supporting a multi-carrier.

The UE may multiplex UCI to a PUSCH of a support cell having the smallest higher layer parameter ServCellIndex as in the NR Release 15/16. When the quantity of resources on which the UE may actually transmit the PUSCH is reduced due to the XDD slot, in consideration of one or a combination of the methods described above for a case in which the quantity of resources of the PUSCH to which UCI is multiplexed is reduced, the UE may multiplex the UCI to the PUSCH of the support cell having the smallest higher layer parameter ServCellIndex.

The UE may multiplex UCI to a PUSCH of a support cell having the smallest higher layer parameter ServCellIndex among support cells other than an XDD slot for a plurality of support cells for which a PUSCH is scheduled in a corresponding slot.

The UE may compare the quantity of resources of a PUSCH that the UE may actually transmit on carriers of a plurality of support cells for which a PUSCH is scheduled in a corresponding slot with a threshold value configured by a new higher layer parameter (e.g., ThresholdforXDD), and may multiplex UCI to a PUSCH of a support cell having the smallest higher layer parameter ServCellIndex among the support cells in which the quantity of resources of the PUSCH that may be actually transmitted is greater than the threshold value.

The UE determines a support cell to which UCI is to be multiplexed in the XDD system supporting CA according to one of the methods above and multiplexes UCI to a PUSCH transmitted in the determined support cell by using one or a combination of the specific methods of Embodiment 4 described above.

Method of Transmitting PUCCH that May not be Transmitted on DL Resource in Slot

A method of, when a DL resource and a UL resource are present in different frequency domains in a single slot in the XDD system, multiplexing UCI of a PUCCH that may not be transmitted due to the DL resource, to a PUSCH and transmitting the same is described below.

A PUCCH periodically or semi-persistently transmitted in the XDD system (e.g., PUCCH transmission for the purpose of periodic CSI reporting, semi-persistent CSI reporting, or SR reporting) may be scheduled in an XDD slot in which a DL resource is present. When such PUCCH transmission overlaps DL resources in the XDD slot, the UE does not transmit a corresponding PUCCH. Such PUCCH drop may cause performance deterioration in terms of system. When PUSCH transmission is scheduled in a DL resource in the same XDD slot to decrease the performance deterioration, an operation of multiplexing UCI of a PUCCH that has not been transmitted due to the DL resource to a corresponding PUSCH and transmitting the same may be considered. When the PUCCH overlaps the PUSCH in the time domain, the UE may apply the overlapping rule according to the specific methods described above in Embodiment 4 and multiplex UCI of the PUCCH to the PUSCH. In contrast, a method of multiplexing UCI even though the PUCCH that has not been transmitted in the XDD slot does not overlap a PUSCH transmitted on a UL resource in the time and frequency domain may be additionally considered in the XDD system.

Figure 21:
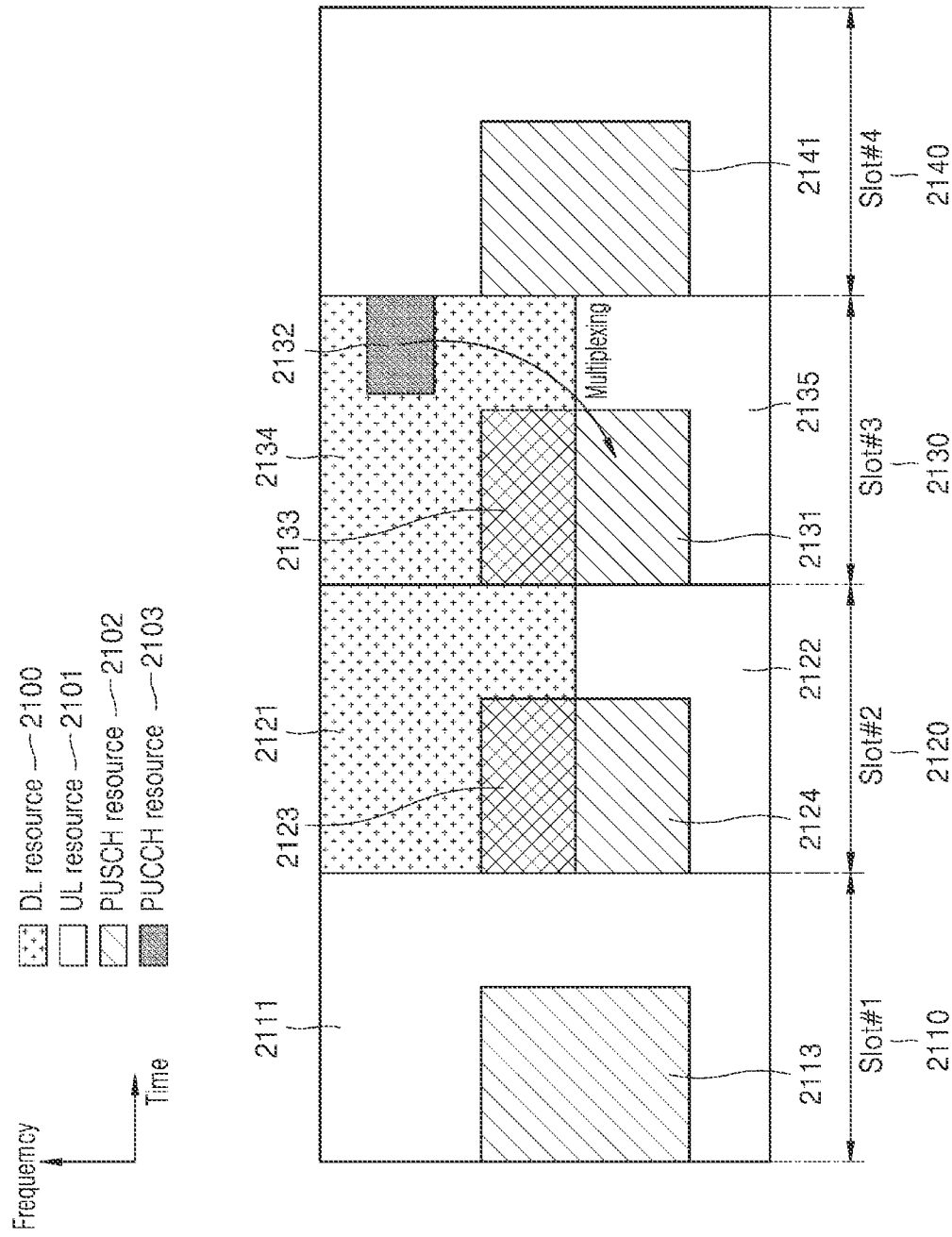
FIG. 21 is a diagram illustrating an example in which a PUCCH and a PUSCH are scheduled in an XDD slot for PUSCH repetitive transmission type A, according to an embodiment.

FIG. 21 is a diagram illustrating an example in which a PUCCH and a PUSCH are scheduled in an XDD slot for PUSCH repetitive transmission type A, according to an embodiment.

When a slot #3 2130 is an XDD slot in which a DL resource 2134 and a UL resource 2135 are present in a slot, and a PUSCH (scheduled PUSCH corresponding to a sum of 2131 and 2133) and a PUCCH 2132 are scheduled, the UE may not transmit the PUCCH 2132 due to the DL resource 2134. However, the UE may multiplex UCI of the PUCCH 2132 to an available PUSCH 2131 in a corresponding slot according to Embodiment 6. To support this operation, as described above, the timeline condition for UCI multiplexing (refer to 3GPP standard TS 38.213 clause 9.2.5) needs to be satisfied, and some of the following additional conditions may need to be satisfied.

When the UE compares the quantity of resources of a PUSCH that may be actually transmitted with a threshold value configured by a new higher layer parameter (e.g., ThresholdforXDD), the quantity of resources of the PUSCH that may be actually transmitted may be greater than the threshold value. When the quantity of resources of the PUSCH that may be actually transmitted is greater than the threshold value, the UE may multiplex UCI of a PUCCH to the PUSCH. In contrast, when the quantity of resources of the PUSCH that may be actually transmitted is less than the threshold value, the UE may drop PUCCH transmission and transmit only the PUSCH.

When the UE compares the priorities between UCI included in the PUSCH and UCI included in the PUCCH, the UCI included in the PUCCH may have a higher priority. In this case, the priority may refer to the priorities between pieces of UCI described above. For example, when the UCI of the PUCCH has a higher priority by comparing the priorities between the UCI included in the PUCCH and the UCI included in the PUSCH in the order of {HARQ-ACK in PUCCH>CG-UCI in PUSCH>SR in PUCCH>CSI information for aperiodic CSI reporting in PUSCH>CSI information for semi-persistent CSI reporting in PUSCH/PUCCH>CSI information for periodic CSI reporting in PUCCH>UL data in PUSCH}, the UE may multiplex the UCI of the PUCCH to the PUSCH. In contrast, when the UCI of the PUCCH has a lower priority than the UCI of the PUSCH, the UE may drop PUCCH transmission and transmit only the PUSCH.

Alternatively, when the timeline condition for UCI multiplexing is satisfied regardless of the additional conditions, even though the PUCCH does not overlap the PUSCH, the UE may multiplex the UCI of the PUCCH to the PUSCH.

Figure 22:
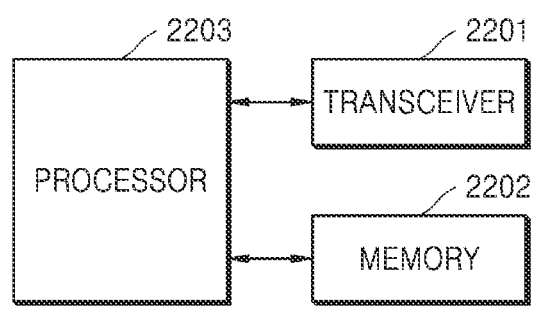
FIG. 22 is a block diagram illustrating a structure of a terminal according to an embodiment.

FIG. 22 is a block diagram illustrating a structure of the UE, according to an embodiment.

Referring to FIG. 22, the UE may include a transceiver 2201, a memory 2202, and a processor 2203. However, the components of the UE are not limited to the above-described example. For example, the UE may include more components or fewer components than the above-described components. In addition, at least some or all of the transceiver 2201, the memory 2202, and the processor 2203 may be implemented in a single chip.

The transceiver 2201 may transmit or receive a signal to or from the BS. The above-described signal may include control information and data. For this, the transceiver 2201 may include a radio frequency (RF) transmitter for up-converting the frequency of a signal to be transmitted and amplifying the signal and an RF receiver for low-noise amplifying a received signal and down-converting the frequency of the received signal. Furthermore, the transceiver 2201 may receive a signal on a radio channel and output the signal to the processor 2203, and may transmit a signal output from the processor 2203 on a radio channel.

The memory 2202 may store programs and data required for operations of the UE. Also, the memory 2202 may store control information or data included in a signal transmitted or received by the UE. The memory 2202 may include a storage medium, such as read-only memory (ROM), random access memory (RAM), a hard disk, a compact disc ROM (CD-ROM), and a digital versatile disc (DVD), or a combination of storage media. Also, the memory 2202 may include a plurality of memories. The memory 2202 may store a program for executing an operation of the UE for power saving.

The processor 2203 may control a series of processes so that the UE may operate according to the above-described embodiments of the disclosure. The processor 2203 may execute the program stored in the memory 2202 to receive information, such as configuration for a CA, a BWP configuration, an SRS configuration, and a PDCCH configuration, from the BS and to control a dormant cell operating operation based on configuration information.

Figure 23:
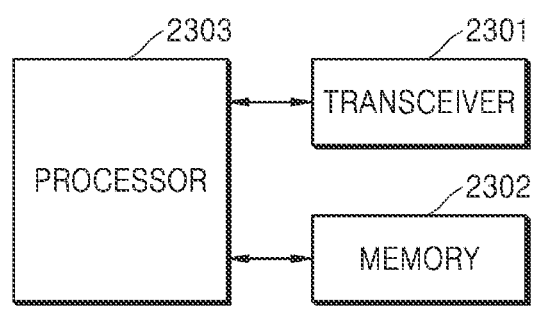
FIG. 23 is a block diagram illustrating a structure of a base station, according to an embodiment.

FIG. 23 is a block diagram illustrating a structure of the BS, according to an embodiment.

Referring to FIG. 23, the BS may include a transceiver 2301, a memory 2302, and a processor 2303. However, the components of the BS are not limited to the above-described example. For example, the BS may include more components or fewer components than the above-described components. Also, the transceiver 2301, the memory 2302, and the processor 2303 may be implemented in a single chip.

The transceiver 2301 may transmit or receive a signal to or from the UE. The above-described signal may include control information and data. For this, the transceiver 2301 may include an RF transmitter for up-converting the frequency of a signal to be transmitted and amplifying the signal and an RF receiver for low-noise amplifying a received signal and down-converting the frequency of the received signal. Furthermore, the transceiver 2301 may receive a signal on a radio channel and output the signal to the processor 2303, and may transmit a signal output from the processor 2303 on a radio channel.

The memory 2302 may store programs and data required for operations of the BS. Also, the memory 2302 may store control information or data included in a signal transmitted or received by the BS. The memory 2302 may include a storage medium, such as ROM, RAM, a hard disk, a CD-ROM, and a DVD, or a combination of storage media. Also, the memory 2302 may include a plurality of memories. The memory 2302 may store a program for executing an operation of the BS for power saving.

The processor 2303 may control a series of processes so that the BS may operate according to the above-described embodiments of the disclosure. The processor 2303 may execute the program stored in the memory 2302 to transmit information, such as a configuration for CA, a BWP configuration, an SRS configuration, or a PDCCH configuration, to the UE and to control a dormant cell operation performed by the UE based on configuration information.

The methods described herein or in the following claims of the disclosure may be implemented as hardware, software, or a combination of hardware and software.

When the methods are implemented as software, a computer-readable storage medium or computer program product having one or more programs (software modules) stored therein may be provided. One or more programs stored in the computer-readable storage medium or computer program product are configured to be executable by one or more processors in an electronic device. The one or more programs include instructions for causing the electronic device to execute the methods described in the claims or the specification.

The programs (e.g., software modules or software) may be stored in RAM, non-volatile memory including flash memory, ROM, electrically erasable programmable read-only memory (EEPROM), a magnetic disc storage device, a CD-ROM, a DVD, another type of optical storage device, or a magnetic cassette. Alternatively, the programs may be stored in a memory including a combination of some or all of the above-described memory devices. Also, each constituent memory may include a plurality of memories.

The programs may be stored in an attachable storage device that is accessible via a communication network such as the Internet, an intranet, a local area network (LAN), a wireless LAN (WLAN), or a storage area network (SAN), or a combination thereof. Such a storage device may access, via an external port, an apparatus performing the embodiments of the disclosure. Furthermore, a separate storage device on the communication network may access the electronic device performing the embodiments of the disclosure.

A method and an apparatus for performing rate matching for UL control information when performing communication capable of effectively allocating frequency resources in a wireless communication system may be provided.

Components included herein are expressed in a singular or plural form. However, the singular or plural form is appropriately selected for convenience of descriptions and the disclosure is not limited thereto. As such, a component expressed in a plural form may also be configured as a single component, and a component expressed in a singular form may also be configured as plural components.

Moreover, the embodiments described herein are merely illustrative of specific examples to easily facilitate description and understanding of the disclosure, and are not intended to limit the scope of the disclosure. It would be obvious to those of ordinary skill in the art that other modifications based on the technical concept of the disclosure can be implemented. Also, the embodiments may be combined to be implemented, when required. For example, the BS and the UE may be operated in a manner that portions of an embodiment of the disclosure are combined with portions of another embodiment of the disclosure. The embodiments of the disclosure may also be applied to other communication systems, and various modifications based on the technical concept of the embodiments of the disclosure may be made. For example, the embodiments of the disclosure may be applied to an LTE, 5G or NR system.

What is claimed is:

1. A method performed by a terminal in a wireless communication system, the method comprising:
   receiving resource configuration information for a physical uplink control channel (PUCCH);
   based on the resource configuration information, identifying whether a resource for the PUCCH overlaps with a downlink (DL) frequency resource in at least one symbol of a slot;
   based on the resource for the PUCCH overlapping with the DL frequency resource in the at least one symbol of the slot, identifying whether an uplink (UL) frequency resource different from the DL frequency resource is further configured in the at least one symbol and a physical uplink shared channel (PUSCH) is scheduled in the UL frequency resource in the at least one symbol; and
   based on the PUSCH being scheduled in the UL frequency resource in the at least one symbol of the slot, transmitting uplink control information (UCI) via the PUSCH in the at least one symbol.

2. The method of claim 1, wherein the UCI includes at least one of periodic channel state information (CSI), semi-persistent CSI, or a scheduling request (SR).

3. The method of claim 1, wherein the PUCCH overlaps with the PUSCH in the at least one symbol of the slot, or wherein the PUCCH does not overlap with the PUSCH in the at least one symbol of the slot.

4. The method of claim 1, wherein each of the UL frequency resource and the DL frequency resource comprises at least one resource block set or resource block group.

5. The method of claim 1, wherein a guard band is further configured between the UL frequency resource and the DL frequency resource in the at least one symbol of the slot.

6. The method of claim 1, wherein the PUSCH is based on a PUSCH repetition type A.

7. A terminal in a wireless communication system, the terminal comprising:
a transceiver; and
at least one processor connected to the transceiver and configured to:
receive resource configuration information for a physical uplink control channel PUCCH);
based on the resource configuration information, identify whether a resource for the PUCCH overlaps with a downlink (DL) frequency resource in at least one symbol of a slot;
based on the resource for the PUCCH overlapping with the DL frequency resource in the at least one symbol of the slot, identify whether an uplink (UL) frequency resource different from the DL frequency resource is further configured in the at least one symbol and a physical uplink shared channel (PUSCH) is scheduled in the UL frequency resource in the at least one symbol; and
based on the PUSCH being scheduled in the UL frequency resource in the at least one symbol of the slot, transmit uplink control information (UCI) via the PUSCH in the at least one symbol.

8. The terminal of claim 7, wherein the UCI includes at least one of periodic channel state information (CSI), semi-persistent CSI, or a scheduling request (SR).

9. The terminal of claim 7, wherein the PUCCH overlaps with the PUSCH in the at least one symbol of the slot, or wherein the PUCCH does not overlap with the PUSCH in the at least one symbol of the slot.

10. The terminal of claim 7, wherein each of the UL frequency resource and the DL frequency resource comprises at least one resource block set or resource block group.

11. The terminal of claim 7, wherein a guard band is further configured between the UL frequency resource and the DL frequency resource in the at least one symbol of the slot.

12. The terminal of claim 7, wherein the PUSCH is based on a PUSCH repetition type A.

13. A method performed by a base station in a wireless communication system, the method comprising:
transmitting resource configuration information for a physical uplink control channel (PUCCH);
based on the resource configuration information, identifying whether a resource for the PUCCH overlaps with a downlink (DL) frequency resource in at least one symbol of a slot;
based on the resource for the PUCCH overlapping with the DL frequency resource in the at least one symbol of the slot, identifying whether an uplink (UL) frequency resource is further configured in the at least one symbol and a physical uplink shared channel (PUSCH) is scheduled in the UL frequency resource in the at least one symbol; and
based on the PUSCH being scheduled in the UL frequency resource in the at least one symbol of the slot, receiving uplink control information (UCI) via the PUSCH in the at least one symbol.

14. The method of claim 13, wherein the UCI includes at least one of periodic channel state information (CSI), semi-persistent CSI, or a scheduling request (SR).

15. The method of claim 13, wherein each of the UL frequency resource and the DL frequency resource comprises at least one resource block set or resource block group.

16. The method of claim 13, wherein a guard band is further configured between the UL frequency resource and the DL frequency resource in the at least one symbol of the slot.

17. A base station in a wireless communication system, the base station comprising:
a transceiver; and
at least one processor connected to the transceiver and configured to:
transmit resource configuration information for a physical uplink control channel (PUCCH);
based on the resource configuration information, identify whether a resource for the PUCCH overlaps with a downlink (DL) frequency resource in at least one symbol of a slot;
based on the resource for the PUCCH overlapping with the DL frequency resource in the at least one symbol of the slot, identify whether an uplink (UL) frequency resource is further configured in the at least one symbol and a physical uplink shared channel (PUSCH) is scheduled in the UL frequency resource in the at least one symbol; and
based on the PUSCH being scheduled in the UL frequency resource in the at least one symbol of the slot, receive uplink control information (UCI) via the PUSCH in the at least one symbol.

18. The base station of claim 17, wherein the UCI includes at least one of periodic channel state information (CSI), semi-persistent CSI, or a scheduling request (SR).

19. The base station of claim 17, wherein each of the UL frequency resource and the DL frequency resource comprises at least one resource block set or resource block group.

20. The base station of claim 17, wherein a guard band is further configured between the UL frequency resource and the DL frequency resource in the at least one symbol of the slot.

* * * * *